United States Patent
Sugio et al.

(10) Patent No.: US 10,075,708 B2
(45) Date of Patent: Sep. 11, 2018

(54) IMAGE ENCODING METHOD AND IMAGE DECODING METHOD

(71) Applicant: Panasonic Corporation, Osaka (JP)

(72) Inventors: Toshiyasu Sugio, Osaka (JP); Takahiro Nishi, Nara (JP); Youji Shibahara, Osaka (JP); Kyoko Tanikawa, Osaka (JP); Hisao Sasai, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 514 days.

(21) Appl. No.: 14/236,965

(22) PCT Filed: Apr. 3, 2013

(86) PCT No.: PCT/JP2013/002303
§ 371 (c)(1),
(2) Date: Feb. 4, 2014

(87) PCT Pub. No.: WO2013/153778
PCT Pub. Date: Oct. 17, 2013

(65) Prior Publication Data
US 2014/0169477 A1    Jun. 19, 2014

Related U.S. Application Data

(60) Provisional application No. 61/621,717, filed on Apr. 9, 2012.

(51) Int. Cl.
*H04N 19/583*    (2014.01)
*H04N 19/52*    (2014.01)
*H04N 19/597*    (2014.01)

(52) U.S. Cl.
CPC ....... *H04N 19/00709* (2013.01); *H04N 19/52* (2014.11); *H04N 19/597* (2014.11)

(58) Field of Classification Search
CPC ...... H04N 7/50; H04N 7/462; H04N 7/26244; H04N 7/26335; H04N 7/26941
See application file for complete search history.

(56) References Cited

U.S. PATENT DOCUMENTS

2007/0064800 A1    3/2007  Ha
2009/0010323 A1    1/2009  Su et al.
(Continued)

FOREIGN PATENT DOCUMENTS

| JP | 9-275578 | 10/1997 |
|---|---|---|
| JP | 2009-509454 | 3/2009 |

(Continued)

OTHER PUBLICATIONS

International Search Report dated Jul. 9, 2013 in International Application No. PCT/JP2013/002303.
(Continued)

*Primary Examiner* — Shawn S An
(74) *Attorney, Agent, or Firm* — Wenderoth, Lind & Ponack, L.L.P.

(57) ABSTRACT

The image encoding method includes: generating a reference picture list for determining reference pictures; determining a co-located picture; adding, to the list, a motion vector for each corresponding block that is included in a current picture to be encoded and is adjacent to a current block to be encoded or that is included in the co-located picture and close to the current block; selecting a motion vector predictor from the list; and encoding a difference between a motion vector of the current block encoded using the motion vector of the current block and the motion vector predictor selected. In the encoding, when the current picture
(Continued)

is of a specific picture type, the motion vector is generated for each of all blocks included in the current picture with reference to the reference pictures belonging to a view different from a view to which the current picture belongs.

8 Claims, 52 Drawing Sheets

(56) References Cited

U.S. PATENT DOCUMENTS

| | | | |
|---|---|---|---|
| 2009/0028249 A1 | 1/2009 | Gomila et al. | |
| 2009/0052529 A1 | 2/2009 | Kim et al. | |
| 2009/0067505 A1 | 3/2009 | Tourapis et al. | |
| 2009/0141814 A1 | 6/2009 | Yin et al. | |
| 2009/0168874 A1 | 7/2009 | Su et al. | |
| 2010/0020867 A1 | 1/2010 | Wiegand et al. | |
| 2010/0111183 A1* | 5/2010 | Jeon | H04N 19/597 375/240.16 |
| 2011/0222602 A1* | 9/2011 | Sung | H04N 21/235 375/240.12 |
| 2012/0213288 A1 | 8/2012 | Kitaura et al. | |
| 2013/0003848 A1* | 1/2013 | Sugio | H04N 19/597 375/240.16 |
| 2013/0051472 A1 | 2/2013 | Wiegand et al. | |
| 2013/0242048 A1 | 9/2013 | Yin et al. | |
| 2013/0251034 A1 | 9/2013 | Kim et al. | |
| 2013/0259125 A1 | 10/2013 | Kim et al. | |
| 2014/0146892 A1* | 5/2014 | Sugio | H04N 19/597 375/240.16 |
| 2014/0241433 A1* | 8/2014 | Bosse | H04N 19/00769 375/240.16 |

FOREIGN PATENT DOCUMENTS

| | | |
|---|---|---|
| JP | 2009-522986 | 6/2009 |
| JP | 2009-525683 | 7/2009 |
| JP | 2010-517343 | 5/2010 |
| JP | 2010-135863 | 6/2010 |
| JP | 2011-71903 | 4/2011 |
| JP | 2011-211605 | 10/2011 |
| WO | 2007/035054 | 3/2007 |
| WO | 2007/081926 | 7/2007 |
| WO | 2007/092192 | 8/2007 |
| WO | 2011/048903 | 4/2011 |

OTHER PUBLICATIONS

ITU-T Recommendation H.264, "Advanced video coding for generic audiovisual services", Mar. 2010.

Thomas Wiegand, "WD3: Working Draft 3 of High-Efficiency Video Coding", JCTVC-E603 Joint Collaborative Team on Video Coding (JCT-VC) of ITU-T SG16 WP3 and ISO/IEC JTC1/SC29/WG11 5th Meeting Geneva, CH, Mar. 16-23, 2011.

Sung-Chang Lim et al., "Non-CE9: Simplification on AMVP list construction", Joint Collaborative Team on Video Coding (JCT-VC) of ITU-T SG16 WP3 and IS0/IEC JTC1/SC29/WG11 JCTVC-H0239, ITU-T, (2012), pp. 1-5.

* cited by examiner

| Index | Motion vector |
|---|---|
| 0 | mvA (adjacent block A) |
| 1 | mvB (adjacent block B) |
| 2 | mvCol (co-located block) |
| 3 | Unavailable (adjacent block C) |
| 4 | mvD (adjacent block D) |

List

Case where mvA = mvD

| Index | Motion vector |
|---|---|
| 0 | mvA (adjacent block A) |
| 1 | mvB (adjacent block B) |
| 2 | mvCol (co-located block) |

List

FIG. 42

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 45
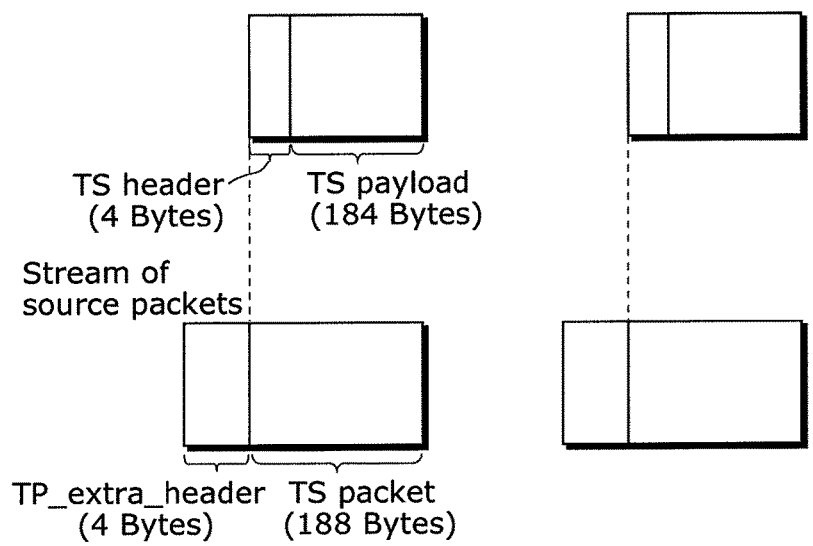
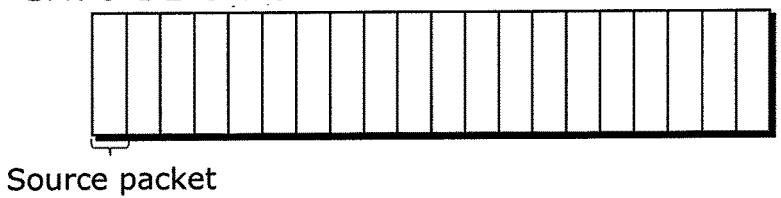

Data structure of PMT

FIG. 53

| Corresponding standard | Driving frequency |
|---|---|
| MPEG-4 AVC | 500 MHz |
| MPEG-2 | 350 MHz |
| ⋮ | ⋮ | ex900 ex1000

IMAGE ENCODING METHOD AND IMAGE DECODING METHOD

TECHNICAL FIELD

The present invention relates to an image encoding method of encoding pictures on a block-by-block basis, an image decoding method, an image encoding apparatus, and an image decoding apparatus.

BACKGROUND ART

An image encoding apparatus according to H.264 (Non Patent Literature (NPL) 1) employed as a video encoding method uses three types of pictures, i.e., "I picture", "P picture", and "B picture", to compress the amount of information.

Here, the use of a motion-vector-predictor specification mode by the image encoding apparatus to encode a motion vector of a current block to be encoded which is included in a B picture or a P picture is under consideration (NPL 2). When the motion-vector-predictor specification mode is used, the image encoding apparatus generates motion-vector-predictor candidates from, for example, blocks adjacent to the current block. Then, the image encoding apparatus selects the motion vector predictor from among the candidates.

CITATION LIST

Non Patent Literature

[NPL 1]
ITU-T Recommendation H.264 "Advanced video coding for generic audiovisual services", March 2010.
[NPL 2]
JCT-VC "WD3: Working Draft 3 of High-Efficiency Video Coding", JCTVC-E603, March 2011.

SUMMARY OF INVENTION

Technical Problem

A conventional motion-vector-predictor specification mode does not take into account the case where a block is encoded with reference to a picture that temporally matches the block.

In view of this, the present invention provides an image encoding method capable of appropriately selecting a motion vector predictor from a list even when a block is likely to be encoded with reference to a picture that temporally matches the block.

Solution to Problem

The image encoding method according to an aspect of the present invention is an image encoding method of encoding a plurality of pictures on a block-by-block basis, the image encoding method including: determining, among the pictures, reference pictures to be used for encoding a current block to be encoded which is included in a current picture to be encoded; determining, among the reference pictures, a first picture to be used for deriving a motion vector predictor used for encoding a motion vector of the current block; adding, to a list, (i) a motion vector of at least one adjacent block spatially adjacent to the current block or (ii) a motion vector of at least one first block that is included in the first picture and located spatially close to the current block; selecting, as the motion vector predictor, one of the motion vectors added to the list; and encoding (i) the current block using the motion vector of the current block and (ii) a difference between the motion vector of the current block and the motion vector predictor selected, wherein, in the encoding, when the current picture is of a specific picture type, the motion vector is generated for each of all blocks included in the current picture with reference to the reference pictures belonging to a view different from a view to which the current picture belongs.

These general and specific aspects may be implemented using a system, a method, an integrated circuit, a computer program, or a computer-readable recording medium such as a CD-ROM, or any combination of systems, methods, integrated circuits, computer programs, or recording media.

Advantageous Effects of Invention

The image encoding method according to the present invention can select a motion vector predictor from a list even when a block is likely to be encoded with reference to a picture that temporally matches the block. Moreover, the motion vector predictor is appropriately generated.

BRIEF DESCRIPTION OF DRAWINGS

FIG. 42 illustrates a structure of multiplexed data.

FIG. 45 shows a structure of TS packets and source packets in the multiplexed data.

FIG. 53 shows an example of a look-up table in which video data standards are associated with driving frequencies.

Figure 1:
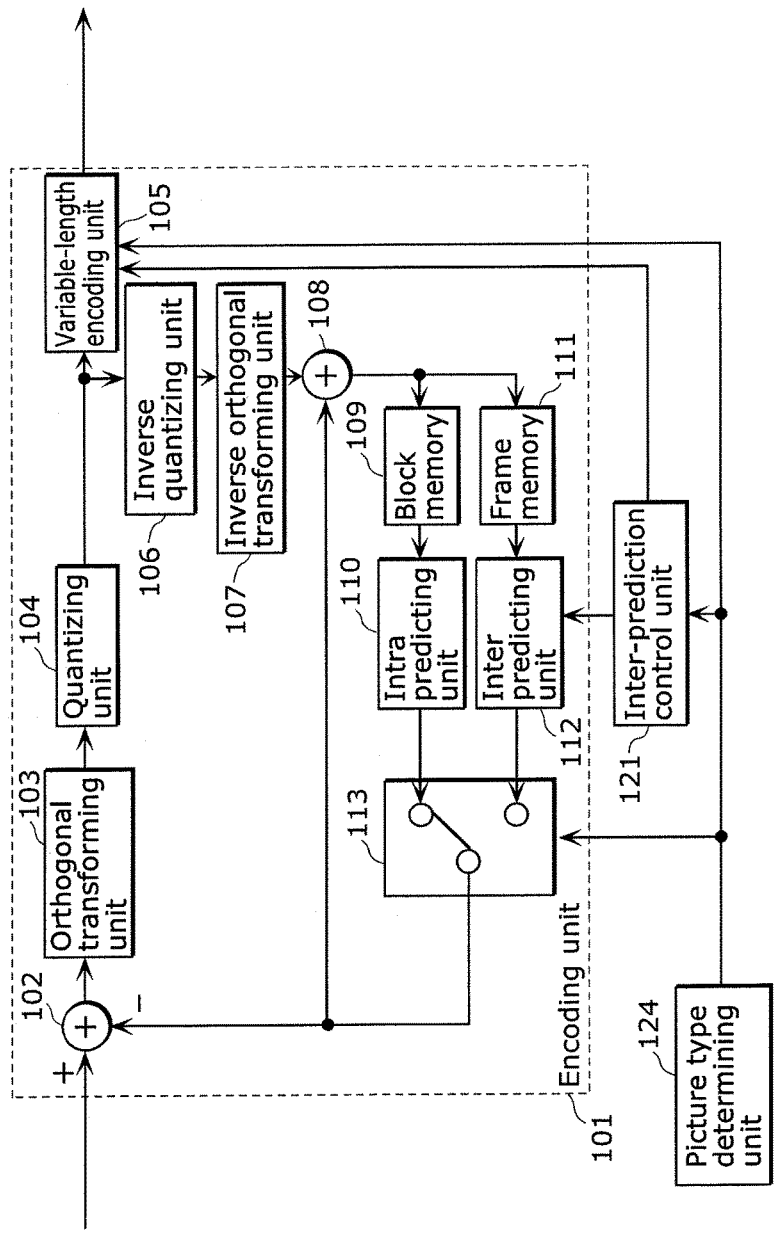
FIG. 1 is a diagram showing a configuration of an image encoding apparatus according to Embodiment 1.

DESCRIPTION OF EMBODIMENTS (Underlying Knowledge Forming Basis of the Present Invention)

In relation to the image encoding method disclosed in the Background Art section, the inventors have found the following problem.

In general, when video is encoded, an image encoding apparatus compresses the amount of information on the video by reducing redundancies of the video in the spatial direction and in the time direction. Here, as a method of reducing the redundancy in the spatial direction, the image encoding apparatus employs intra prediction (also referred to as intra picture prediction). Moreover, as a method of reducing the redundancy in the time direction, the image encoding method employs inter prediction (also referred to as inter picture prediction).

For example, when a current picture to be encoded is encoded according to inter prediction, the image encoding apparatus uses, as a reference picture, a previously-encoded picture that precedes or follows the current picture in display order. Then, the image encoding apparatus derives a motion vector by motion estimation. After this, the image encoding apparatus executes motion compensation using the motion vector to generate prediction image data. Then, the image encoding apparatus removes the redundancy in the time direction by encoding a difference between the generated prediction image data and image data of the current picture.

Moreover, in motion estimation, the image encoding apparatus calculates a difference between a current block to be encoded in the current picture and blocks included in the reference picture. Here, the image encoding apparatus specifies, as a reference block, the block that has the smallest difference among the blocks included in the reference picture. Then, the image encoding apparatus estimates a motion vector using the current block and the reference block.

The image encoding apparatus according to H.264 which is an already-standardized video encoding method (Non Patent Literature 1) uses three types of pictures, i.e., "I picture", "P picture", and "B picture", to compress the amount of information.

The image encoding apparatus according to H.264 encodes an I picture by performing intra prediction. Moreover, the image encoding apparatus encodes a P picture by performing inter prediction. When encoding the P picture, the image encoding apparatus refers to one previously-encoded picture that precedes or follows the current P picture in display order. To be more specific, the image encoding apparatus encodes the P picture using unidirectional prediction.

Furthermore, the image encoding apparatus encodes a B picture by performing inter prediction. When encoding the B picture, the image encoding apparatus refers to two previously-encoded pictures that precede or follow the current B picture in display order. To be more specific, the image encoding apparatus encodes the B picture using bidirectional prediction.

The term "bidirectional prediction" may refer to only the case where image data prediction is performed with reference to one reference picture for each of forward and backward directions. Moreover, the term "bidirectional prediction" may also refer to the case where image data prediction is performed with reference to two reference pictures in either the forward direction or the backward direction. In the latter case, bidirectional prediction may be referred to as "bi-prediction".

The image encoding apparatus generates a reference picture list for specifying a reference picture in inter prediction. In the reference picture list, the image encoding apparatus assigns a reference picture index to a reference picture to be referenced in inter prediction. Here, the image encoding apparatus encodes a B picture with reference to two pictures. Thus, the image encoding apparatus holds two reference picture lists L0 and L1.

Figure 30:
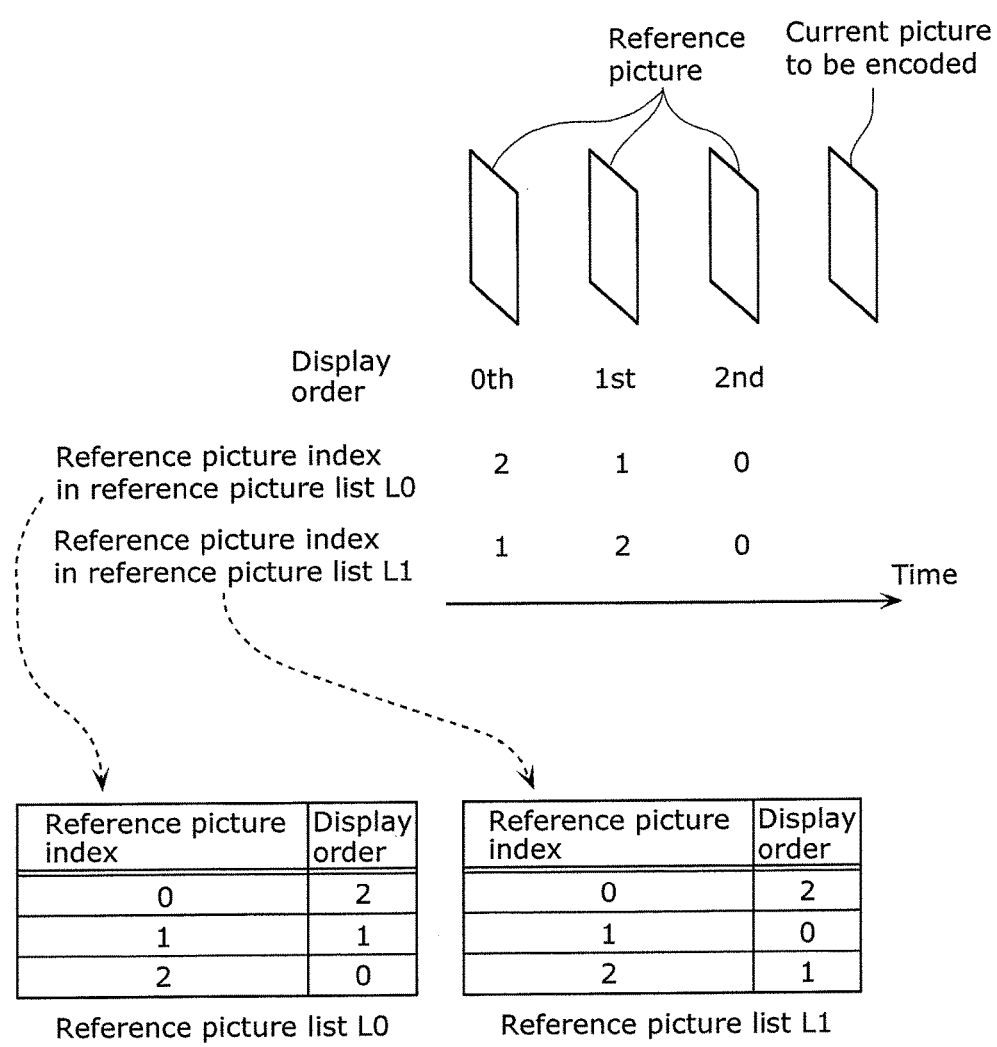
FIG. 30 is a diagram showing reference picture lists according to the related art.

FIG. 30 shows examples of the reference picture lists. The reference picture lists L0 and L1 shown in FIG. 30 are examples of the two reference picture lists used in bidirectional prediction.

In the reference picture list L0, the image encoding apparatus assigns a reference picture index "0" to a 2nd reference picture in display order. Moreover, the image encoding apparatus assigns a reference picture index "1" to a 1st reference picture in display order. Furthermore, the image encoding apparatus assigns a reference picture index "2" to a 0th reference picture in display order. To be more specific, the image encoding apparatus assigns a smaller reference picture index to a picture that is temporally closer, in display order, to the current picture.

On the other hand, in the reference picture list L1, the image encoding apparatus assigns a reference picture index "0" to a 2nd reference picture in display order. Moreover, the image encoding apparatus assigns a reference picture index "2" to a 1st reference picture in display order. Furthermore, the image encoding apparatus assigns a reference picture index "1" to a 0th reference picture in display order.

In this way, the image encoding apparatus may assign the different reference picture indexes to one same reference picture in the different reference picture lists. Moreover, the image encoding apparatus may assign the same reference picture index to one same reference picture in the lists.

Moreover, the reference picture list L0 may correspond to a first prediction direction whereas the reference picture list L1 may correspond to a second prediction direction. Here, each of the first prediction direction and the second prediction direction refers to a respective one of the forward and backward directions, and the first prediction direction and the second prediction direction are different from each other. Typically, the reference picture list L0 is used for specifying a reference picture that precedes the current picture in display order. Thus, the reference picture list L1 is used for specifying a reference picture that follows the current picture in display order.

Furthermore, inter prediction includes encoding modes for predicting image data of the current block. Each of the encoding modes may indicate, in addition to whether the present mode is used for inter prediction or intra prediction, a detailed mode included in corresponding inter prediction or intra prediction. The image encoding apparatus selects one of the encoding modes to be applied for predicting the image data of the current block.

For example, the image encoding apparatus selects, as the encoding mode, bidirectional prediction to generate a prediction image with reference to two pictures that precede or follow the current picture in display order. Alternatively, for example, the image encoding apparatus selects, as the encoding mode, unidirectional prediction to generate a prediction image with reference to one picture that precedes or follows the current picture in display order. Or, the image encoding apparatus selects an encoding mode referred to as a "time direct mode".

Figure 31:
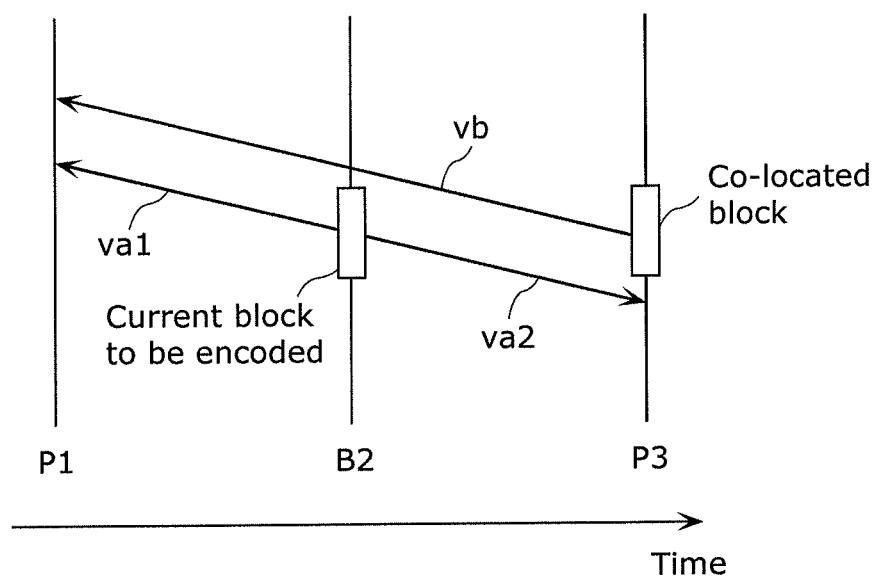
FIG. 31 is a diagram showing a time direct mode according to the related art.

FIG. 31 is a diagram showing the time direct mode. FIG. 31 shows the case where the current block included in a picture B2 is encoded using a motion vector obtained by the time direct mode.

In this case, the image encoding apparatus uses a motion vector vb previously used for encoding a co-located block. The co-located block is included in a picture P3 which is the reference picture that follows the picture B2 in display order. Here, the position of the co-located block matches the position of the current block. The motion vector vb of the co-located block points at a picture P1.

The image encoding apparatus specifies two reference blocks corresponding to the current block from both the picture P1 that is a forward reference picture and the picture P3 that is a backward reference picture, using two motion vectors va1 and va2 parallel to the motion vector vb. Thus, the image encoding apparatus encodes the current block by bidirectional prediction.

More specifically, the image encoding apparatus uses the motion vector va1 and the motion vector va2 for the picture P1 and the picture P3, respectively. Accordingly, the image encoding apparatus specifies the two reference blocks and encodes the current block by bidirectional prediction.

The two motion vectors va1 and va2 are parallel to the motion vector vb. The image encoding apparatus obtains the two motion vectors va1 and va2 by expanding/contracting the motion vector vb, based on ratios of temporal distances among the three pictures P1, B2, and P3.

Here, the use of the motion-vector-predictor specification mode for encoding the motion vector of the current block included in a B picture or a P picture is under consideration (NPL 2). When the motion-vector-predictor specification mode is used, the image encoding apparatus generates motion-vector-predictor candidates from, for example, blocks adjacent to the current block. Then, the image encoding apparatus selects the motion vector predictor from among the candidates.

Then, the image encoding apparatus encodes the motion vector of the current block using the selected motion vector predictor. Moreover, the image encoding apparatus adds the index of the selected motion vector predictor (also referred to as the motion-vector-predictor index) to a bitstream. With this, an image decoding apparatus can select this same motion vector predictor in decoding.

Figure 32:
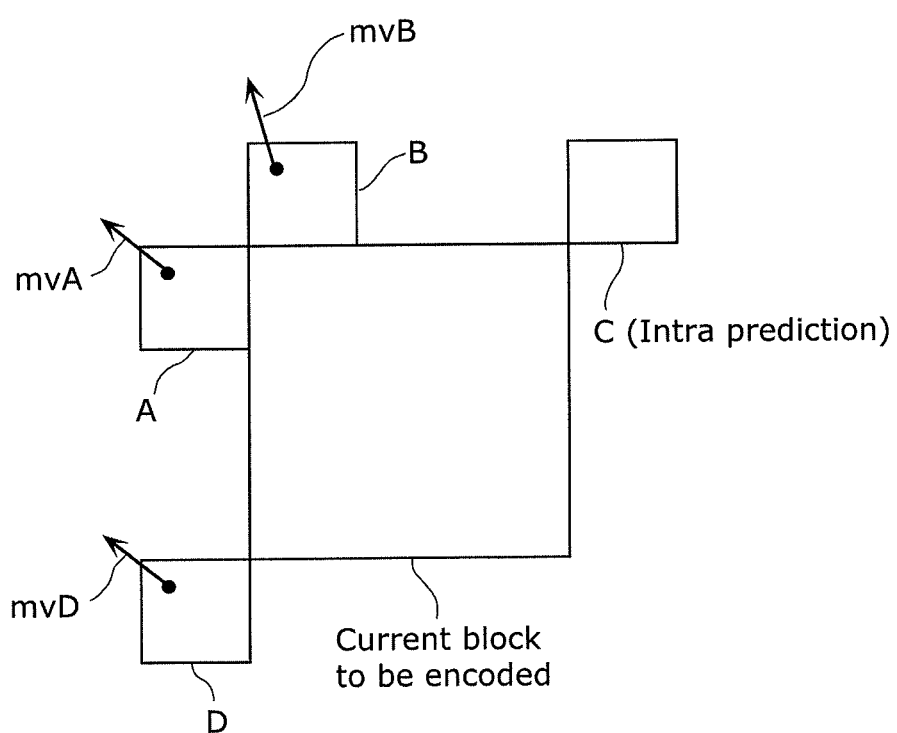
FIG. 32 is a diagram showing a relationship between a current block to be encoded and adjacent blocks according to the related art.

FIG. 32 is a diagram explaining the motion-vector-predictor specification mode and showing a relationship between the current block and adjacent blocks. In FIG. 32, an adjacent block A is an encoded block adjacently located on the left side of the current block. An adjacent block B is an encoded block adjacently located above the current block. An adjacent block C is an encoded block adjacently located on the upper right side of the current block. An adjacent block D is an encoded block adjacently located on the lower left side of the current block.

The adjacent block A has a motion vector mvA, or more specifically, the adjacent block A is previously encoded using the motion vector mvA. The adjacent block B has a motion vector mvB, or more specifically, the adjacent block B is previously encoded using the motion vector mvB. The adjacent block C is previously encoded by intra prediction, or more specifically, the adjacent block C does not have a motion vector. The adjacent block D has a motion vector mvD, or more specifically, the adjacent block D is previously encoded using the motion vector mvD.

The image encoding apparatus selects a motion vector predictor from the motion vectors mvA, mvB, and mvD, for example. Here, the image encoding apparatus may select, as the motion vector predictor, a motion vector obtained by the time direct mode. The motion vector by the time direct mode is obtained from a co-located block corresponding to the current block.

The image encoding apparatus selects the motion vector predictor with which the motion vector of the current block can be encoded most efficiently. For example, the image encoding apparatus selects, as the motion vector predictor, the candidate that is closest to the motion vector of the current block. Then, the image encoding apparatus adds the index representing the selected motion vector predictor to the bitstream.

To be more specific, for example, when encoding the motion vector of the current block, the image encoding apparatus selects the motion vector mvA of the adjacent block A as the motion vector predictor. Then, the image encoding apparatus adds, to the bitstream, the index indicating that the motion vector mvA is used out of the indexes. As a result, the image encoding apparatus can reduce the amount of information on the motion vector of the current block.

Figure 33:
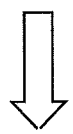
FIG. 33 is a diagram showing a list including motion-vector-predictor candidates according to the related art.

FIG. 33 shows an example of a list including the motion-vector-predictor candidates. The image encoding apparatus deletes, from the list, a candidate that cannot be used (referred to as the "unavailable candidate" hereafter). Moreover, the image encoding apparatus deletes, from the list, a candidate having the same value as another candidate (referred to as the "redundant candidate" hereafter). A decrease in the number of candidates reduces the amount of encoded data of the indexes.

For example, when the adjacent block is previously encoded by intra prediction, this means that this adjacent block does not have a motion vector. Thus, in this case, the image encoding apparatus cannot obtain a motion vector predictor from this adjacent block. On account of this, the image encoding apparatus deletes the candidate corresponding to the adjacent block in this case.

Moreover, when the adjacent block is located outside a slice or outside a picture, the image encoding apparatus cannot obtain a motion vector predictor from this adjacent block. Furthermore, when the adjacent block has yet to be encoded, the image encoding apparatus cannot obtain a motion vector predictor from this adjacent block. In such cases, the image encoding apparatus deletes the candidates of these adjacent blocks from the list.

In the example shown in FIG. 33, since the adjacent block C is previously encoded by intra prediction, the candidate specified by the index "3" is indicated as an unavailable candidate. Thus, the image encoding apparatus deletes this candidate from the list.

Moreover, the motion vector mvD of the adjacent block D is equal to the motion vector mvA of the adjacent block A. Thus, the candidate specified by the index "4" is deleted from the list. As a result, the number of candidates is reduced to three eventually.

Figure 34:
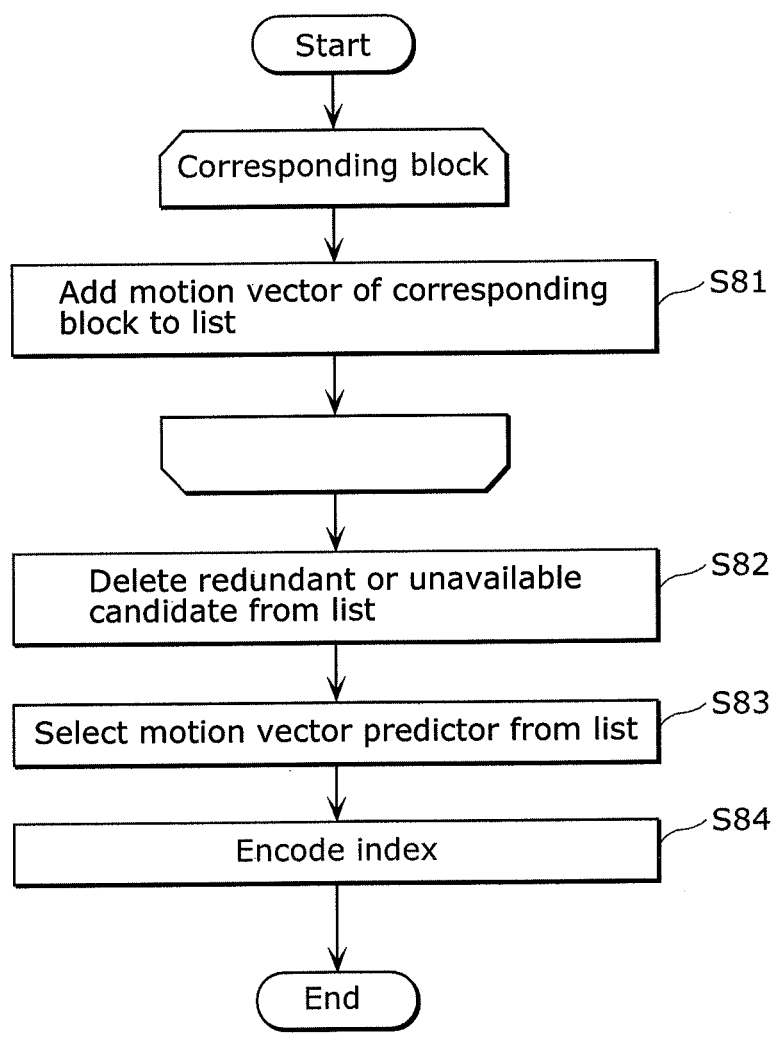
FIG. 34 is a diagram showing an operation performed by an image encoding apparatus according to the related art.

FIG. 34 is a flowchart showing an operation performed by the image encoding apparatus. The image encoding apparatus firstly adds each of the motion vectors of the corresponding blocks to the list (S81). Here, the corresponding block refers to an adjacent block or a co-located block, for example.

Next, the image encoding apparatus deletes a redundant candidate and an unavailable candidate from the list (S82). After this, the image encoding apparatus selects the motion vector predictor from the list (S83). Then, the image encoding apparatus encodes the index corresponding to the selected motion vector predictor. Moreover, the image encoding apparatus encodes a difference between the selected motion vector predictor and the motion vector (S84).

Figure 35:
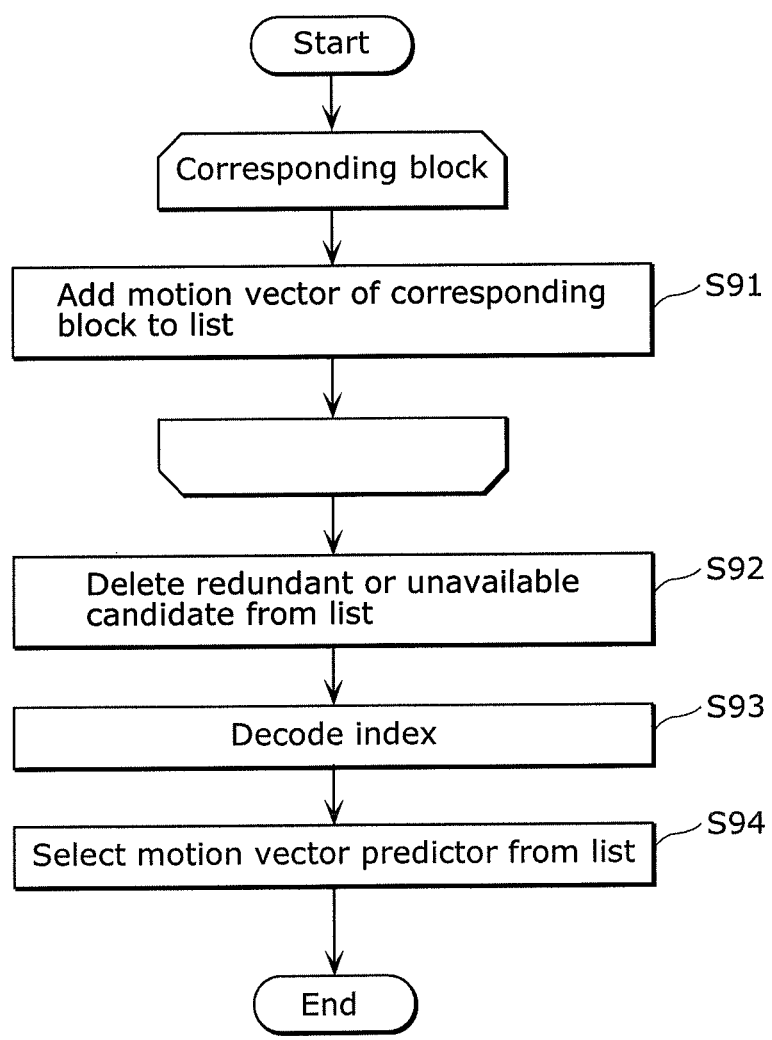
FIG. 35 is a diagram showing an operation performed by an image decoding apparatus according to the related art.

FIG. 35 is a flowchart showing an operation performed by the image decoding apparatus. The image decoding apparatus adds each of the motion vectors of the corresponding blocks to the list (S91).

Next, the image decoding apparatus deletes a redundant candidate and an unavailable candidate from the list (S92). After this, the image decoding apparatus decodes the index and the difference encoded by the image encoding apparatus (S93). The image decoding apparatus selects the motion vector predictor based on the decoded index (S94). Then, the image decoding apparatus reconstructs the motion vector by adding the motion vector predictor to the difference. Moreover, the image decoding apparatus decodes a current block to be decoded, using the reconstructed motion vector.

However, the conventional motion-vector-predictor specification mode does not consider that the current block is to be encoded with reference to a picture that temporally matches the current block. For example, an image encoding apparatus relating to multiview video coding (MVC) may encode a picture in a non-base view with reference to a picture in a base view. Here, the two pictures having a reference relationship (i.e., the picture in the base view and the picture in the non-base view) temporally match each other.

To be more specific, suppose that a co-located block is encoded with reference to a reference picture and that the co-located block and the reference picture belong to views that are different from each other. In such a case, the co-located block is encoded with reference to the reference picture that temporally matches the co-located block.

Here, in this case, since the temporal distance of the motion vector is 0, the image encoding apparatus cannot expand/contract the motion vector based on the temporal distance. This means that the image encoding apparatus cannot obtain the motion vector by the time direct mode. Therefore, when a block is likely to be encoded with reference to a picture that temporally matches the block, the image encoding apparatus needs to switch the operation using a special flag or the like. However, switching the operation using the special flag or the like is inefficient in terms of encoding efficiency.

In view of this, the present invention has an object to provide an image encoding method capable of appropriately selecting a motion vector predictor from a list even when a block is likely to be encoded with reference to a picture that temporally matches the block. Moreover, the present invention has an object to provide an image encoding method capable of appropriately generating a motion vector predictor by defining a picture allowed to reference only to a picture belonging to a different view and by encoding or decoding each of all blocks to be processed in the picture with reference only to the picture belonging to the different view.

In order to solve the aforementioned problem, an image encoding method according to an aspect of the present invention is an image encoding method of encoding a plurality of pictures on a block-by-block basis, the image encoding method including: determining, among the pictures, reference pictures to be used for encoding a current block to be encoded which is included in a current picture to be encoded; determining, among the reference pictures, a first picture to be used for deriving a motion vector predictor used for encoding a motion vector of the current block; adding, to a list, (i) a motion vector of at least one adjacent block spatially adjacent to the current block or (ii) a motion vector of at least one first block that is included in the first picture and located spatially close to the current block; selecting, as the motion vector predictor, one of the motion vectors added to the list; and encoding (i) the current block using the motion vector of the current block and (ii) a difference between the motion vector of the current block and the motion vector predictor selected, wherein, in the encoding, when the current picture is of a specific picture type, the motion vector is generated for each of all blocks included in the current picture with reference to the reference pictures belonging to a view different from a view to which the current picture belongs.

With this, the motion vector predictor is appropriately selected even when a block is likely to be encoded with reference to a picture that temporally matches the block. Moreover, the motion vector predictor can be appropriately generated by defining a picture allowed to reference only to a picture belonging to a different view and by encoding or decoding each of the blocks to be processed in the picture with reference only to the picture belonging to the different view.

For example, in the determining of reference pictures, when the current picture is of the specific picture type, the reference picture list may be generated using only the reference pictures belonging to the view different from the view to which the current picture belongs.

For example, in the determining of reference pictures, (i) when the current picture is of the specific picture type, the reference picture list may be generated using only the reference pictures belonging to the view different from the view to which the current picture belongs, and (ii) when the current picture is not of the specific picture type, the reference picture list may be generated using only the reference pictures belonging to a view which is the same as the view to which the current picture belongs.

For example, in the determining of a first picture, when the current picture is of the specific picture type, a reference picture that is included in the reference pictures and has the same type as the specific picture type may be determined as the first picture.

For example, in the determining of a first picture, (i) when the current picture is of the specific picture type, a reference picture that is included in the reference pictures and has the same picture type as the specific picture type may be determined as the first picture, and (ii) when the current picture is not of the specific picture type, a reference picture that is included in the reference pictures and has a picture type different from the specific picture type may be determined as the first picture.

For example, the specific picture type may include a picture type where each of the blocks included in the current picture is to be encoded using the reference pictures belonging to the view different from the view to which the current picture belongs.

Moreover, an image decoding method according to an aspect of the present invention is an image decoding method of decoding a plurality of pictures on a block-by-block basis, the image decoding method including: determining, among the pictures, reference pictures to be used for decoding a current block to be decoded which is included in a current picture to be decoded; determining, among the reference pictures, a first picture to be used for deriving a motion vector predictor used for decoding a motion vector of the current block; adding, to a list, (i) a motion vector of at least one adjacent block spatially adjacent to the current block or (ii) a motion vector of at least one first block that is included in the first picture and located spatially close to the current block; selecting, as the motion vector predictor, one of the motion vectors added to the list; and decoding a difference between the motion vector of the current block and the motion vector predictor selected, adding the decoded difference to the motion vector predictor to obtain the motion vector of the current block, and decoding the current block using the obtained motion vector, wherein, in the decoding, when the current picture is of a specific picture type, the motion vector is generated for each of all blocks included in the current picture with reference to the reference pictures belonging to a view different from a view to which the current picture belongs.

For example, in the determining of reference pictures, when the current picture is of the specific picture type, the reference picture list may be generated using only the reference pictures belonging to the view different from the view to which the current picture belongs.

For example, in the determining of reference pictures, (i) when the current picture is of the specific picture type, the reference picture list may be generated using only the reference pictures belonging to the view different from the view to which the current picture belongs, and (ii) when the current picture is not of the specific picture type, the reference picture list may be generated using only the reference pictures belonging to a view which is the same as the view to which the current picture belongs.

For example, in the determining of a first picture, when the current picture is of the specific picture type, a reference picture that is included in the reference pictures and has the same type as the specific picture type may be determined as the first picture.

For example, in the determining of a first picture, (i) when the current picture is of the specific picture type, a reference picture that is included in the reference pictures and has the same picture type as the specific picture type may be determined as the first picture, and (ii) when the current picture is not of the specific picture type, a reference picture that is included in the reference pictures and has a picture type different from the specific picture type may be determined as the first picture.

For example, the specific picture type may include a picture type where each of the blocks included in the current picture is to be decoded using the reference pictures belonging to the view different from the view to which the current picture belongs.

These general and specific aspects may be implemented using a system, a method, an integrated circuit, a computer program, or a computer-readable recording medium such as a CD-ROM, or any combination of systems, methods, integrated circuits, computer programs, or recording media.

Each of the embodiments described below shows a general or specific example. The numerical values, shapes, materials, structural elements, the arrangement and connection of the structural elements, steps, the processing order of the steps etc. shown in the following exemplary embodiments are meter examples, and therefore do not limit the scope of the appended Claims and their equivalents. Therefore, among the structural elements in the following exemplary embodiments, structural elements not recited in any one of the independent claims are described as arbitrary structural elements.

(Embodiment 1)

FIG. 1 is a diagram showing a configuration of an image encoding apparatus according to the present embodiment. The image encoding apparatus shown in FIG. 1 includes an encoding unit 101, an inter-prediction control unit 121, and a picture type determining unit 124. Moreover, the encoding unit 101 includes a subtracting unit 102, an orthogonal transforming unit 103, a quantizing unit 104, a variable-length encoding unit 105, an inverse quantizing unit 106, an inverse orthogonal transforming unit 107, an adding unit 108, a block memory 109, an intra predicting unit 110, a frame memory 111, an inter predicting unit 112, and a switch 113.

The subtracting unit 102 subtracts prediction image data from input image data, and outputs prediction error data. The orthogonal transforming unit 103 transforms the prediction error data from the image domain to the frequency domain. The quantizing unit 104 performs quantization on the prediction error data transformed into the frequency domain.

The inverse quantizing unit 106 performs inverse quantization on the prediction error data quantized by the quantizing unit 104. The inverse orthogonal transforming unit 107 transforms the inversely-quantized prediction error data from the frequency domain into the image domain. The adding unit 108 adds the prediction error data to the prediction image data, and outputs reconstructed image data. The block memory 109 stores the reconstructed image data on a block-by-block basis. The frame memory 111 stores the reconstructed image data on a frame-by-frame basis.

The intra predicting unit 110 performs intra prediction using the reconstructed image data stored in the block memory 109 on a block-by-block basis. As a result, the intra predicting unit 110 generates prediction image data on a current block to be encoded. The inter predicting unit 112 performs inter prediction, using the reconstructed image data stored in the frame memory 111 on a frame-by-frame basis and a motion vector derived by motion estimation. As a result, the inter predicting unit 112 generates prediction image data on the current block. The switch 113 switches the encoding mode to the intra prediction mode or to the inter prediction mode.

The picture type determining unit 124 determines a picture type, i.e., I picture, B picture, or P picture, for encoding the input image data, and then generates picture type information.

The inter-prediction control unit 121 selects a motion vector predictor from at least one candidate. The processing performed by the inter-prediction control unit 121 is described in detail later.

The variable-length encoding unit 105 performs variable-length encoding on, for example, the quantized prediction error data, the index indicating the motion vector predictor, a difference between the motion vector predictor and the motion vector (referred to as a motion vector difference or a vector difference), and the picture type information. By doing so, the variable-length encoding unit 105 generates a bitstream.

It should be noted that FIG. 1 is a diagram showing an example of the configuration of the image encoding apparatus according to the present embodiment. A specific configuration is not limited to the configuration shown in FIG. 1. For example, in the case where the picture type is predetermined, the picture type determining unit 124 is not necessary. Moreover, the encoding unit 101 does not need to include a plurality of structural elements. Moreover, the encoding unit 101 may encode an image without executing frequency transform, quantization, inverse frequency transform, inverse quantization, intra prediction, and so forth.

Figure 2:
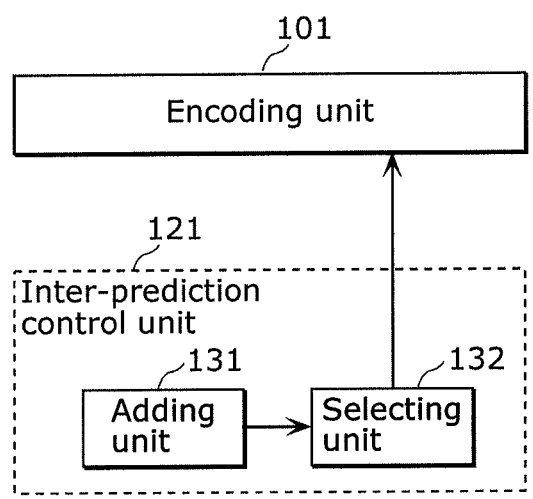
FIG. 2 is a diagram showing main structural elements of the image encoding apparatus according to Embodiment 1.

FIG. 2 is a diagram showing main structural elements of the image encoding apparatus shown in FIG. 1. The image encoding apparatus shown in FIG. 2 includes the encoding unit 101 and the inter-prediction control unit 121. Moreover, the inter-prediction control unit 121 includes an adding unit 131 and a selecting unit 132.

The adding unit 131 selectively adds, for each of at least one corresponding block (a first block), a motion vector of the corresponding block to a list. To be more specific, the adding unit 131 selects, for each of at least one corresponding block, whether or not to add the motion vector of the corresponding block to the list. Then, the adding unit 131 adds, to the list, the motion vector selected to be added. Here, the adding unit 131 may add each of the motion vectors of the corresponding blocks to the list or may add some of the motion vectors of the corresponding blocks to the list.

Here, the corresponding block refers to an adjacent block or a co-located block, for example. To be more specific, the corresponding block may be included in a current picture to be encoded and spatially adjacent to the current block. Moreover, the corresponding block may be included in at least one picture different from the current picture and spatially match the current block.

The selecting unit 132 selects the motion vector predictor from the list. To be more specific, the selecting unit 132 selects, as the motion vector predictor, the motion vector to be used for encoding the motion vector of the current block.

The motion vector of the current block is also referred to as the current motion vector or the present motion vector, as distinguished from the motion vector predictor. Moreover, the motion vector of the corresponding block, the motion vector of the adjacent block, and the motion vector of the co-located block are also referred to as the corresponding motion vector, the adjacent motion vector, and the co-located motion vector, respectively.

The encoding unit 101 encodes the current block using the motion vector of the current block. Moreover, the encoding unit 101 encodes a difference between the motion vector of the current block and the motion vector predictor selected by the selecting unit 132.

Accordingly, the image encoding apparatus can select the motion vector predictor from the list and encode the motion vector using the motion vector predictor.

Figure 3:
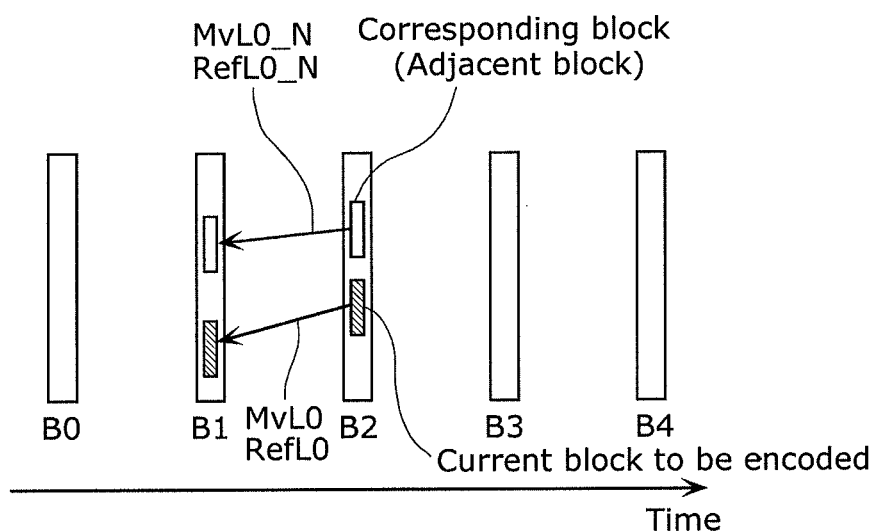
FIG. 3 is a diagram showing motion vectors of an adjacent block according to Embodiment 1.

FIG. 3 is a diagram showing the motion vector of the adjacent block according to the present embodiment. In FIG. 3, pictures B0 to B4 are shown in display order.

A motion vector MvL0 is used for encoding the current block. A reference picture index RefL0 is specified in a reference picture list L0 when the current block is to be encoded.

A motion vector MvL0_N is previously used for encoding the adjacent block. A reference picture index RefL0_N is previously specified in the reference picture list L0 when the adjacent block is encoded.

For example, the adding unit 131 adds the motion vector MvL0_N to the list. Then, the selecting unit 132 selects the motion vector MvL0_N from the list. After this, the encoding unit 101 encodes a difference between the selected motion vector MvL0_N and the motion vector MvL0 of the current block. Moreover, the encoding unit 101 encodes the index indicating the selected motion vector MvL0_N. With this, the encoding efficiency for the motion vector MvL0 is increased.

Figure 4:
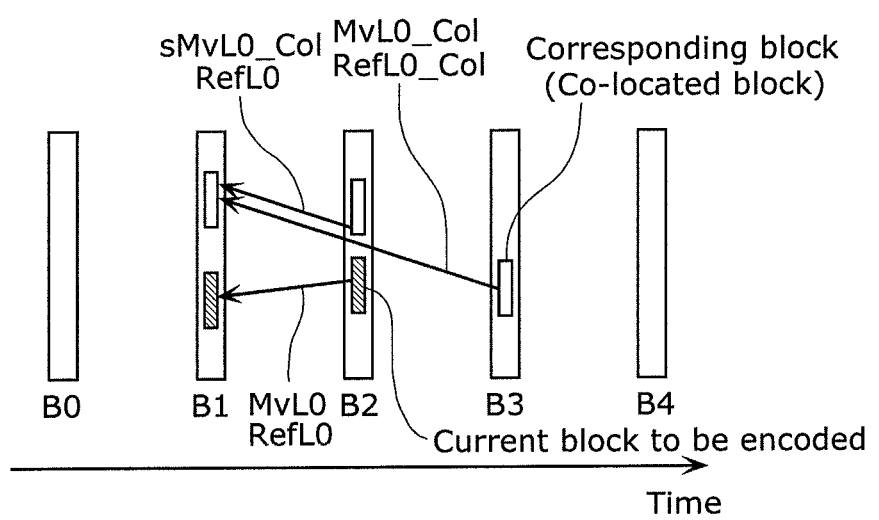
FIG. 4 is a diagram showing a motion vector of a co-located block according to Embodiment 1.

FIG. 4 is a diagram showing the motion vector of the co-located block according to the present embodiment. As in the case shown in FIG. 3, FIG. 4 shows pictures B0 to B4 in display order.

As in the case shown in FIG. 3, a motion vector MvL0 is used for encoding the current block. As in the case shown in FIG. 3, a reference picture index RefL0 is specified in the reference picture list L0 when the current block is to be encoded.

A motion vector MvL0_Col is previously used for encoding the co-located block. A reference picture index RefL0_Col is previously specified in the reference picture list L0 when the co-located block is encoded.

A motion vector sMvL0_Col, is expanded/contracted according to a ratio between the temporal distance from the current block to the reference picture thereof and the temporal distance from the co-located block to the reference picture thereof. Here, the motion vector sMvL0_Col and the motion vector MvL0_Col are parallel to each other. For example, sMvL0_Col is derived according to Equation 1.

$$sMvL0\_Col = MvL0\_Col * (POC(RefL0) - curPOC) / (POC(RefL0\_Col) - colPOC)$$ Equation 1

Here, curPOC represents a picture order count of the current picture, and colPOC represents a picture order count of the picture that includes the co-located block. Moreover, POC(r) represents a picture order count of a reference picture specified by a reference picture index r. Accordingly, the motion vector sMvL0_Col is obtained.

For example, the adding unit 131 obtains the motion vector sMvL0_Col by expanding/contracting the motion vector MvL0_Col. Then, the adding unit 131 adds the motion vector sMvL0_Col to the list. Thus, the selecting unit 132 selects the motion vector sMvL0_Col from the list.

After this, the encoding unit 101 encodes a difference between the selected motion vector sMvL0_Col and the motion vector MvL0 of the current block. Moreover, the encoding unit 101 encodes the index indicating the selected motion vector sMvL0_Col. With this, the encoding efficiency for the motion vector MvL0 is increased.

Figure 5:
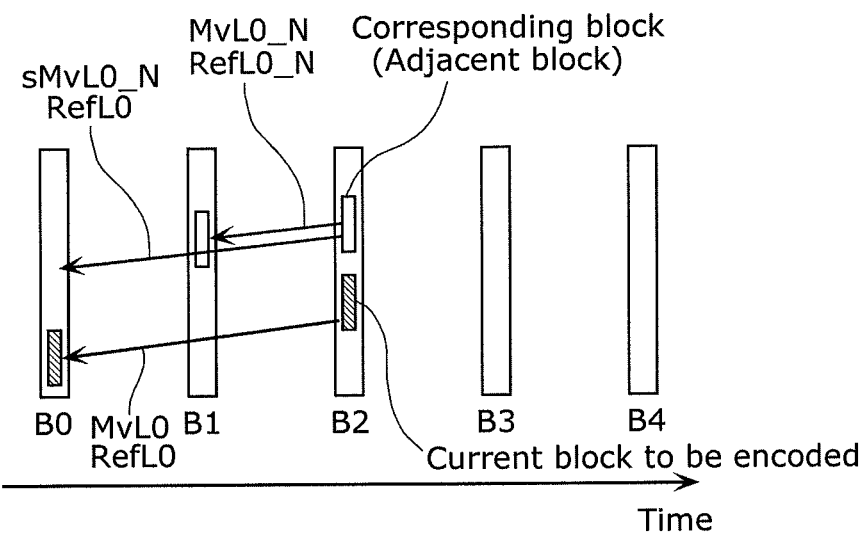
FIG. 5 is a diagram showing a first example of expansion/contraction processing according to Embodiment 1.

FIG. 5 is a diagram showing a first example of expansion/contraction processing according to the present embodiment. The image encoding apparatus according to the present embodiment may expand/contract the motion vector of the adjacent block and use the resulting motion vector as the motion vector predictor, as in the case of the time direct mode. FIG. 5 shows the expansion/contraction processing performed on the motion vector of the adjacent block. In FIG. 5, pictures B0 to B4 are shown in display order as in the case shown in FIG. 3.

As in the case shown in FIG. 3, a motion vector MvL0 is used for encoding the current block. As in the case shown in FIG. 3, a reference picture index Ref L0 is specified in the reference picture list L0 when the current block is to be encoded.

As in the case shown in FIG. 3, a motion vector MvL0_N is previously used for encoding the adjacent block. As in the case shown in FIG. 3, a reference picture index RefL0_N is previously specified in the reference picture list L0 when the adjacent block is encoded.

A motion vector sMvL0_N is expanded/contracted according to a ratio between the temporal distance from the current block to the reference picture thereof and the temporal distance from the adjacent block to the reference picture thereof. Here, the motion vector sMvL0_N and the motion vector MvL0_N are parallel to each other. For example, sMvL0_N is derived according to Equation 2.

$$sMvL0\_N = MvL0\_N * (POC(RefL0) - curPOC) / (POC(RefL0\_N) - curPOC)$$ Equation 2

Here, curPOC represents a picture order count of the current picture, and POC(r) represents a picture order count of a reference picture specified by a reference picture index r. Accordingly, the motion vector sMvL0_N is obtained.

For example, the adding unit 131 obtains the motion vector sMvL0_N by expanding/contracting the motion vector MvL0_N. Then, the adding unit 131 adds the motion vector sMvL0_N to the list. Thus, the selecting unit 132 selects the motion vector sMvL0_N from the list.

After this, the encoding unit 101 encodes a difference between the selected motion vector sMvL0_N and the motion vector MvL0 of the current block. Moreover, the encoding unit 101 encodes the index indicating the selected motion vector sMvL0_N. With this, the encoding efficiency for the motion vector MvL0 is increased.

Figure 6:
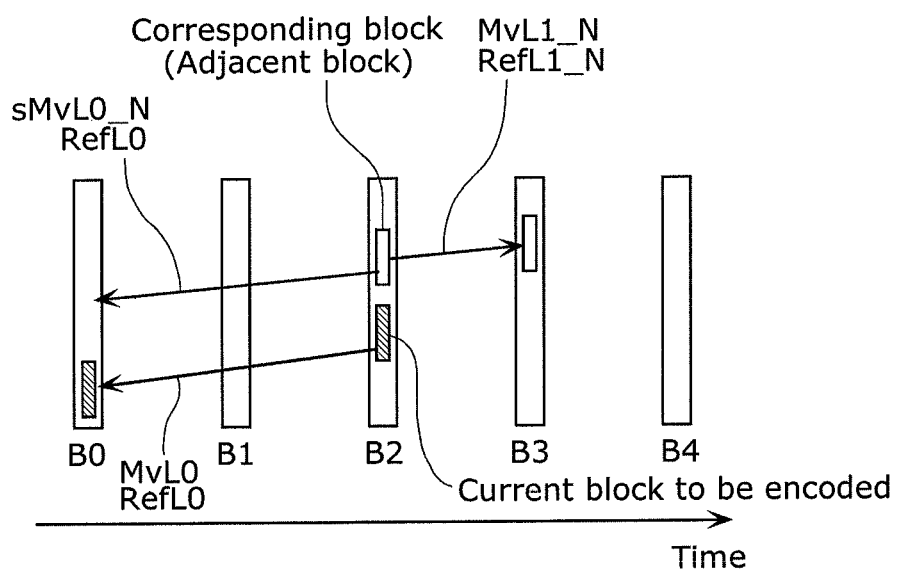
FIG. 6 is a diagram showing a second example of the expansion/contraction processing according to Embodiment 1.

FIG. 6 is a diagram showing a second example of an expansion/contraction processing according to the present embodiment. Each of FIG. 3, FIG. 4, and FIG. 5 shows the example where the reference picture list L0 is used. Here, even when the reference picture list L1 is used, the image encoding apparatus according to the present embodiment can also use the motion vector of the corresponding block as the motion vector predictor.

Moreover, the image encoding apparatus according to the present embodiment may use a motion vector obtained by inter prediction based on the reference picture list L1, as the motion vector predictor by inter prediction based on the reference picture list L0. For example, the image encoding apparatus may use a backward motion vector predictor as a forward motion vector predictor. FIG. 6 shows an example in such a case. In FIG. 6, pictures B0 to B4 are shown in display order as in the case shown in FIG. 3.

As in the case shown in FIG. 3, a motion vector MvL0 is used for encoding the current block. As in the case shown in FIG. 3, a reference picture index RefL0 is specified in the reference picture list L0 when the current block is to be encoded.

A motion vector MvL1_N is previously used for encoding the adjacent block. A reference picture index RefL1_N is previously specified in the reference picture list L1 when the adjacent block is encoded.

A motion vector sMvL0_N is expanded/contracted according to the temporal distance from the current block to the reference picture thereof and the temporal distance from the adjacent block to the reference picture thereof. Here, the motion vector sMvL0_N and the motion vector MvL1_N are parallel to each other. For example, sMvL0_N is derived according to Equation 3.

$$sMvL0\_N = MvL1\_N * (POC(RefL0) - curPOC)/(POC(RefL1\_N) - curPOC) \quad \text{Equation 3}$$

Here, curPOC represents a picture order count of the current picture, and POC(r) represents a picture order count of a reference picture specified by a reference picture index r. Accordingly, the motion vector sMvL0_N is obtained.

Even when the prediction direction is opposite in this way, the image encoding apparatus can expand/contract the motion vector and use the resulting motion vector as the motion vector predictor.

Figure 7:
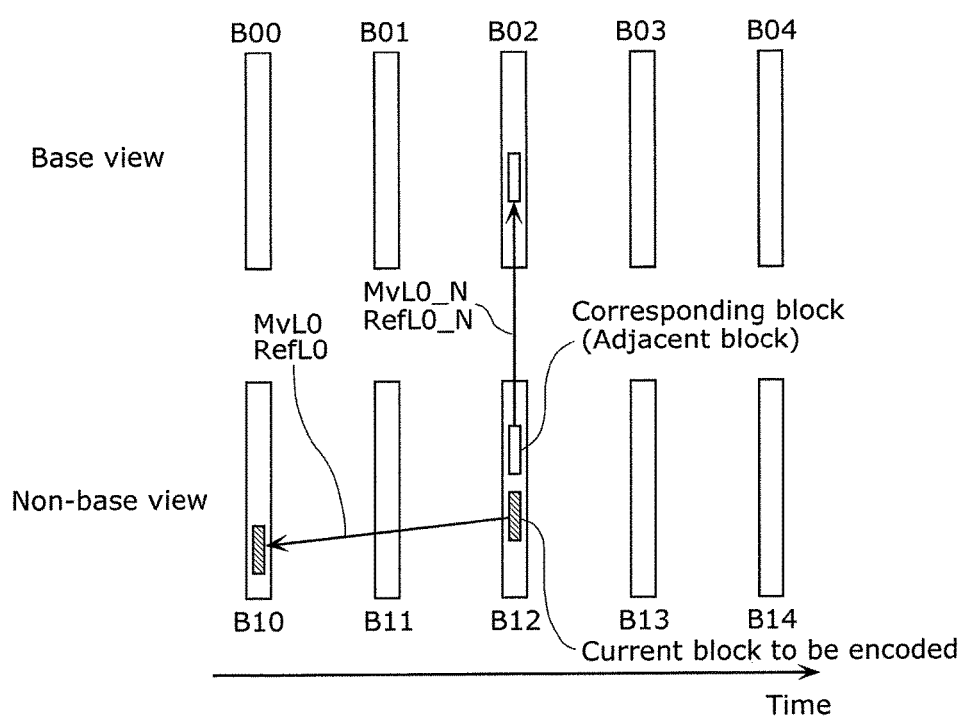
FIG. 7 is a diagram showing a first example of a reference relationship according to Embodiment 1.

FIG. 7 is a diagram showing a first example of a reference relationship according to the present embodiment. FIG. 7 shows two views, or more specifically, a base view and a non-base view. Each of the two views include a plurality of pictures. For example, the two views are two video sequences for different points of view. The image encoding apparatus according to the present embodiment may have the multiview video coding (MVC) function for encoding multiview video.

The image encoding apparatus having the MVC function can encode a picture in the non-base view with reference to a picture in the base view. When the image encoding apparatus encodes the picture in the non-base view with reference to the picture in the base view, the picture order count of the reference picture matches the picture order count of the current picture to be encoded.

In FIG. 7, pictures B00 to B04 in the base view and pictures B10 to B14 in the non-base view are shown in display order.

A motion vector MvL0 is used for encoding the current block. A reference picture index RefL0 is specified in the reference picture list L0 when the current block is to be encoded.

A motion vector MvL0_N is previously used for encoding the adjacent block. A reference picture index RefL0_N is previously specified by the reference picture list L0 when the adjacent block is encoded.

In the example shown in FIG. 7, the temporal distance from the current block to the reference picture thereof is different from the temporal distance from the adjacent block to the reference picture thereof. On this account, the motion vector MvL0_N needs to be expanded/contracted according to Equation 2. However, in the example shown in FIG. 7, the temporal distance from the adjacent block to the reference picture thereof is 0. This means that the denominator in Equation 2 is 0. Therefore, the adding unit 131 cannot expand/contract the motion vector MvL0_N.

In this case, the adding unit 131 does not add, to the list, the motion vector obtained from the adjacent block. Thus, the adding unit 131 does not need to calculate the motion vector predictor from the adjacent block. Moreover, as a result of this, the motion vector of the adjacent block is not selected by the selecting unit 132. Hence, the image encoding apparatus according to the present embodiment can continue the operation without any problem.

Figure 8:
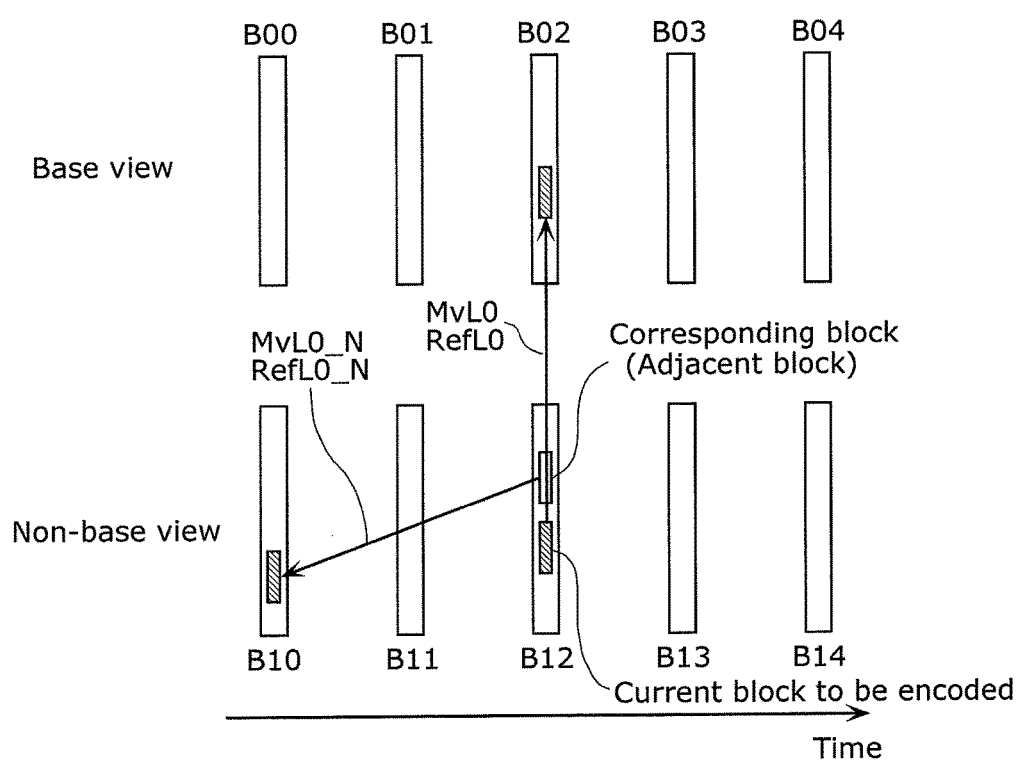
FIG. 8 is a diagram showing a second example of the reference relationship according to Embodiment 1.

FIG. 8 is a diagram showing a second example of the reference relationship according to the present embodiment. As in the case shown in FIG. 7, FIG. 8 shows two views, or more specifically, a base view and a non-base view. Moreover, pictures B00 to B04 in the base view and pictures B10 to B14 in the non-base view are shown in display order.

As in the case shown in FIG. 7, a motion vector MvL0 is used for encoding the current block. As in the case shown in FIG. 7, a reference picture index RefL0 is specified in the reference picture list L0 when the current block is to be encoded.

As in the case shown in FIG. 7, a motion vector MvL0_N is previously used for encoding the adjacent block. As in the case shown in FIG. 7, a reference picture index RefL0_N is previously specified in the reference picture list L0 when the adjacent block is encoded.

In the example shown in FIG. 8, the temporal distance from the current block to the reference picture thereof is different from the temporal distance from the adjacent block to the reference picture thereof. On this account, the motion vector MvL0_N needs to be expanded/contracted according to Equation 2. However, in the example shown in FIG. 8, the temporal distance from the current block to the reference picture thereof is 0. This means that the numerator in Equation 2 is 0. Therefore, the adding unit 131 cannot appropriately expand/contract the motion vector MvL0_N.

In this case, the adding unit 131 does not add, to the list, the motion vector obtained from the adjacent block. Thus, the adding unit 131 does not need to calculate the motion vector predictor from the adjacent block. Moreover, as a result of this, the motion vector of the adjacent block is not selected by the selecting unit 132. Hence, the image encoding apparatus according to the present embodiment can continue the operation without any problem.

Figure 9:
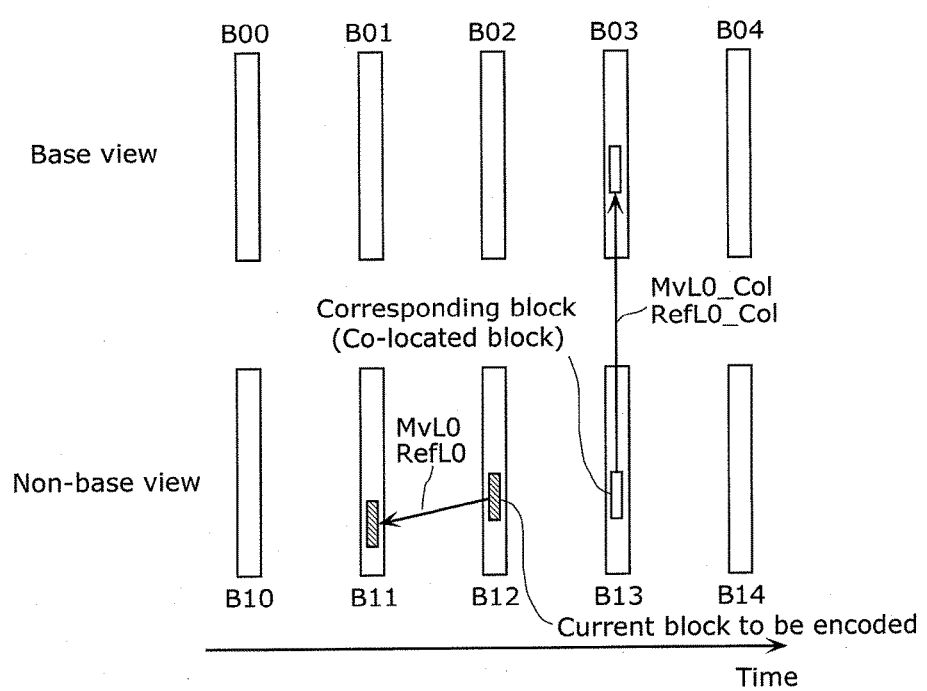
FIG. 9 is a diagram showing a third example of the reference relationship according to Embodiment 1.

FIG. 9 is a diagram showing a third example of the reference relationship according to the present embodiment. As in the case shown in FIG. 7, FIG. 9 shows two views, or more specifically, a base view and a non-base view. Moreover, pictures B00 to B04 in the base view and pictures B10 to B14 in the non-base view are shown in display order.

As in the case shown in FIG. 7, a motion vector MvL0 is used for encoding the current block. As in the case shown in FIG. 7, a reference picture index RefL0 is specified in the reference picture list L0 when the current block is to be encoded.

A motion vector MvL0_Col is previously used for encoding the co-located block. A reference picture index RefL0_Col is previously specified in the reference picture list L0 when the adjacent block is encoded.

In the example shown in FIG. 9, the temporal distance from the current block to the reference picture thereof is different from the temporal distance from the co-located block to the reference picture thereof. On this account, the motion vector MvL0_Col needs to be expanded/contracted according to Equation 1. However, in the example shown in FIG. 9, the temporal distance from the co-located block to the reference picture thereof is 0. This means that the denominator in Equation 1 is 0. Therefore, the adding unit 131 cannot expand/contract the motion vector MvL0_Col.

In this case, the adding unit 131 does not add, to the list, the motion vector obtained from the co-located block. Thus, the adding unit 131 does not need to calculate the motion vector predictor from the co-located block. Moreover, as a result of this, the motion vector of the co-located block is not selected by the selecting unit 132. Hence, the image encoding apparatus according to the present embodiment can continue the operation without any problem.

Figure 10:
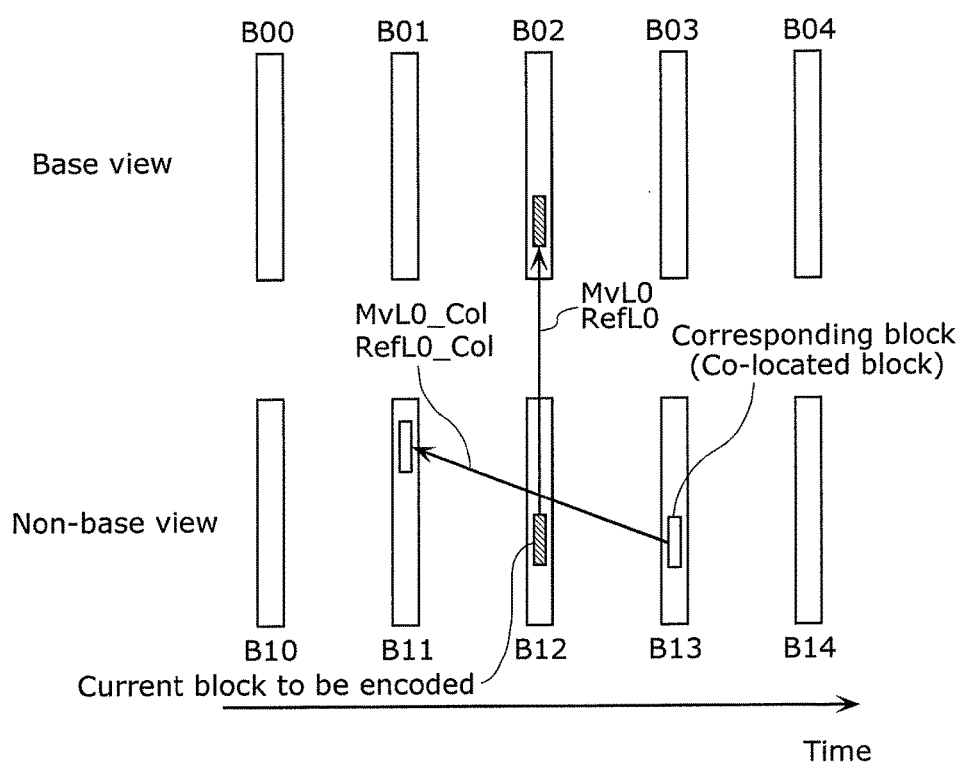
FIG. 10 is a diagram showing a fourth example of the reference relationship according to Embodiment 1.

FIG. 10 is a diagram showing a fourth example of the reference relationship according to the present embodiment. As in the case shown in FIG. 9, FIG. 10 shows two views, or more specifically, a base view and a non-base view. Moreover, pictures B00 to B04 in the base view and pictures B10 to B14 in the non-base view are shown in display order.

As in the case shown in FIG. 9, a motion vector MvL0 is used for encoding the current block. As in the case shown in FIG. 9, a reference picture index RefL0 is specified in the reference picture list L0 when the current block is to be encoded.

As in the case shown in FIG. 9, a motion vector MvL0_Col is previously used for encoding the co-located block. As in the case shown in FIG. 9, a reference picture index RefL0_Col is previously specified in the reference picture list L0 when the co-located block is encoded.

In the example shown in FIG. 10, the temporal distance from the current block to the reference picture thereof is different from the temporal distance from the co-located block to the reference picture thereof. On this account, the motion vector MvL0_Col needs to be expanded/contracted according to Equation 1. However, in the example shown in FIG. 10, the temporal distance from the current block to the reference picture thereof is 0. This means that the numerator in Equation 1 is 0. Therefore, the adding unit 131 cannot appropriately expand/contract the motion vector MvL0_Col.

In this case, the adding unit 131 does not add, to the list, the motion vector obtained from the co-located block. Thus, the adding unit 131 does not need to calculate the motion vector predictor from the co-located block. Moreover, as a result of this, the motion vector of the co-located block is not selected by the selecting unit 132. Hence, the image encoding apparatus according to the present embodiment can continue the operation without any problem.

Each of FIG. 7 to FIG. 10 shows the case where the reference picture list L0 is used. However, the same applies to the case where the reference picture list L1 is used. Moreover, the same applies to the case where the motion vector obtained by inter prediction based on the reference picture list L1 is used as the motion vector predictor by inter prediction based on the reference picture list L0. Furthermore, in each of the examples shown in FIG. 7 to FIG. 10, more than one view is shown. However, not only in the case of MVC, the image encoding apparatus may apply the same processing in the case of a single view as well.

Figure 11:
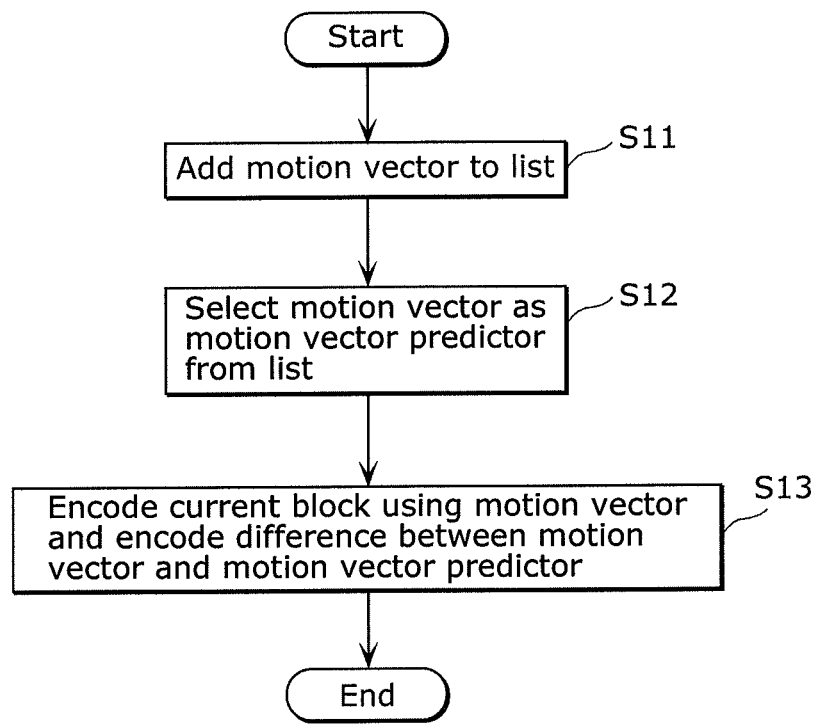
FIG. 11 is a flowchart showing an operation performed by the image encoding apparatus according to Embodiment 1.

FIG. 11 is a flowchart showing an operation performed by the image encoding apparatus shown in FIG. 2. Firstly, the adding unit 131 selectively adds, for each of at least one corresponding block, the motion vector of the corresponding block to the list (S11). Here, the corresponding block refers to: a block that is included in the current picture and spatially adjacent to the current block; or a block that is included in a picture different from the current picture and spatially matches the current block.

(i) The adding unit 131 does not add, for each of at least one corresponding block, the motion vector of the corresponding block to the list when the corresponding block is encoded with reference to the picture temporally matching the corresponding block using the motion vector of the corresponding block. (ii) The adding unit 131 does not add, for each of at least one corresponding block, the motion vector of the corresponding block to the list when the current block is encoded with reference to the picture temporally matching the current block using the motion vector of the current block. The adding unit 131 may apply only one of the two limitations (i) and (ii).

Next, the selecting unit 132 selects, as the motion vector predictor, the motion vector to be used for encoding the motion vector of the current block (S12). Then, the encoding unit 101 encodes the current block using the motion vector of the current block. Moreover, the encoding unit 101 encodes a difference between the motion vector of the current block and the selected motion vector predictor (S13). As a result, the current block and the motion vector are encoded.

Figure 12:
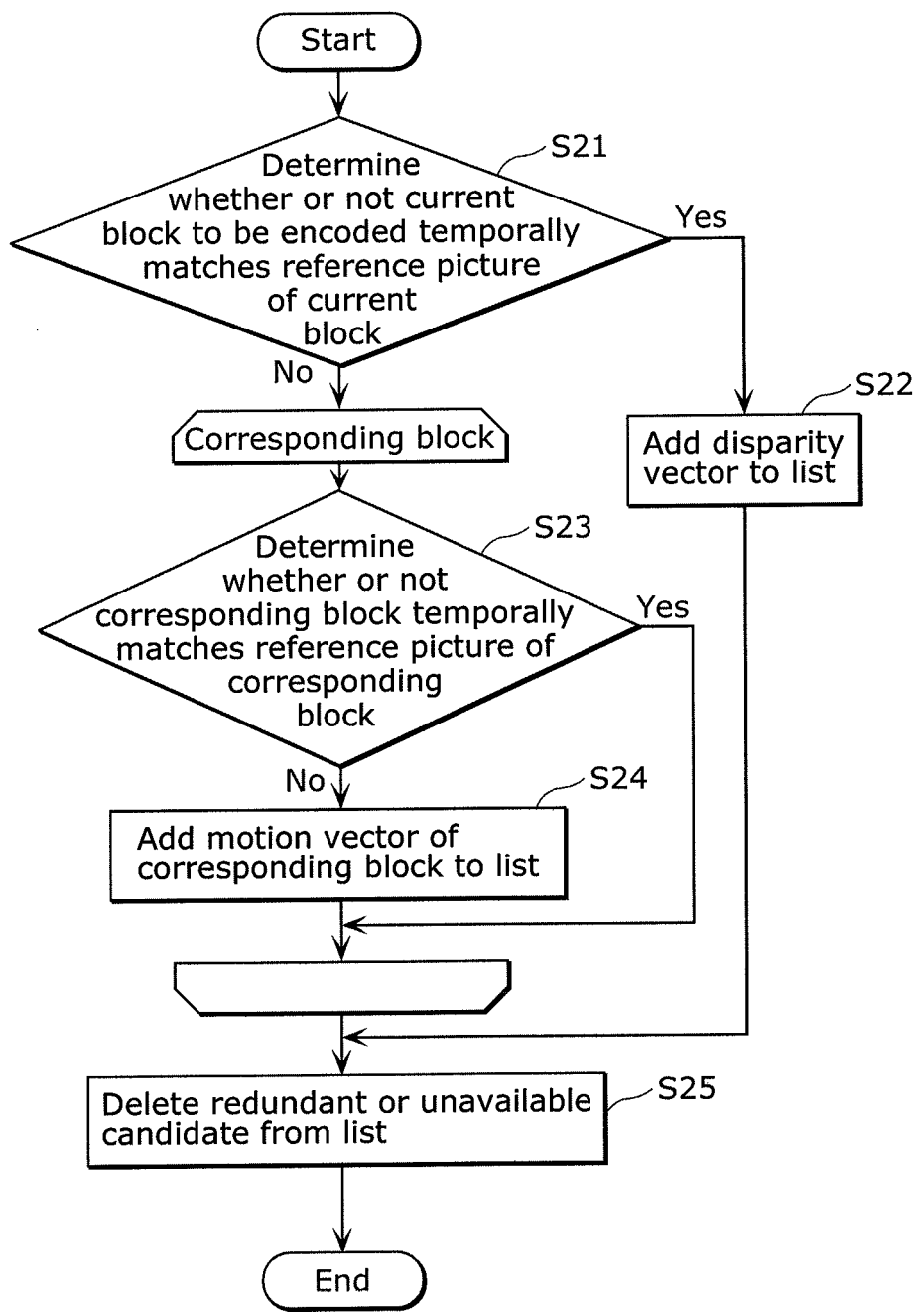
FIG. 12 is a flowchart showing details of the operation performed by the image encoding apparatus according to Embodiment 1.

FIG. 12 is a flowchart showing details of the operation shown in FIG. 11. In FIG. 12, the addition processing (S11) shown in FIG. 11 is specifically described.

Firstly, the adding unit 131 determines whether or not the current block temporally matches the reference block of the current block (S21). When the current block temporally matches the reference block of the current block (Yes in S21), the adding unit 131 adds a disparity vector to the list (S22). The disparity vector refers to a motion vector indicating the magnitude and direction of the disparity. For example, the disparity vector indicates an image disparity between a picture in the base view and a picture in the non-base view.

The adding unit 131 may add, to the list, the disparity vector that is previously used. To be more specific, the adding unit 131 may add, to the list, the motion vector used when the base view is previously referenced. Moreover, the adding unit 131 may calculate the disparity vector to be added to the list, using statistics such as an average of the previously-used disparity vectors.

On the other hand, when the current block does not temporally match the reference block of the current block (No in S21), the adding unit 131 determines for each of at least one corresponding block whether or not the corresponding block temporally matches the reference picture of the corresponding block (S23). When the corresponding block does not temporally match the reference picture of the corresponding block (No in S23), the adding unit 131 adds the motion vector of the corresponding block to the list (S24). In this case, the adding unit 131 may expand/contract the motion vector of the corresponding and add the resulting motion vector to the list.

After this, the adding unit 131 deletes a redundant candidate and an unavailable candidate from the list (S25). As a result, an appropriate list is generated.

Here, the encoding unit 101 may add the disparity vector to the header. For example, the encoding unit 101 may add, to the header of the entire encoded stream, the disparity vector as a sequence parameter set (SPS).

Moreover, the encoding unit 101 may add, to the header of a picture in the encoded stream, the disparity vector as a picture parameter set (PPS). Furthermore, the encoding unit 101 may add, to the header of a slice in the encoded stream, the disparity vector as a slice header.

Moreover, the adding unit 131 may add, to the list, a predetermined vector instead of the disparity vector. Then, the encoding unit 101 may add, to the header of the encoded stream, the predetermined vector as the sequence parameter set, the picture parameter set, or the slice header.

Figure 13:
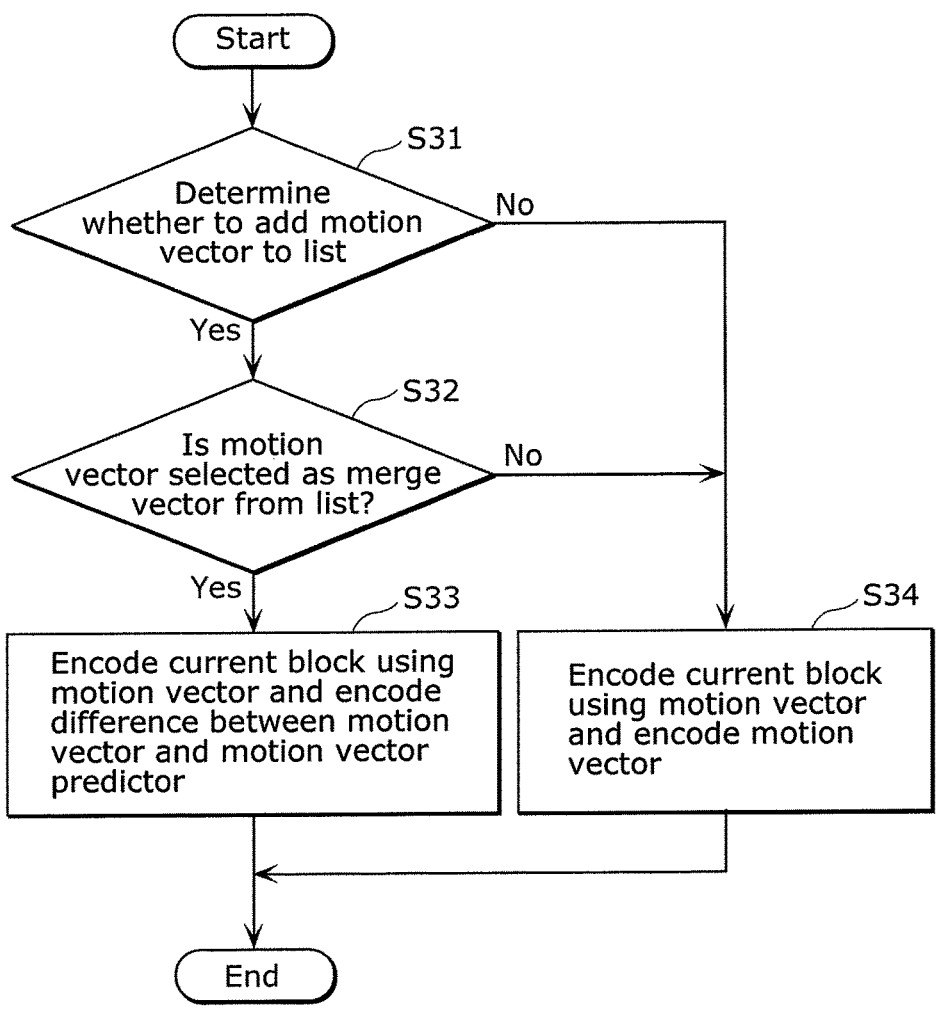
FIG. 13 is a flowchart showing a variation of the operation performed by the image encoding apparatus according to Embodiment 1.

FIG. 13 is a flowchart showing a variation of the operation shown in FIG. 11. Firstly, the adding unit 131 selectively adds, for each of at least one corresponding block, the motion vector of the corresponding block to the list (S31).

When at least one motion vector is added to the list (Yes in S31), the selecting unit 132 determines whether or not to select the motion vector predictor from the list (S32). Here, the selecting unit 132 may or may not select the motion vector predictor. For example, when the list does not include a motion vector close to the motion vector of the current block, the selecting unit 132 may not select the motion vector predictor from the list.

When the motion vector predictor is selected (Yes in S32), the encoding unit 101 encodes the current block using the motion vector of the current block. Moreover, the encoding unit 101 encodes a difference between the motion vector of the current block and the selected motion vector predictor (S33).

When no motion vector is added to the list (No in S31) or when the motion vector predictor is not selected (No in S32), the magnitude of the motion vector predictor is considered to be 0. To be more specific, the difference between the motion vector of the current block and the motion vector predictor is considered to be equal to the motion vector of the current block.

In this case, the encoding unit 101 encodes the current block using the motion vector of the current block, as with the case where the motion vector predictor is selected. On the other hand, the encoding unit 101 encodes, as the difference, the motion vector of the current block (S34). With this, even when no motion vector is added to the list (No in S31) or even when the motion vector predictor is not selected (No in S32), the image encoding apparatus can continue the operation without any problem.

Note that, when no motion vector is added to the list (No in S31) or when the motion vector predictor is not selected (No in S32), the motion vector predictor may be considered as a predetermined motion vector.

As described thus far, even when the block is likely to be encoded with reference to the picture that temporally matches the block, the image encoding apparatus can appropriately select the motion vector predictor from the list. In the above, the image encoding apparatus has been described. However, an image decoding apparatus can also appropriately select the motion vector predictor from the list by the same procedure described above.

Figure 14:
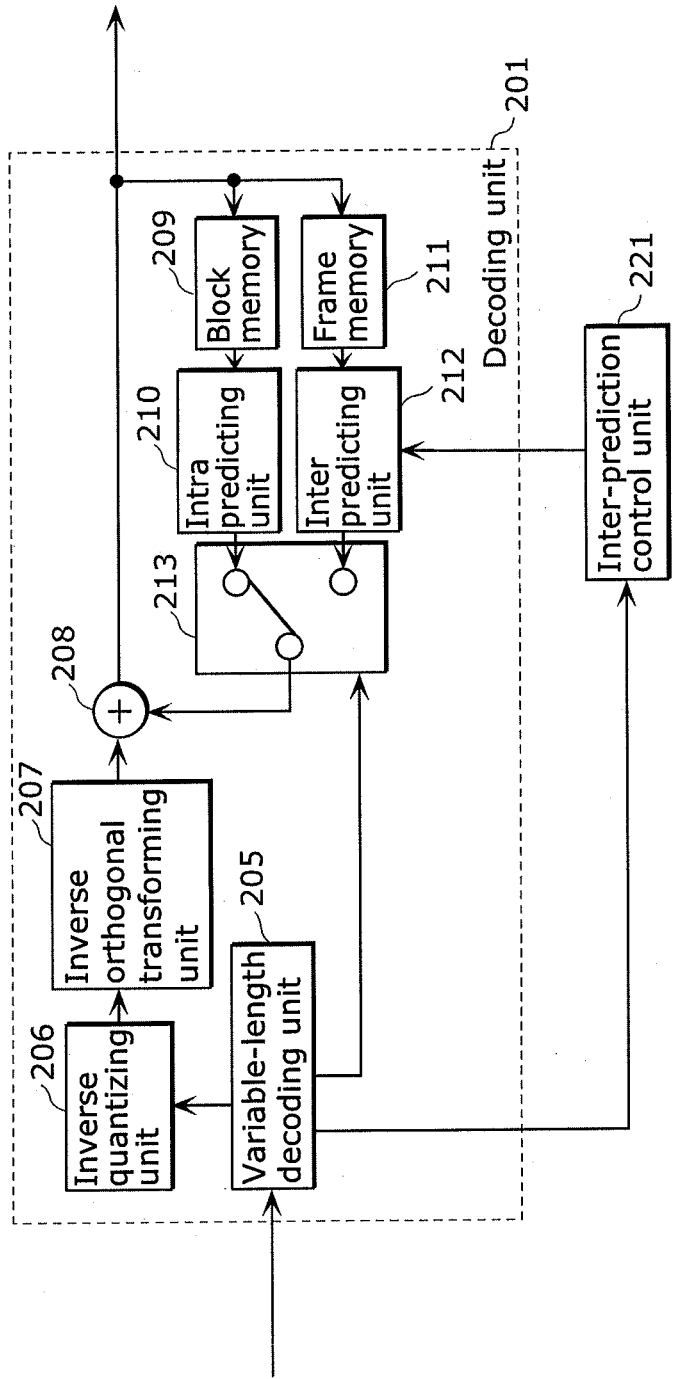
FIG. 14 is a diagram showing a configuration of an image decoding apparatus according to Embodiment 1.

FIG. 14 is a diagram showing a configuration of an image decoding apparatus according to the present embodiment. The image decoding apparatus shown in FIG. 14 includes a decoding unit 201 and an inter-prediction control unit 221. Moreover, the decoding unit 201 includes a variable-length decoding unit 205, an inverse quantizing unit 206, an inverse orthogonal transforming unit 207, an adding unit 208, a block memory 209, an intra predicting unit 210, a frame memory 211, an inter predicting unit 212, and a switch 213.

The variable-length decoding unit 205 performs variable-length decoding on an input bitstream to generate, for example, picture type information, a motion-vector-predictor index, and prediction error data. The inverse quantizing unit 206 performs inverse quantization on the prediction error data. The inverse orthogonal transformation unit 207 transforms the inversely-quantized prediction error data, from the frequency domain into the image domain. The adding unit 208 adds the prediction image data to the prediction error data to generate the decoded image data.

The block memory 209 stores the decoded image data on a block-by-block basis. The frame memory 209 stores the decoded image data on a frame-by-frame basis.

The intra predicting unit 210 generates prediction image data of a current block to be decoded, by performing intra prediction using the decoded image data stored in the block memory on the block-by-block basis. The inter predicting unit 212 generates prediction image data of the current block by performing inter prediction using the decoded image data stored in the frame memory on the frame-by-frame basis. The switch 213 switches the encoding mode to the intra prediction mode or to the inter prediction mode.

The inter-prediction control unit 221 selects the motion vector predictor from the list. The processing performed by the inter-prediction control unit 221 is the same as the processing performed by the inter-prediction control unit 121 on the encoding side. To be more specific, the inter-prediction control unit 221 is implemented by changing the parts described as "encoding" in the encoding operation explained above into "decoding". Here, the inter-prediction control unit 221 selects the motion vector predictor from the list using the index decoded by the variable-length decoding unit 205.

It should be noted that FIG. 14 is a diagram showing an example of the configuration of the image decoding apparatus according to the present embodiment. A specific configuration is not limited to the configuration shown in FIG. 14. For example, the decoding unit 201 does not need to include a plurality of structural elements. Moreover, the decoding unit 201 may decode an image without executing inverse frequency transform, inverse quantization, intra prediction, and so forth.

Figure 15:
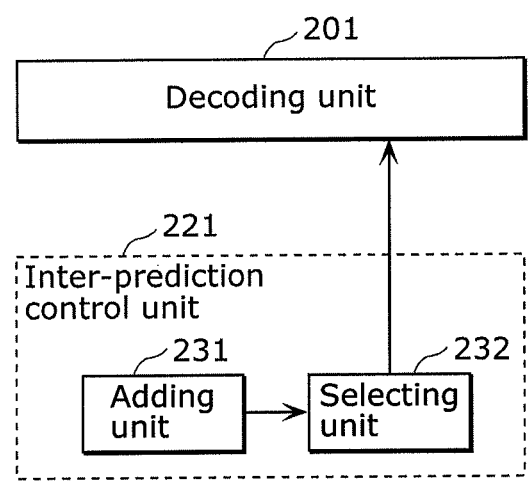
FIG. 15 is a diagram showing main structural elements of the image decoding apparatus according to Embodiment 1.

FIG. 15 is a diagram showing main structural elements of the image decoding apparatus shown in FIG. 14. The image decoding apparatus shown in FIG. 15 includes the decoding unit 201 and the inter-prediction control unit 221. Moreover, the inter-prediction control unit 221 includes an adding unit 231 and a selecting unit 232.

The adding unit 231 selectively adds, for each of at least one corresponding block, a motion vector of the corresponding block to a list. To be more specific, the adding unit 231 selects, for each of at least one corresponding block, whether or not to add the motion vector of the corresponding block to the list. Then, the adding unit 231 adds, to the list, the motion vector selected to be added. Here, the adding unit 131 may add each of the motion vectors of the corresponding blocks to the list or may add some of the motion vectors of the corresponding blocks to the list.

Here, the corresponding block refers to an adjacent block or a co-located block, for example. To be more specific, the corresponding block may be included in a current picture to be decoded and spatially adjacent to the current block. Moreover, the corresponding block may be included in at least one picture different from the current picture and spatially match the current block.

The selecting unit 232 selects the motion vector predictor from the list. To be more specific, the selecting unit 232 selects, as the motion vector predictor, the motion vector to be used for decoding the motion vector of the current block. The motion vector of the current block is also referred to as the current motion vector or the present motion vector, as distinguished from the motion vector predictor.

The decoding unit 201 decodes a difference between the motion vector of the current block and the motion vector predictor selected by the selecting unit 232. Next, the decoding unit 201 obtains the motion vector of the current block by adding the decoded difference to the motion vector selected by the selecting unit. Then, the decoding unit 201 decodes the current block using the motion vector of the current block.

Accordingly, the image decoding apparatus can select the motion vector predictor from the list and decode the motion vector using the motion vector predictor.

Figure 16:
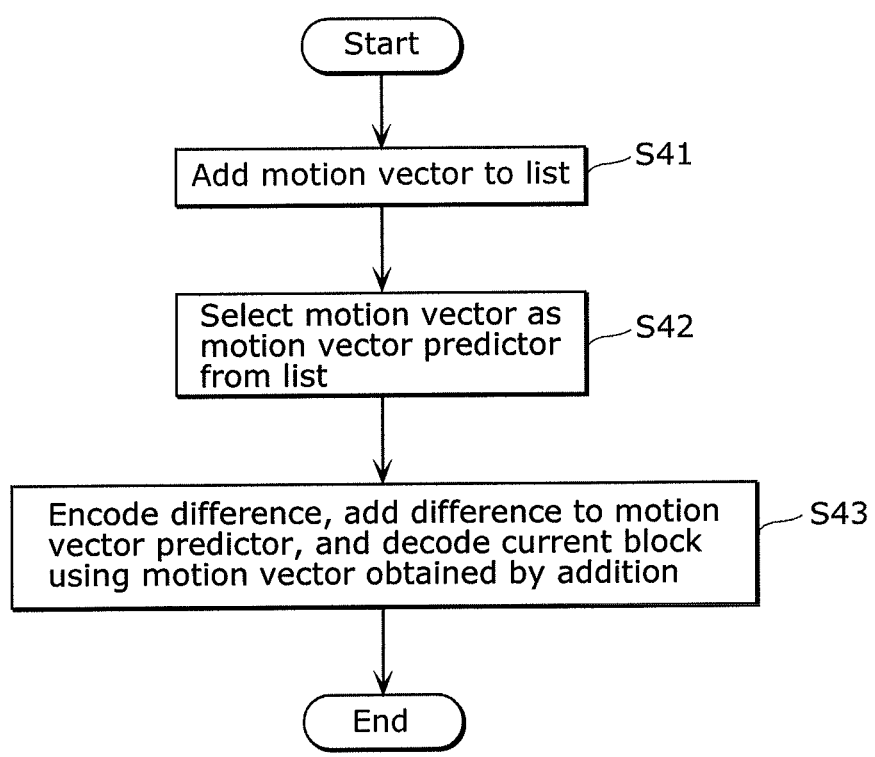
FIG. 16 is a flowchart showing an operation performed by the image decoding apparatus according to Embodiment 1.

FIG. 16 is a flowchart showing an operation performed by the image decoding apparatus shown in FIG. 15. Firstly, the adding unit 231 selectively adds, for each of at least one corresponding block, the motion vector of the corresponding block to the list (S41). Here, the corresponding block refers to: a block that is included in the current picture and spatially adjacent to the current block; or a block that is included in a picture different from the current picture and spatially match the current block.

(i) The adding unit 231 does not add, for each of at least one corresponding block, the motion vector of the corresponding block to the list when the corresponding block is decoded with reference to the picture temporally matching the corresponding block using the motion vector of the corresponding block. (ii) The adding unit 231 does not add, for each of at least one corresponding block, the motion vector of the corresponding block to the list when the current block is decoded with reference to the picture temporally matching the current block using the motion vector of the current block. The adding unit 231 may apply only one of the two limitations (i) and (ii).

Next, the selecting unit 232 selects, as the motion vector predictor, the motion vector to be used for decoding the motion vector of the current block (S42).

Then, the decoding unit 201 decodes a difference between the motion vector of the current block and the motion vector predictor selected by the selecting unit 232. Moreover, the decoding unit 201 obtains the motion vector of the current block by adding the decoded difference to the motion vector selected by the selecting unit 232. Following this, the decoding unit 201 decodes the current block using the motion vector of the current block (S43). As a result, the current block is decoded.

Figure 17:
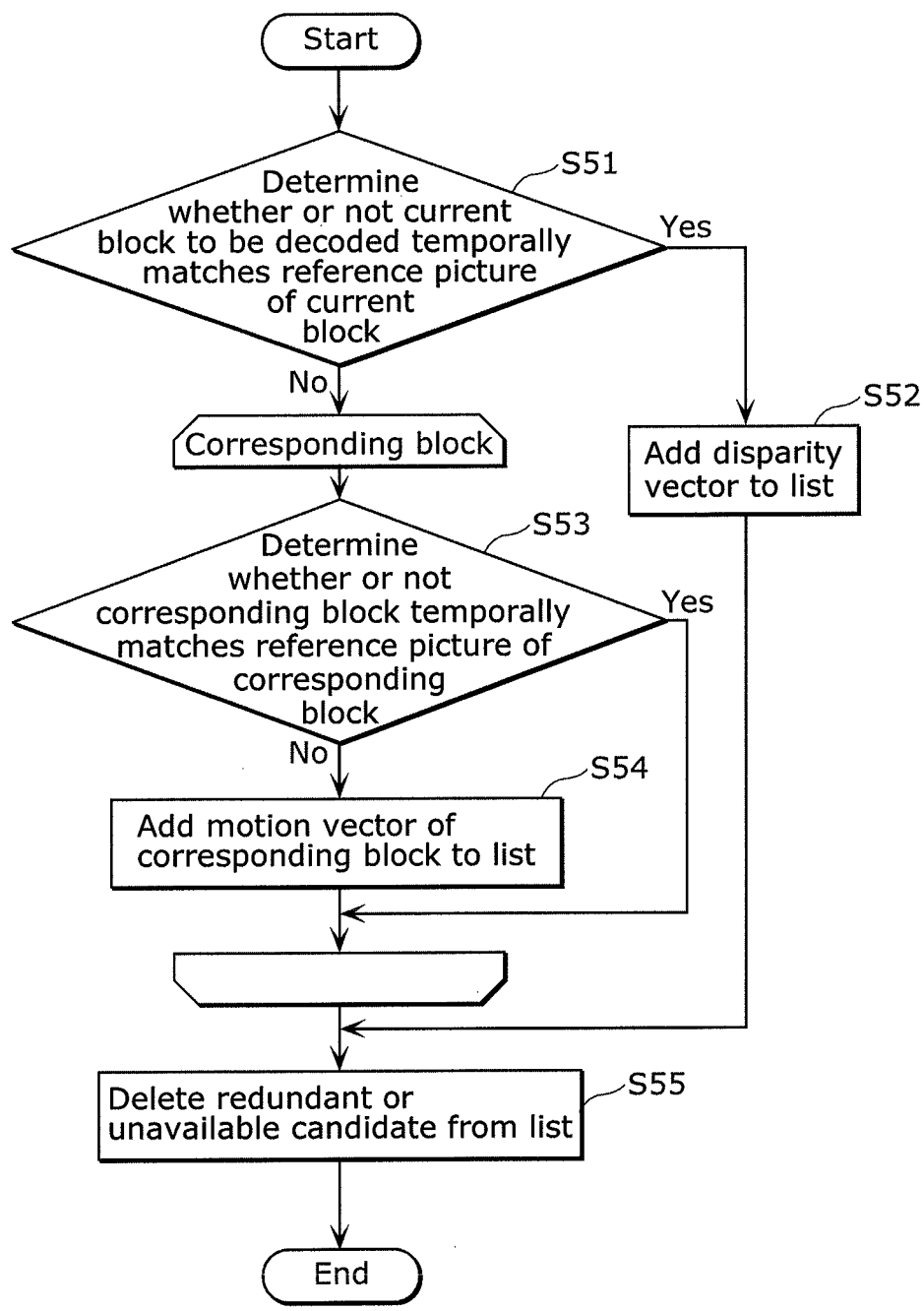
FIG. 17 is a flowchart showing details of the operation performed by the image decoding apparatus according to Embodiment 1.

FIG. 17 is a flowchart showing details of the operation shown in FIG. 16. In FIG. 17, the addition processing (S41) shown in FIG. 16 is specifically described.

Firstly, the adding unit 231 determines whether or not the current block temporally matches the reference block of the current block (S51). When the current block temporally matches the reference block of the current block (Yes in S51), the adding unit 231 adds a disparity vector to the list (S52).

The adding unit 231 may add, to the list, the disparity vector that is previously used. To be more specific, the adding unit 231 may add, to the list, the motion vector used when the base view is previously referenced. Moreover, the adding unit 231 may calculate the disparity vector to be added to the list, using statistics such as an average of the previously-used disparity vectors.

On the other hand, when the current block does not temporally match the reference block of the current block (No in S51), the adding unit 231 determines for each of at least one corresponding block whether or not the corresponding block temporally matches the reference picture of the corresponding block (S53). When the corresponding block does not temporally match the reference picture of the corresponding block (No in S53), the adding unit 231 adds the motion vector of the corresponding block to the list (S54). In this case, the adding unit 231 may expand/contract the motion vector of the corresponding and add the resulting motion vector to the list.

After this, the adding unit 231 deletes a redundant candidate and an unavailable candidate from the list (S55). As a result, an appropriate list is generated.

Here, the decoding unit 201 may obtain the disparity vector added to the header included in the encoded stream. For example, the decoding unit 201 may obtain the disparity vector from the sequence parameter set that is the header of the entire encoded stream. Moreover, the decoding unit 201 may obtain the disparity vector from the picture parameter set that is the header of a picture included in the encoded stream. Furthermore, the decoding unit 201 may obtain the disparity vector from the slice header that is the header of a slice included in the encoded stream.

Moreover, the adding unit 231 may add, to the list, a predetermined vector instead of the disparity vector. Then, the decoding unit 201 may obtain the predetermined vector from the header (such as the sequence parameter set, the picture parameter set, or the slice header) of the encoded stream.

Figure 18:
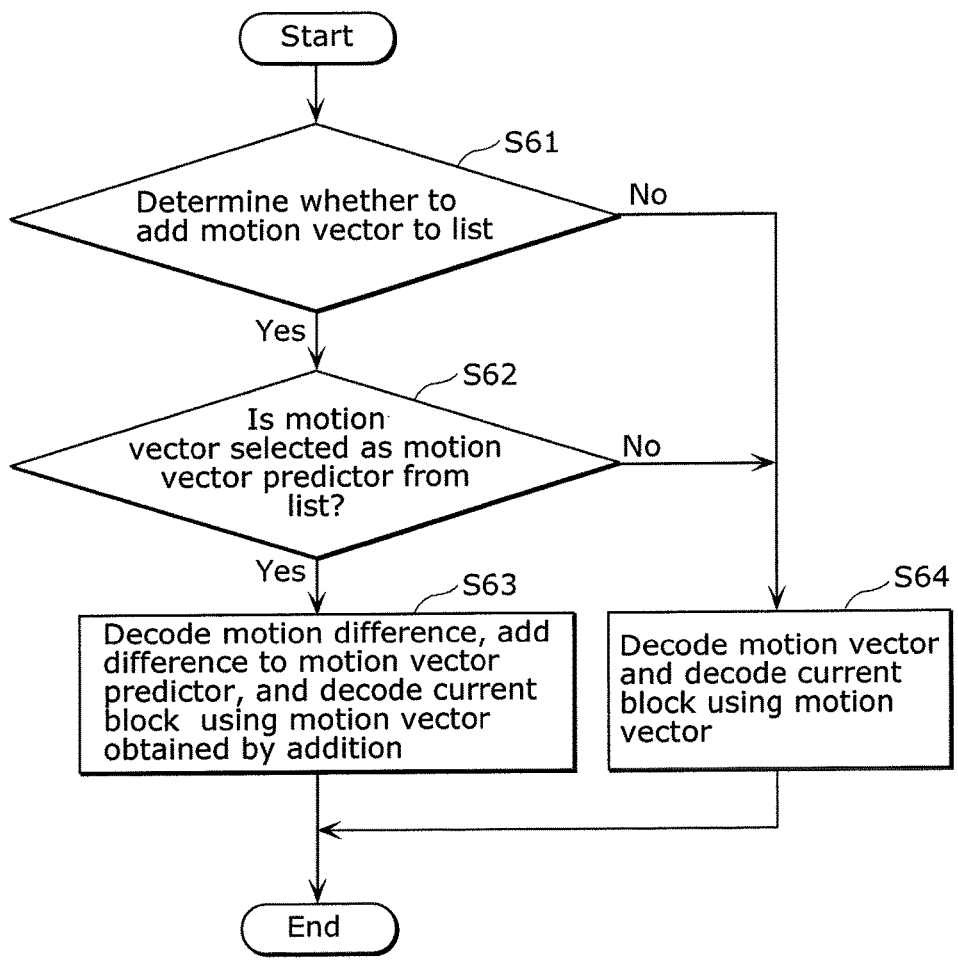
FIG. 18 is a flowchart showing a variation of the operation performed by the image decoding apparatus according to Embodiment 1.

FIG. 18 is a flowchart showing a variation of the operation shown in FIG. 16. Firstly, the adding unit 231 selectively adds, for each of at least one corresponding block, the motion vector of the corresponding block to the list (S61).

When at least one motion vector is added to the list (Yes in S61), the selecting unit 232 determines whether or not to select the motion vector predictor from the list (S62). For example, when an index indicating the motion vector predictor is not encoded, or more specifically, when no index is present in the encoded stream, the selecting unit 232 does not select the motion vector predictor from the list.

When the motion vector predictor is selected (Yes in S62), the decoding unit 201 decodes a difference between the motion vector of the current block and the motion vector predictor selected by the selecting unit 232. Moreover, the decoding unit 201 obtains the motion vector of the current block by adding the decoded difference to the motion vector selected by the selecting unit 232. Then, the decoding unit 201 decodes the current block using the motion vector of the current block (S63).

When no motion vector is added to the list (No in S61) or when the motion vector predictor is not selected (No in S62), the magnitude of the motion vector predictor is considered to be 0. To be more specific, the difference between the motion vector of the current block and the motion vector predictor is considered to be equal to the motion vector of the current block.

In this case, the decoding unit 201 decodes, as the difference, the motion vector of the current block. Then, the decoding unit decodes the current block using the decoded motion vector (S64). With this, even when no motion vector is added to the list (No in S61) or even when the motion vector predictor is not selected (No in S62), the image decoding apparatus can continue the operation without any problem.

Note that, when no motion vector is added to the list (No in S61) or when the motion vector predictor is not selected (No in S62), the motion vector predictor may be considered as a predetermined motion vector.

As described thus far, even when the block is likely to be decoded with reference to the picture that temporally matches the block, the image decoding apparatus can appropriately select the motion vector predictor from the list.

In the above, the motion vector of the corresponding block is added to the list. However, an average value, a median value, and the like of the motion vectors of the corresponding blocks may be added to the list. In this case, each of the adding unit 131 of the image encoding apparatus and the adding unit 231 of the image decoding apparatus calculates the average value, the median value, and the like and adds the calculated values to the list. Each of the adding units 131 and 231 may calculate the average value, the median value, and the like of the motion vectors, from the corresponding blocks other than the corresponding block temporally matching the reference picture thereof.

Moreover, in the above, when the current block to be processed (the current block to be encoded or the current block to be decoded) temporally matches the reference picture of the current block, adding the motion vector of the corresponding block to the list is limited. Or, when the corresponding block temporally matches the reference picture of the corresponding block, adding the motion vector of the corresponding block to the list is limited.

However, when the current block temporally matches the reference picture of the current block and the corresponding block temporally matches the reference picture of the corresponding block, the motion vector of the corresponding block does not need to be expanded/contracted. Therefore, in this case, the adding unit 131 of the image encoding apparatus and the adding unit 231 of the image decoding apparatus may add the motion vector of the corresponding block as it is to the list. A specific example of such a case is described as follows.

Figure 19:
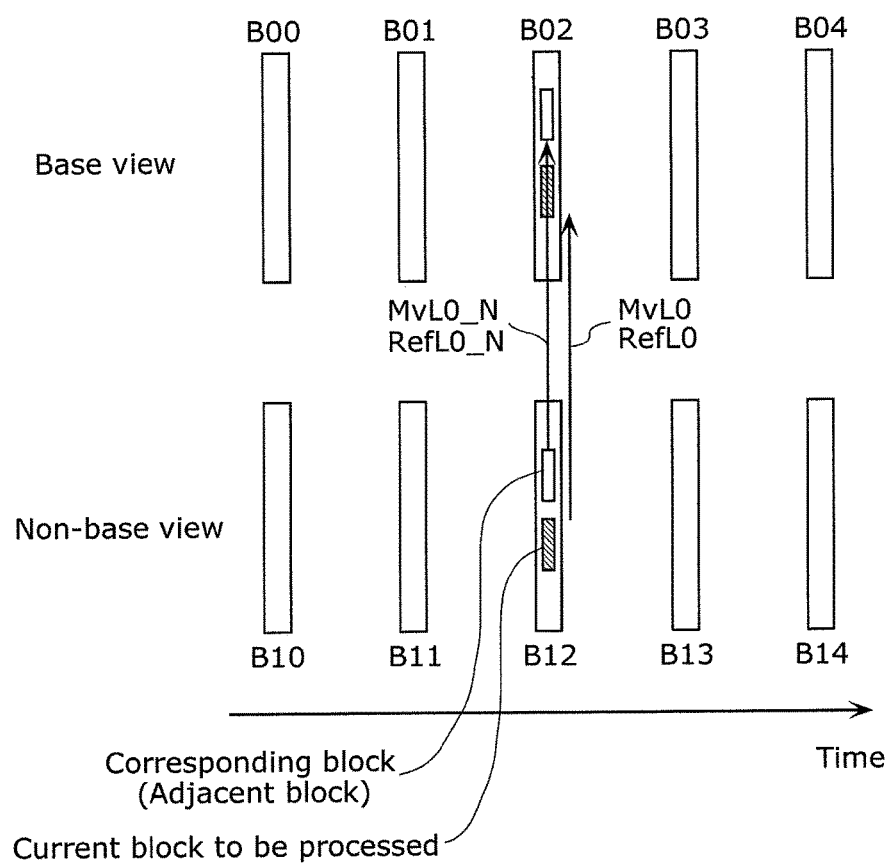
FIG. 19 is a diagram showing a fifth example of the reference relationship according to Embodiment 1.

FIG. 19 is a diagram showing a fifth example of the reference relationship according to the present embodiment. As in the cases shown in FIG. 7 to FIG. 10, FIG. 19 shows two views, or more specifically, a base view and a non-base view. Moreover, pictures B00 to B04 in the base view and pictures B10 to B14 in the non-base view are shown in display order.

In the example shown in FIG. 19, a reference picture index RefL0 of a current block to be processed matches a reference picture index RefL0_N of an adjacent block. In this case, the temporal distance from the current block to the reference picture thereof is equal to the temporal distance from the adjacent block to the reference picture thereof. On this account, the motion vector MvL0_N of the adjacent block does not need to be expanded/contracted. Therefore, in this case, the adding unit 131 of the image encoding apparatus and the adding unit 231 of the image decoding apparatus may add the motion vector MvL0_N as it is to the list.

Figure 20:
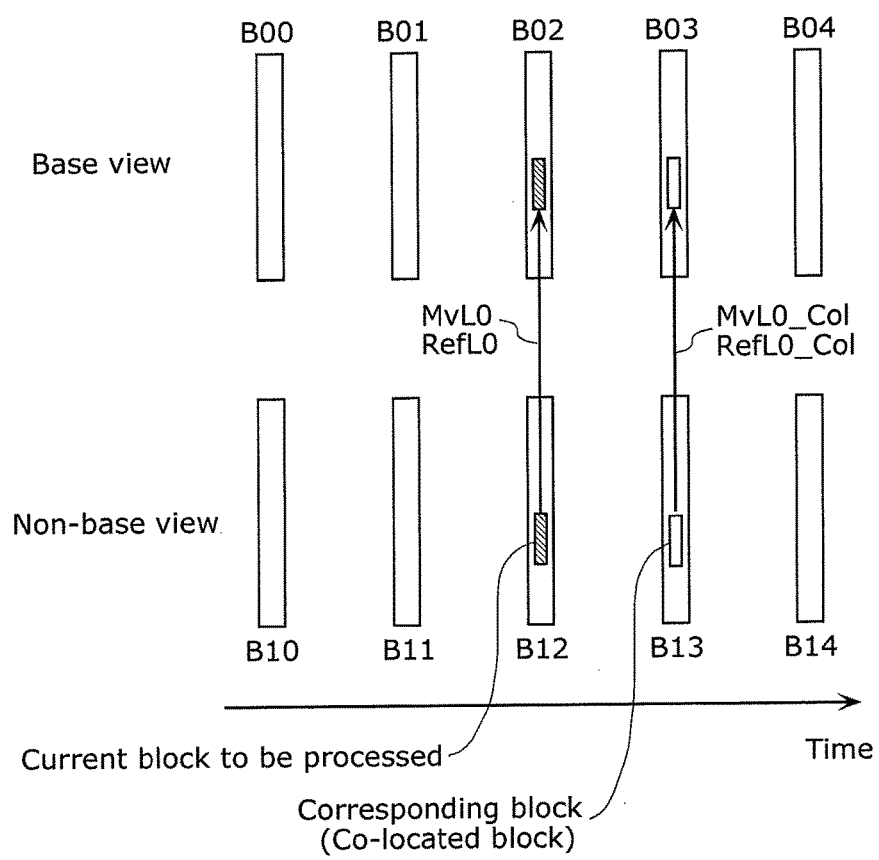
FIG. 20 is a diagram showing a sixth example of the reference relationship according to Embodiment 1.

FIG. 20 is a diagram showing a sixth example of the reference relationship according to the present embodiment. As in the cases shown in FIG. 7 to FIG. 10, FIG. 20 shows two views, or more specifically, a base view and a non-base view. Moreover, pictures B00 to B04 in the base view and pictures B10 to B14 in the non-base view are shown in display order.

In the example shown in FIG. 20, the temporal distance from the current block to be processed to the reference picture thereof is equal to the temporal distance from the co-located block to the reference picture thereof. On this account, the motion vector MvL0_Col of the co-located block does not need to be expanded/contracted. Therefore, in this case, the adding unit 131 of the image encoding apparatus and the adding unit 231 of the image decoding apparatus may add the motion vector MvL0_Col as it is to the list.

In each of the examples shown in FIG. 19 and FIG. 20, the current block temporally matches the reference picture of the current block and the corresponding block also temporally matches the reference picture of the corresponding block. As described above, in such a case, the adding unit 131 of the image encoding apparatus and the adding unit 231 of the image decoding apparatus may add the motion vector of the corresponding block as it is to the list.

Figure 21:
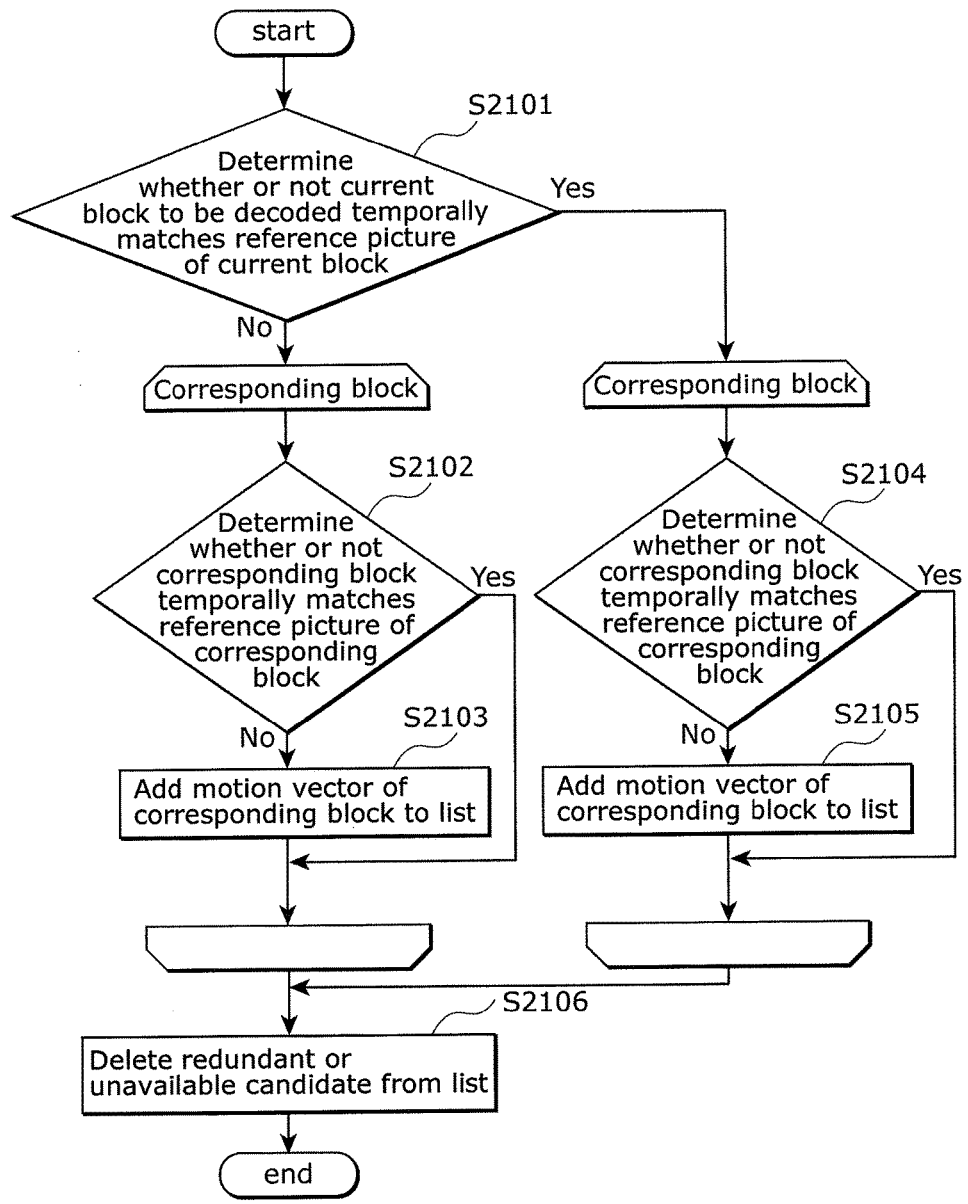
FIG. 21 is a first example of a flowchart for adding a motion vector of a corresponding block according to Embodiment 1.

FIG. 21 is a flowchart showing an example where the adding unit 231 of the image decoding unit adds the motion vector of the corresponding block since the current block temporally matches the reference picture of the current block and the corresponding block also temporally matches the reference picture of the corresponding block. The present embodiment describes the case where the example is applied to the adding unit 231 of the image decoding apparatus when the decoding operation is performed. However, the example can also be applied to the adding unit 131 of the image encoding apparatus when the encoding operation is performed. Moreover, in the present embodiment, whether or not the current block temporally matches the reference picture of the current block may be determined by determining whether or not the picture order count (POC) of the picture including the current block matches the POC of the reference picture of the current block. Here, the POC indicates a value counted in display order.

Here, a description is given with reference to FIG. 21. In Step S2101, the image decoding apparatus determines whether or not the current block to be decoded temporally matches the reference picture of the current block. When the result of the determination in Step S2101 is false (No), the image decoding apparatus determines in Step S2102 whether or not the corresponding block temporally matches the reference picture of the corresponding block. When the result of the determination in Step S2102 is false, the image decoding apparatus adds the motion vector of the corresponding block to the list in Step S2103. On the other hand, when the result of the determination in Step S2102 is true (Yes), the image decoding apparatus does not add the motion vector of the corresponding block to the list. When the result of the determination in Step S2101 is true, the image decoding apparatus determines in Step S2104 whether or not the corresponding block temporally matches the reference picture of the corresponding block. When the result of the determination in Step S2104 is true, the image decoding apparatus adds the motion vector of the corresponding block to the list in Step S2105. When the result of the determination in Step S2104 is false, the image decoding apparatus does not add the motion vector of the corresponding block to the list. At the completion of the processing for all of the corresponding blocks, the image decoding apparatus deletes a redundant candidate and an unavailable candidate from the list in Step S2106. In this way, the image decoding apparatus may add the motion vector of the corresponding block to the list: when the result of the determination in Step S2101 is true, or more specifically, when the current block temporally matches the reference picture of the current block; and when the result of the determination in Step S2104 is true, or more specifically when the corresponding block temporally matches the reference picture of the corresponding block. With this, the encoding efficiency can be increased.

Figure 22:
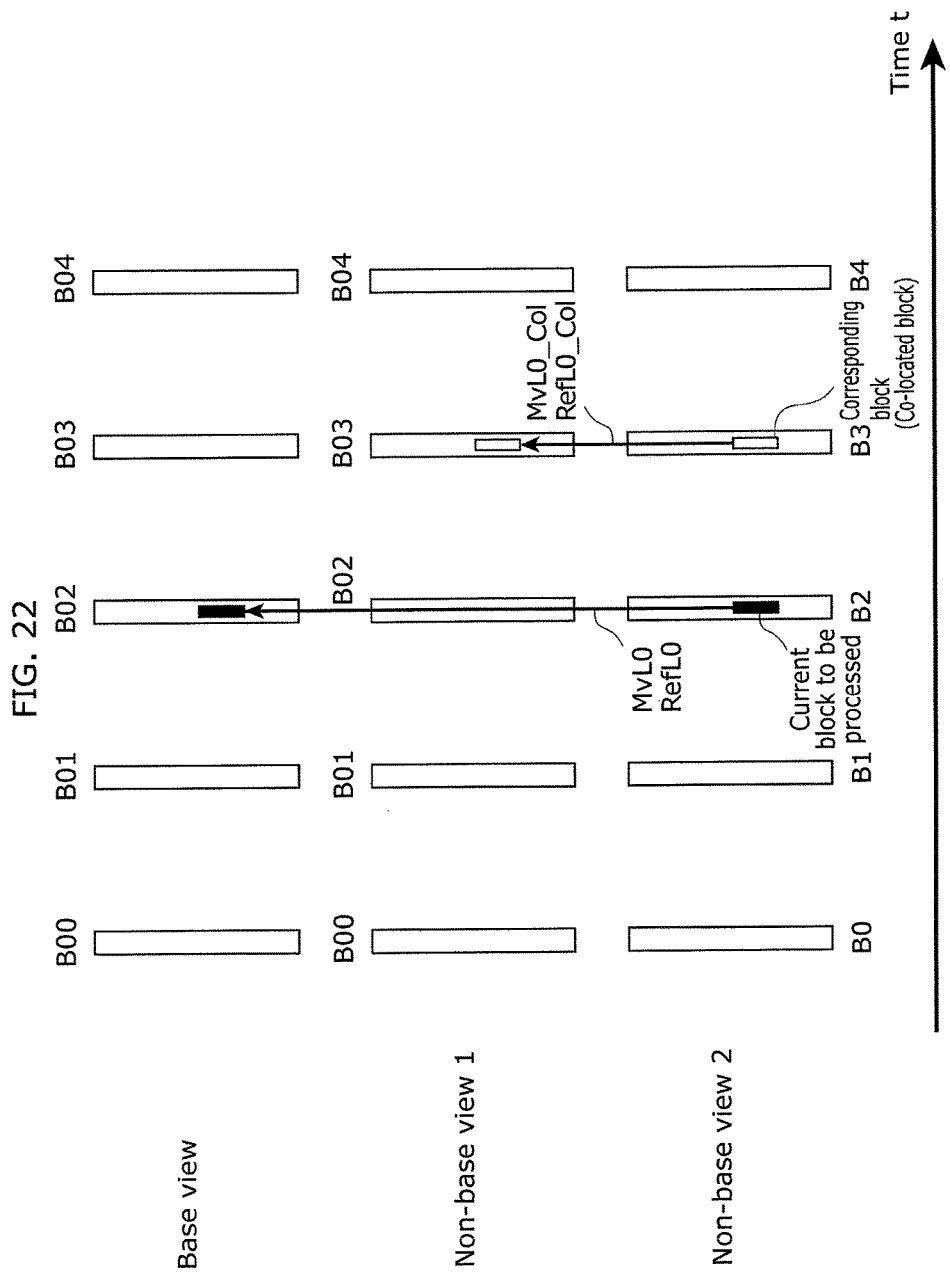
FIG. 22 is a diagram showing an example of modifying the motion vector of the corresponding block and adding the resulting motion vector to a list.

In the present embodiment, the motion vector of the corresponding block is added as it is to the list in Step S2105 of FIG. 21. However, the motion vector of the corresponding block may be added to the list after modification such as scaling is performed on the motion vector using the picture including the current block to be decoded, the reference picture of the current block, the picture including the corresponding block, the reference picture of the corresponding block, and values such as camera parameters for the views. For instance, in the example shown in FIG. 22, the motion vector of the corresponding block may be added to the list after the interval between the non-base view 2 and the non-base view 1 is modified to the interval between the base view and the non-base view 2 (by, for example, doubling the motion vector of the corresponding block). In this way, the encoding efficiency can be increased by modifying the motion vector when the motion vector is to be added to the list.

Figure 23:
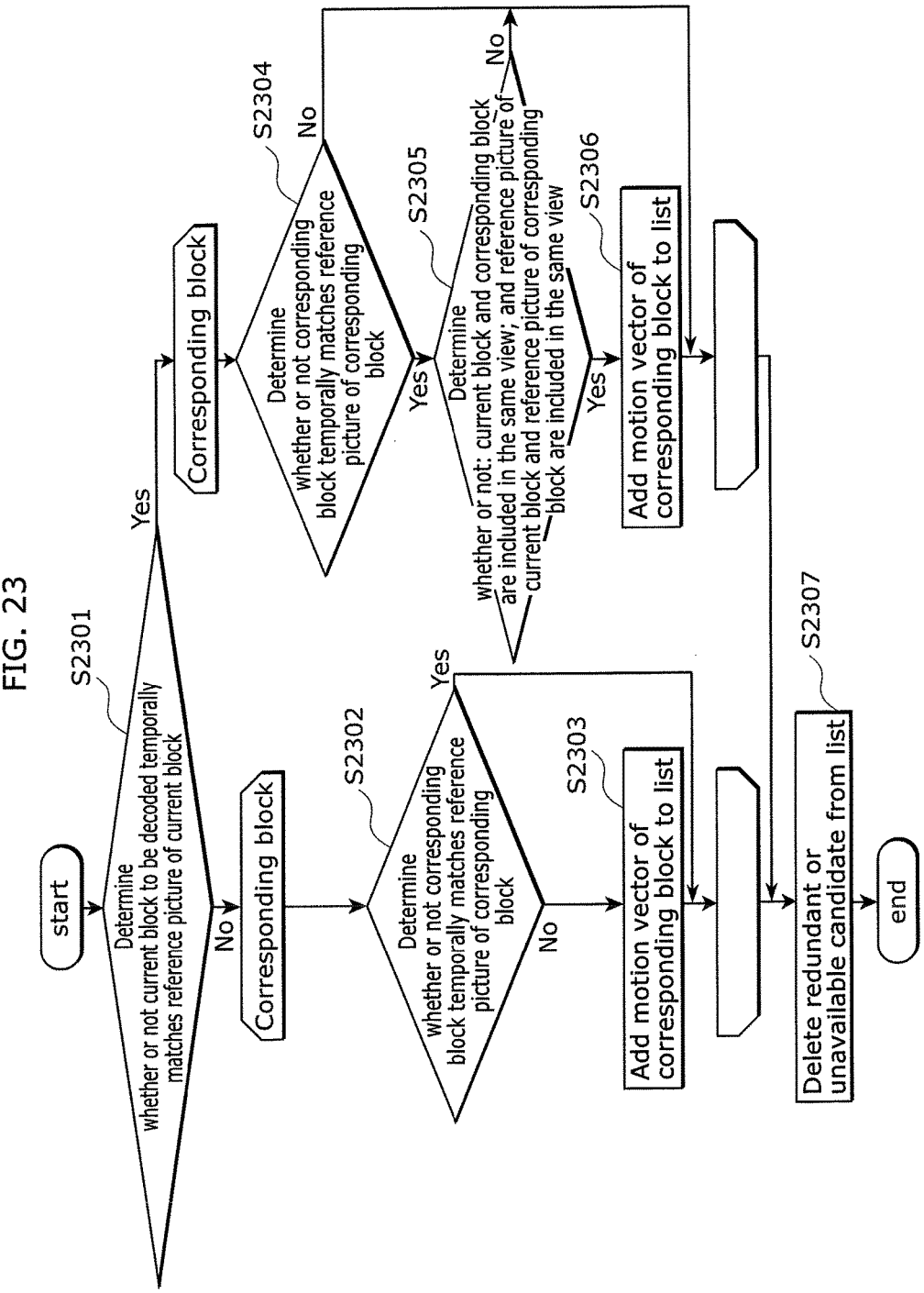
FIG. 23 is a second example of the flowchart for adding a motion vector of a corresponding block according to Embodiment 1.

In the above, the present embodiment describes the example where, in Step S2105 of FIG. 21, the motion vector of the corresponding block may be added to the list after modification such as scaling is performed on the motion vector using the picture including the current block to be decoded, the reference picture of the current block, the picture including the corresponding block, the reference picture of the corresponding block, and values such as camera parameters for the views. The example is not intended to be limiting and may be as shown in FIG. 23 for instance. To be more specific, when it is determined in Step S2304 that the corresponding block temporally matches the reference picture of the corresponding block, it is determined in Step S2305 whether or not: the picture including the current block and the picture including the corresponding block are included in the same view; and the reference picture of the current block and the reference picture of the corresponding block are included in the same view. When the result of the determination in Step S2304 is true, the motion vector of the corresponding block may be added as it is to the list in Step S2306. When the result of the determination is false, the motion vector of the corresponding block may not be added to the list. In this way, when the picture including the current block and the picture including the corresponding block are included in the same view and the reference picture of the current block and the reference picture of the corresponding block are included in the same view, or more specifically, when modification such as scaling does not need to be performed on the motion vector of the corresponding block, the motion vector of the corresponding block is added to the list. This results in an increase in the encoding efficiency while the throughput is reduced.

In the above, the present embodiment describes the example where the motion-vector-predictor specification mode is used in which the motion vector predictor is generated from the adjacent block of the current block to be encoded and the motion vector of the current block is thus encoded. However, the example is not intended to be limiting. For example, as shown in FIG. 33, the motion vector difference may not be added to the bitstream by selecting the motion vector predictor from among the generated motion-vector-predictor candidates and reference picture indexes and directly generating the prediction image using the selected motion vector predictor as the motion vector (such as a direct mode, a skip mode, or a merge mode).

Figure 24:
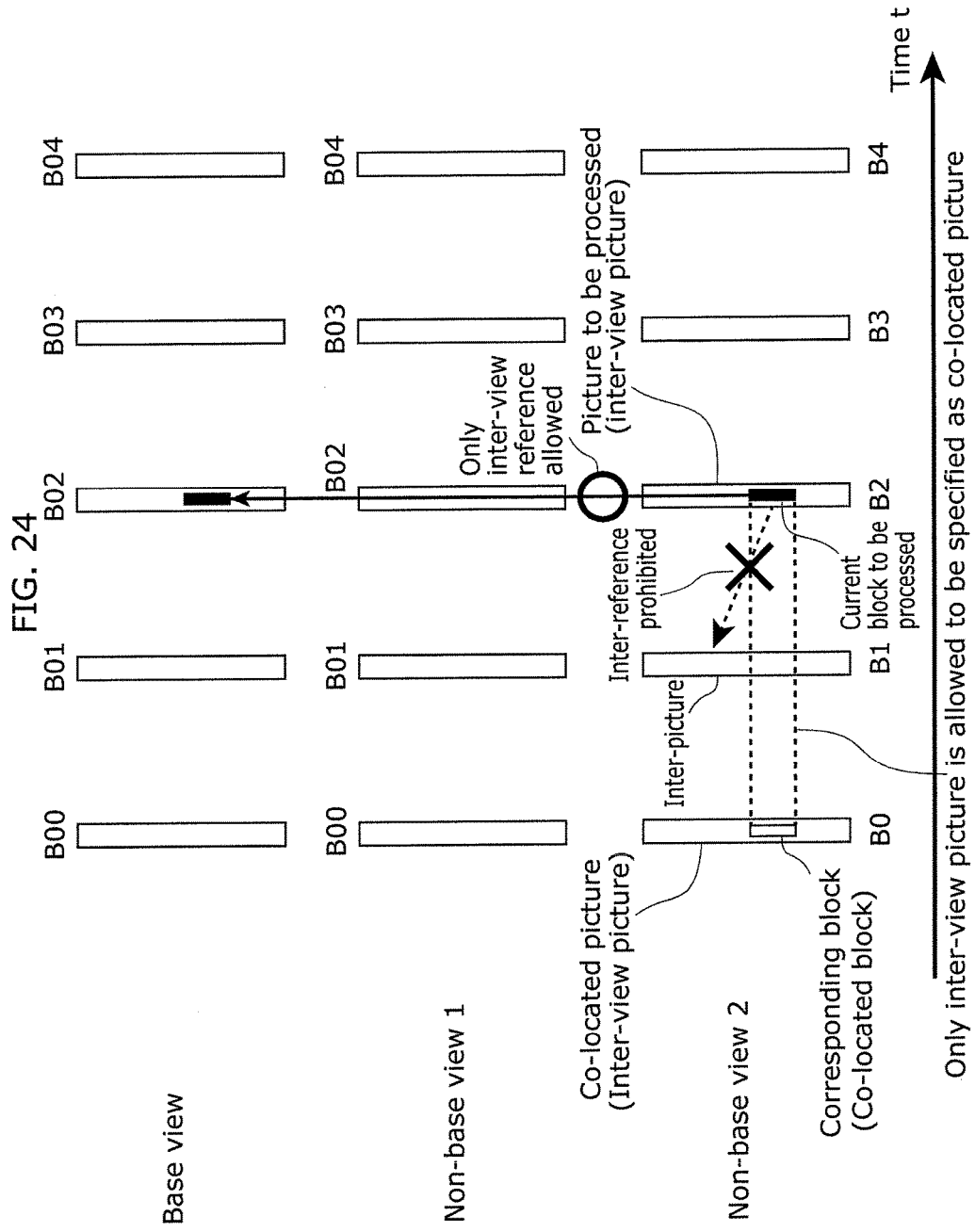
FIG. 24 is a first diagram showing a motion vector of an adjacent block according to Embodiment 1.

In the above, when the block is likely to be encoded or decoded with reference to the picture that temporally matches the block and the denominator or numerator is 0 in scaling calculation for modifying the motion vector of the corresponding block, the corresponding one of the image encoding apparatus and the image decoding apparatus in the present embodiment can continue the operation without any problem by not adding the motion vector of the corresponding block to the list. This method is not intended to be limiting. For example, as shown in FIG. 24, a picture allowed to reference only to a picture belonging to a different view (this reference is referred to as inter-view reference hereafter) may be defined (such a defined picture is referred to as the inter-view picture) and all blocks to be processed in the inter-view picture may be encoded or decoded only through inter-view reference. More specifically, all the blocks to be processed in the inter-view picture are prevented from referencing to a picture belonging to the view to which the inter-view picture belongs (this reference is referred to as inter-reference hereafter). (In the case of the inter-view picture, control may be performed not to include the picture in the same view in the reference picture list. For example, control is performed to add, to the reference picture list, only the reference pictures in an RPS belonging to a different view.) Moreover, a co-located picture (a first picture) to which a co-located block used for encoding or decoding the inter-view picture belongs is restricted to be selected from among the inter-view pictures out of the reference pictures. It should be noted that whether or not the picture is an inter-view picture is determined by defining a new NAL unit type (the new type may be added to the NAL unit type). Furthermore, in the case of the inter-view picture, the motion-vector-predictor generation by the time direct mode may not be performed any time. Moreover, suppose that a bi-directional prediction image is to be generated and that the block is likely to be encoded or decoded with reference to the picture that temporally matches the block. In this case, when weighted prediction in which weight averaging is performed according to a difference in display order is to be executed, the denominator or numerator may be 0 in scaling calculation. On this account, weighted prediction may not be performed in the case of an inter-view picture. With this, when the motion vector of the adjacent block is to be used as a candidate, the picture order count of the reference picture of the adjacent block is always equal to the picture order count of the reference picture of the current block to be encoded. Therefore, scaling calculation is not necessary, and the operation can be continued without any problem.

Figure 25:
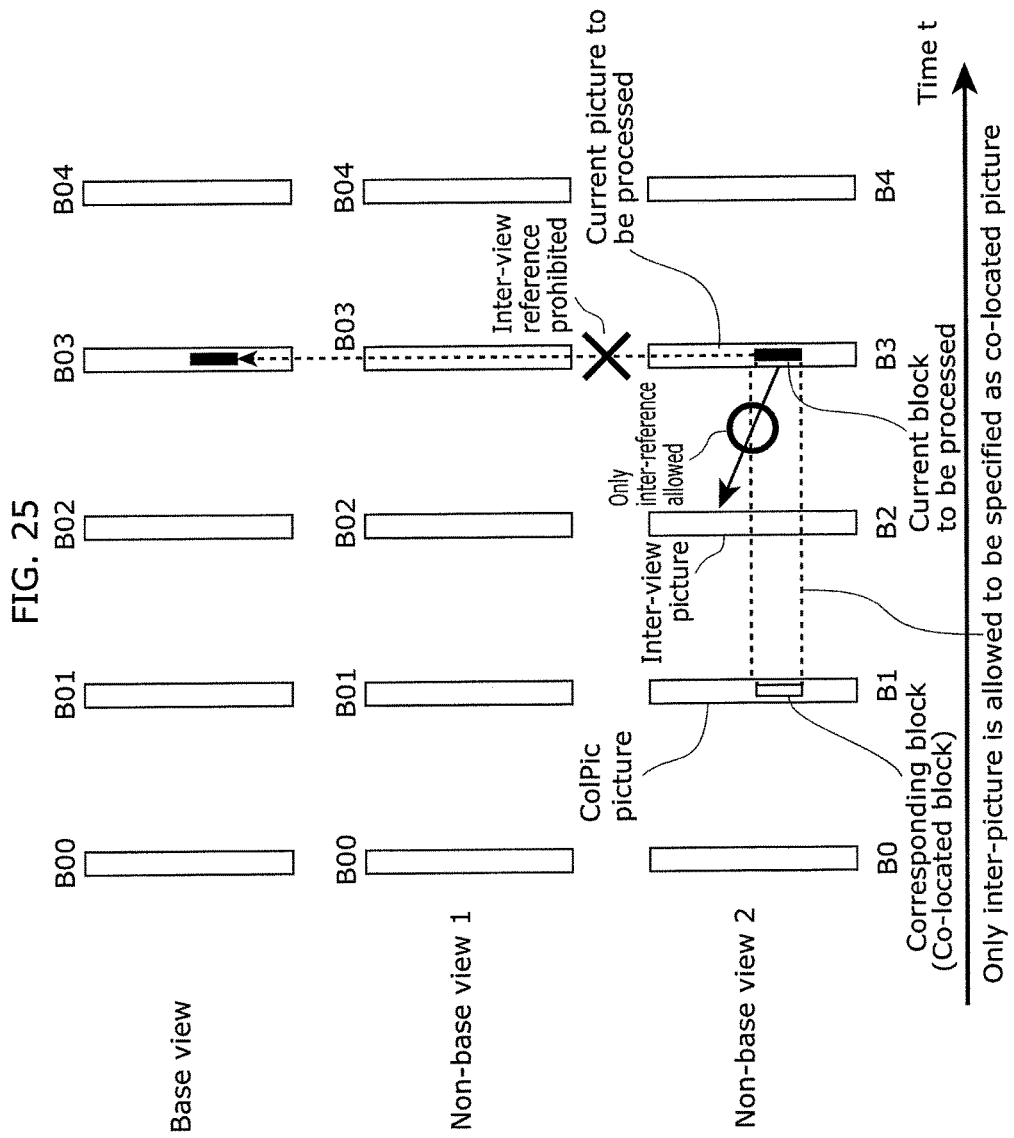
FIG. 25 is a second diagram showing a motion vector of an adjacent block according to Embodiment 1.

On the other hand, a picture other than the inter-view picture (such a picture is referred to as the inter-picture hereafter) is encoded or decoded only through inter-reference as shown in FIG. 25. More specifically, all the blocks to be processed in the inter-picture are prevented from referencing to a picture belonging to the view different from the view to which the inter-picture belongs. Moreover, a co-located picture to which a co-located block used for encoding or decoding the inter-picture belongs is restricted to be selected from among the inter-pictures out of the reference pictures. (In the case of the inter-view picture, control may be performed not to include the picture in the different view in the reference picture list. For example, control is performed to add, to the reference picture list, only the reference pictures in an RPS belonging to the same view.)

Figure 26:
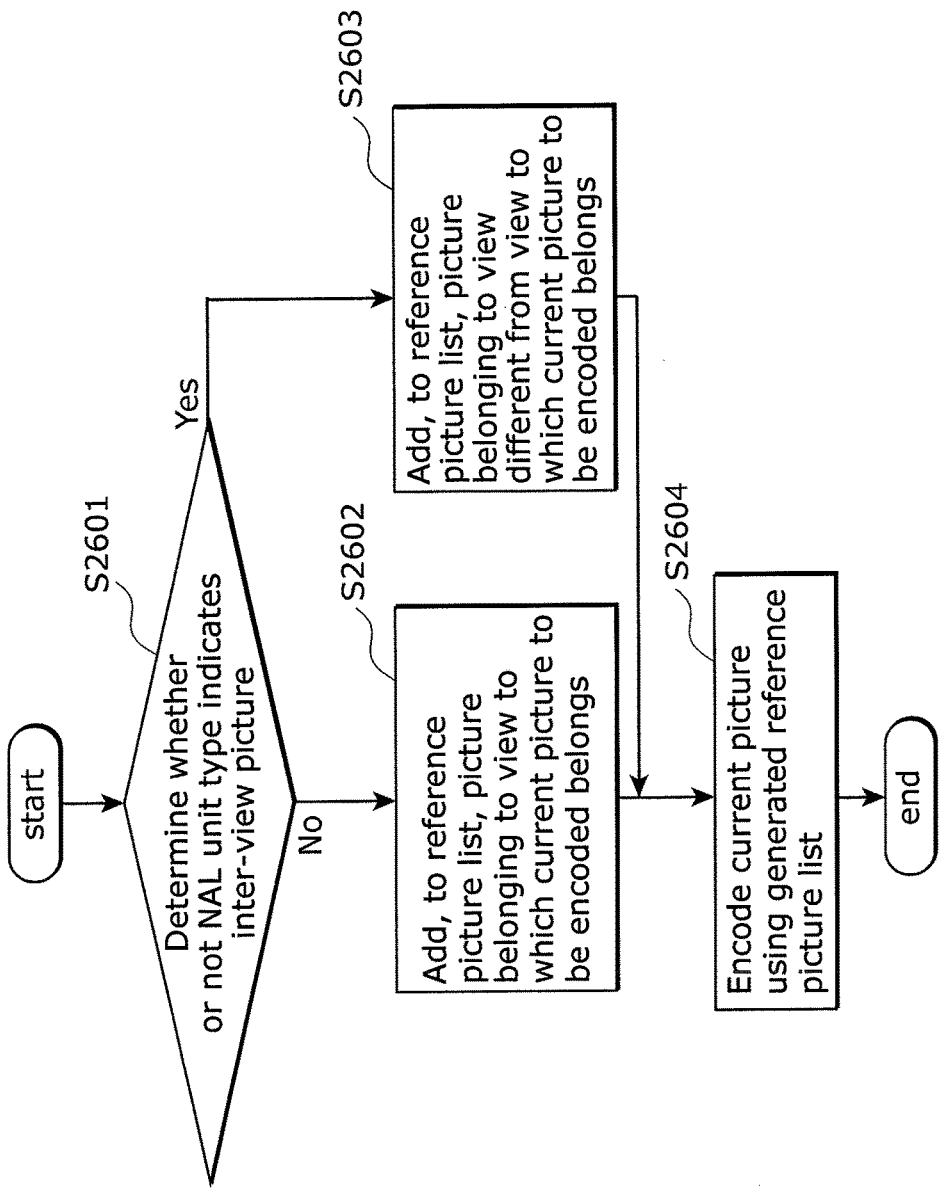
FIG. 26 is a diagram showing an example of a flowchart for switching a reference picture list generation method according to Embodiment 1.

FIG. 26 is a diagram showing an example of a flowchart used by the image encoding apparatus according to the present embodiment to switch a reference picture list generation method based on whether or not the current picture to be encoded is an inter-view picture. In Step S2601, the image encoding apparatus determines whether or not the current picture to be encoded is an inter-view picture based on the NAL unit type. When the result of the determination in Step S2601 is false, the image encoding apparatus generates a reference picture list by adding, to the reference picture list, the picture belonging to the view to which the current picture belongs, in Step S2602. To be more specific, when the current picture is an inter-picture, the reference picture list includes only the reference picture in the same view. This can prevent inter-view reference from occurring. When the result of the determination in Step S2601 is true, the image encoding apparatus generates a reference picture list by adding, to the reference picture list, the picture belonging to the view different from the view to which the current picture belongs, in Step S2603. To be more specific, when the current picture is an inter-view picture, the reference picture list includes only the reference picture in the different view. This can prevent inter-reference from occurring. In Step S2604, the image encoding apparatus encodes the current picture using the generated reference picture list. In this way, the reference picture list generation method is switched based on whether or not the current picture is an inter-view picture. Therefore, when the current picture is an inter-view picture, inter-reference may be prevented from occurring. Moreover, when the current picture is an inter-picture, inter-view reference may be prevented from occurring.

Figure 27:
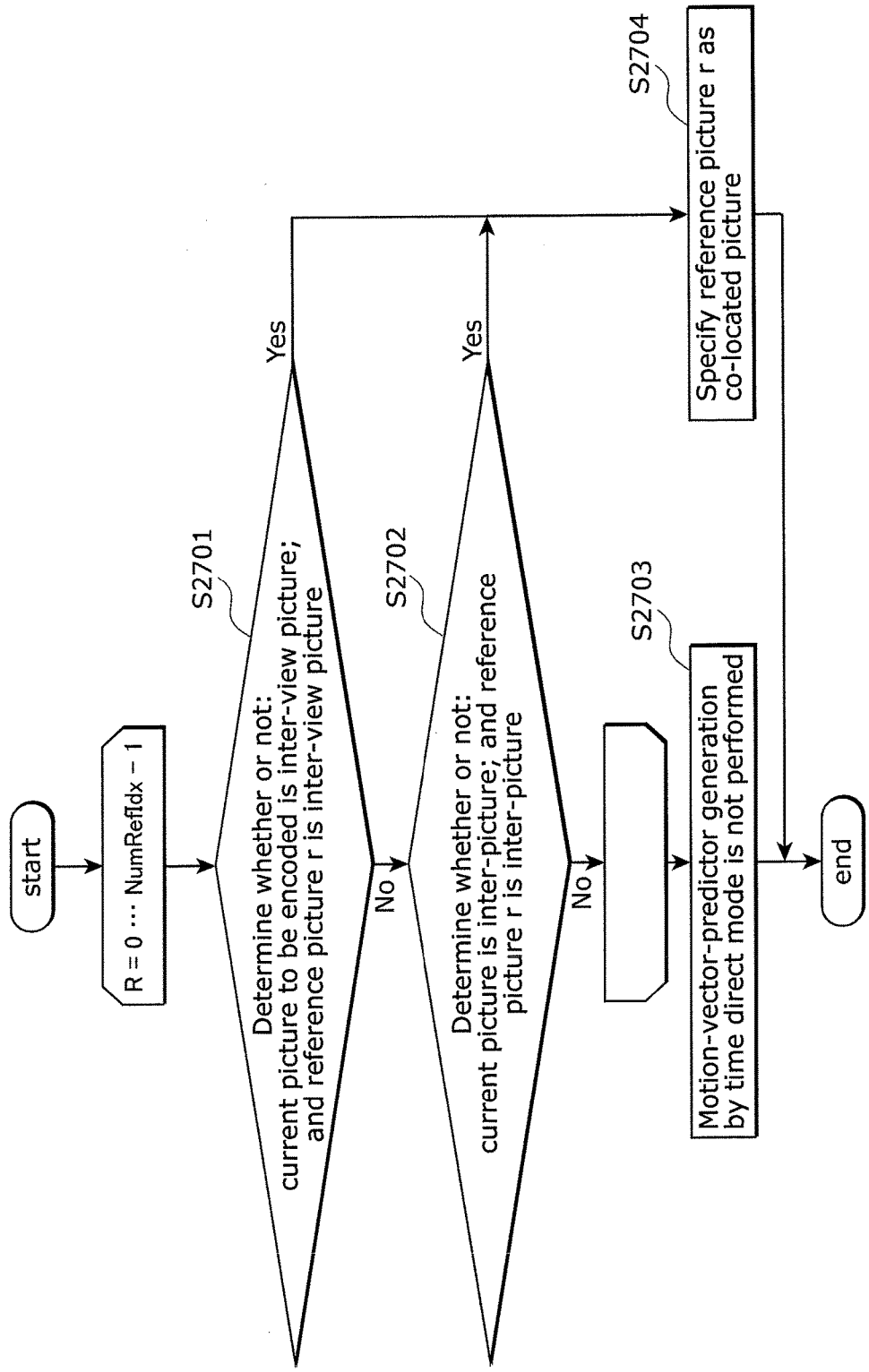
FIG. 27 is a diagram showing an example of a flowchart for calculating a co-located picture according to Embodiment 1.

FIG. 27 is a diagram showing an example of a flowchart used by the image encoding apparatus according to the present embodiment to calculate a co-located picture used for encoding the current picture to be encoded. The reference picture index of the co-located picture is selected by repeatedly performing the processes of Step S2701 and Step S2702 on a referable reference picture index r (r is a value from 0 to NumRefIdx-1). Here, NumRefIdx represents the number of reference pictures referable for encoding the current picture. In Step S2701, it is determined whether or not: the current picture is an inter-view picture; and the reference picture specified by the reference picture index r is an inter-view picture. When the result of the determination in Step S2701 is true, the reference picture specified by the reference picture index r is specified as the co-located picture in Step S2704. When the result of the determination in Step S2701 is false, the image encoding apparatus determines in Step S2702 whether or not: the current picture is an inter-picture; and the reference picture specified by the reference picture index r is an inter-picture. When the result of the determination in Step S2702 is true, the reference picture specified by the reference picture index r is specified as the co-located picture in Step S2704. In Step S2703, since no co-located picture corresponding to the picture type of the current picture is found, the image encoding apparatus does not perform motion-vector-predictor generation by the time direct mode. In this way, the co-located picture selecting method is switched based on whether or not the current picture is an inter-view picture. Therefore, when the current picture is a picture based on inter-view reference, control may be performed for the co-located picture to be reliably a picture based on inter-view reference as well. When the current picture is a picture based on inter-reference, control may be performed for the co-located picture to be reliably a picture based on inter-reference as well.

Figure 28:
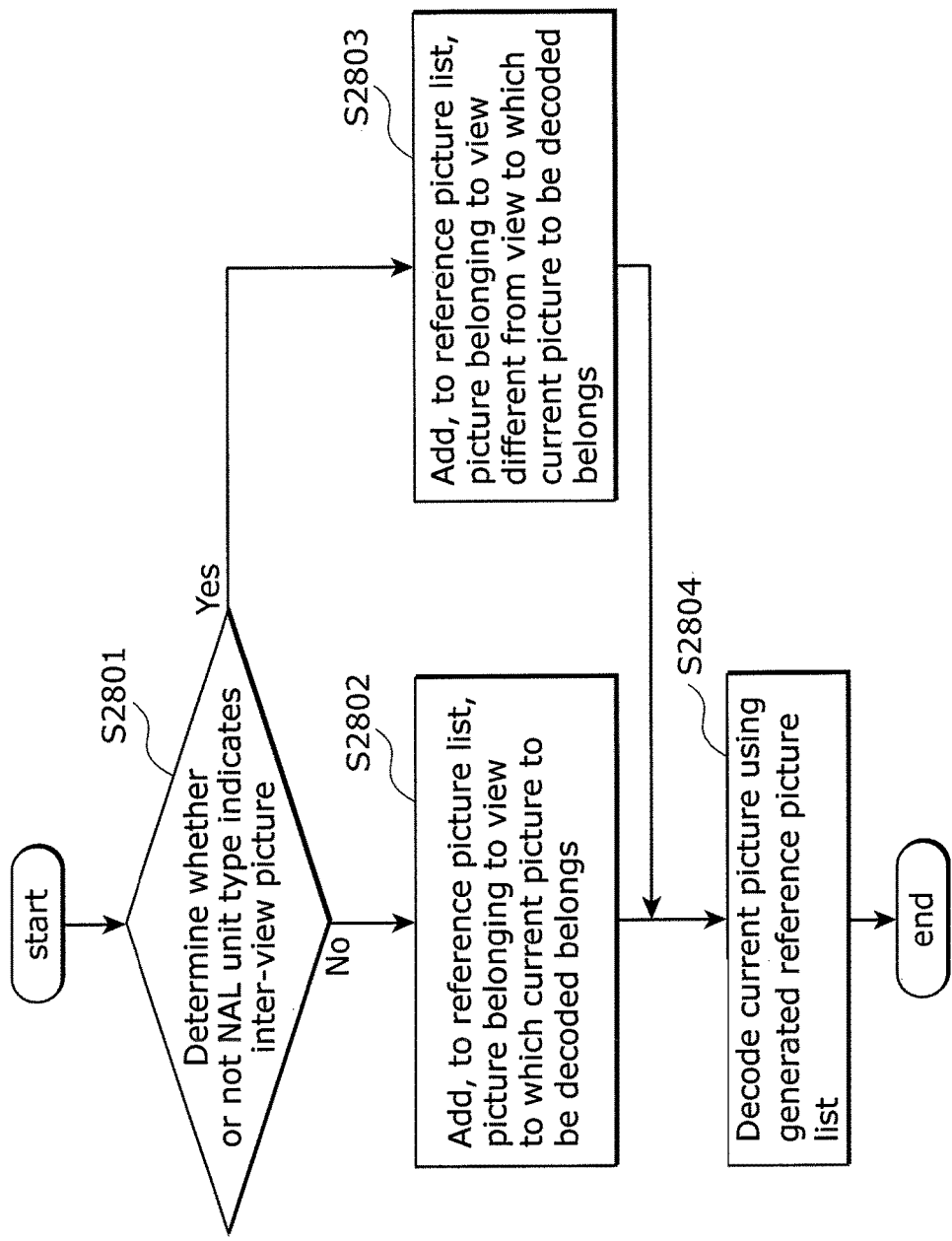
FIG. 28 is a diagram showing an example of a flowchart for switching a reference picture list generation method according to Embodiment 1.

FIG. 28 is a diagram showing an example of a flowchart used by the image decoding apparatus according to the present embodiment to switch a reference picture list generation method based on whether or not the current picture to be decoded is an inter-view picture. In Step S2801, the image decoding apparatus determines whether or not the current picture to be decoded is an inter-view picture based on the NAL unit type. When the result of the determination in Step S2801 is false, the image decoding apparatus generates a reference picture list by adding, to the reference picture list, the picture belonging to the view to which the current picture belongs, in Step S2802. To be more specific, when the current picture is an inter-picture, the reference picture list includes only the reference picture in the same view. This can prevent inter-view reference from occurring. When the result of the determination in Step S2801 is true, the image decoding apparatus generates a reference picture list by adding, to the reference picture list, the picture belonging to the view different from the view to which the current picture belongs, in Step S2803. To be more specific, when the current picture is an inter-view picture, the reference picture list includes only the reference picture in the different view. This can prevent inter-reference from occurring. In Step S2804, the image decoding apparatus decodes the current picture using the generated reference picture list. In this way, the reference picture list generation method is switched based on whether or not the current picture is an inter-view picture. Therefore, when the current picture is an inter-view picture, inter-reference may be prevented from occurring. Moreover, when the current picture is an inter-picture, inter-view reference may be prevented from occurring. As a result, the generated bitstream can be appropriately decoded.

Figure 29:
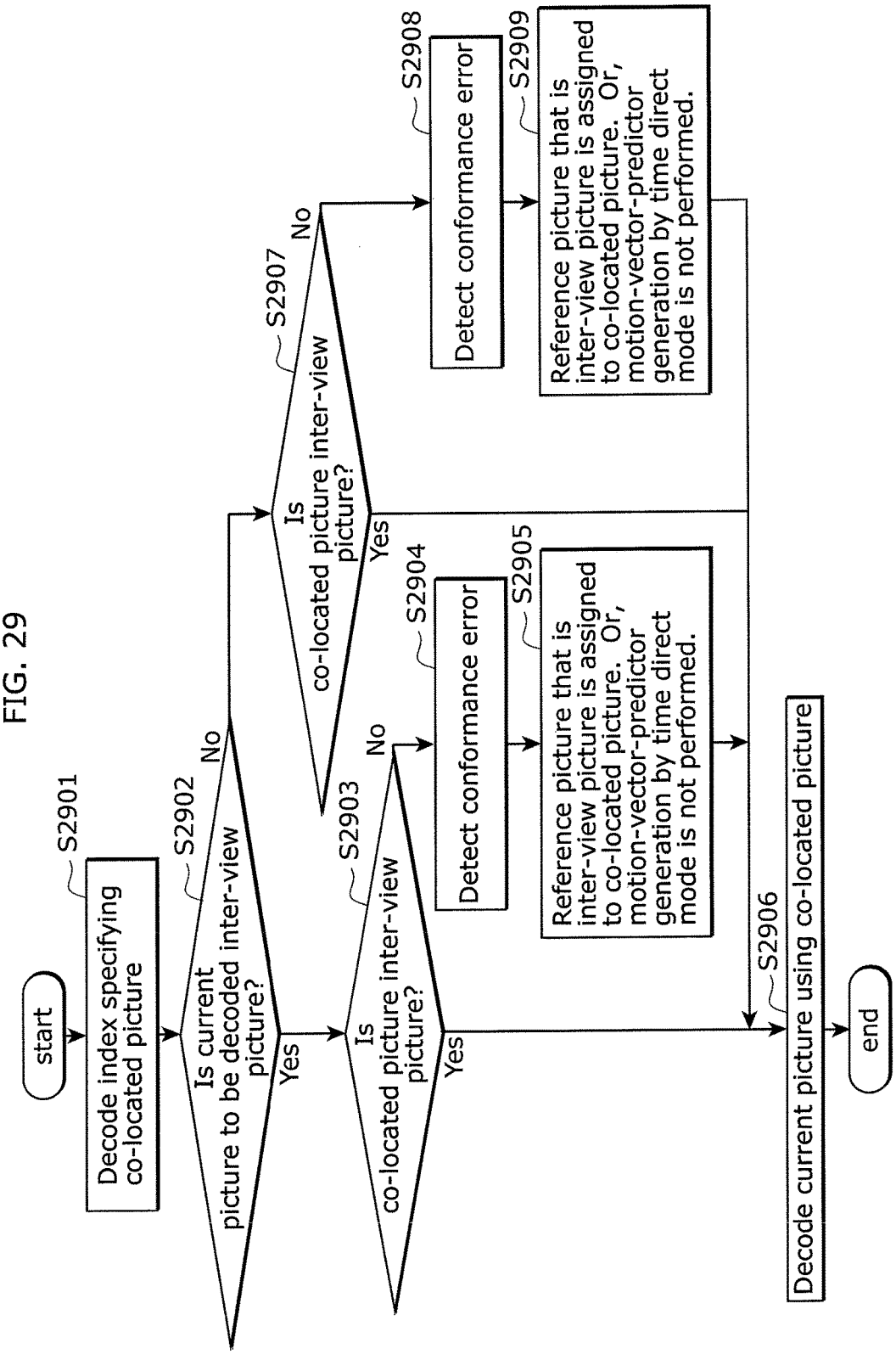
FIG. 29 is a diagram showing an example of a flowchart for calculating a co-located picture according to Embodiment 1.

FIG. 29 is a diagram showing an example of a flowchart used by the image decoding apparatus according to the present embodiment to calculate a co-located picture used for decoding the current picture to be decoded. In Step S2901, the image decoding apparatus decodes a flag and the like for specifying the co-located picture, from the header such as the SPS, the PPS, or the slice header. In Step S2902, the image decoding apparatus determines whether or not the current block to be decoded is included in an inter-view picture, based on the NAL unit type for example. When the result of the determination in Step S2902 is true, it is determined in Step S2903 whether or not the co-located picture specified in Step S2901 is an inter-view picture. When the result of the determination in Step S2903 is true, the image decoding apparatus decodes, in Step S2906, the current picture using the co-located picture specified in Step S2901. When the result of the determination in Step S2903 is false, conformance violation of the bitstream is detected and then notification is provided in Step S2904. It should be noted that any method can be used as the method of notifying the conformance violation and that the notification does not necessarily need to be provided. In Step S2905, in order to continue the processing, the image decoding apparatus reassigns, to the co-located picture, the reference picture that is an inter-view picture. For example, the inter-view picture that is closest to the current picture in display order can be reassigned to the co-located picture. Or, control may be performed in order for motion-vector-predictor generation by the time direct mode not to be performed. When the result of the determination in Step S2902 is false, or more specifically, when the current picture is an inter-picture, it is determined in Step S2907 whether or not the co-located picture specified in Step S2901 is an inter-picture. When the result of the determination in Step S2907 is true, the current picture is decoded, in Step S2906, using the co-located picture specified in Step S2901. When the result of the determination in Step S2907 is false, conformance violation of the bitstream is detected and then notification is provided in Step S2908. It should be noted that any method can be used as the method of notifying the conformance violation and that the notification does not necessarily need to be provided. In Step S2909, in order to continue the processing, the image decoding apparatus reassigns, to the co-located picture, the reference picture that is an inter-picture. For example, the inter-picture that is closest to the current picture in display order can be reassigned to the co-located picture. Or, control may be performed in order for motion-vector-predictor generation by the time direct mode not to be performed.

Thus, even when a block is likely to be encoded or decoded with reference to a picture that temporally matches the block, the motion vector predictor can be calculated, without scaling, using the inter-view picture as described above, as shown in FIG. 19 and FIG. 20. Hence, the processing can be continued without any problem, and the motion vector predictor can be appropriately generated.

The present embodiment describes the case as an example where a picture included in a different view is referenced for encoding or decoding the current picture, such as where a picture included in a non-base view is to be decoded. However, this example is not intended to be limiting. For example, when a picture included in a different layer is referenced for encoding or decoding the current picture, the example described in the present embodiment may be applied. For instance, the example can be applied to scalable video coding (SVC) or the like. Even in the case of SVC, a prediction image is generated with reference to a reference picture belonging to a different layer. Thus, as with the case of MVC, the denominator or numerator may be 0 in scaling calculation and, therefore, the processing may not be continued. Here, by applying the present embodiment, the processing can be continued without any problem. For example, as is the case with an inter-view picture, an inter-layer reference picture may be defined. The inter-layer reference picture is defined as a picture allowed to reference only to a picture belonging to a different layer (this reference is referred to as inter-layer reference hereafter). Then, all blocks to be processed in the inter-layer reference picture is encoded or decoded only through inter-layer reference. More specifically, all the blocks to be processed in the inter-layer reference picture are prevented from referencing to a picture belonging to the layer to which the inter-layer reference picture belongs. Moreover, a co-located picture to which a co-located block used for encoding or decoding the inter-layer reference picture belongs is selected from among the referable inter-layer reference pictures. It should be noted that whether or not the picture is an inter-layer reference picture is determined by defining a new NAL unit type. Furthermore, in the case of the inter-layer reference picture, the motion-vector-predictor generation by the time direct mode may not be performed any time. Moreover, suppose that a bi-directional prediction image is to be generated and that the block is likely to be encoded or decoded with reference to the picture that temporally matches the block. In this case, when weighted prediction in which weight averaging is performed according to a difference in display order is to be executed, the denominator or numerator may be 0 in scaling calculation. On this account, weighted prediction may not be performed in the case of an inter-layer reference picture.

On the other hand, a picture other than the inter-layer reference picture (such a picture is referred to as the inter-picture hereafter) is encoded or decoded only through inter-reference. More specifically, all the blocks to be processed in the inter-picture are prevented from referencing to a picture belonging to the layer different from the layer to which the inter-picture belongs. Moreover, a co-located picture to which a co-located block used for encoding or decoding the inter-picture belongs is selected from among the referable inter-pictures.

Thus, even when a block is likely to be encoded or decoded with reference to a picture that temporally matches the block, the motion vector predictor can be calculated, without scaling, using the inter-layer reference picture as described above, as shown in FIG. 19 and FIG. 20. Hence, the processing can be continued without any problem, and the motion vector predictor can be appropriately generated.

Although the image encoding apparatus and the image decoding apparatus according to an aspect or aspects of the present invention have been described by means of the above embodiments, the present invention is not limited to these embodiments. Other embodiments implemented through various changes and modifications conceived by a person of ordinary skill in the art or through a combination of the structural elements in different embodiments described above may be included in the scope of the present invention.

For example, processing performed by a specific processing unit may be performed by a different processing unit. Furthermore, the order in which processes are performed may be changed, and a plurality of processes may be performed in parallel.

Moreover, the present invention can be implemented not only as an image encoding apparatus and an image decoding apparatus, but also as methods having, as steps, the characteristic processing units included in the image encoding apparatus and the image decoding apparatus. Furthermore, the present invention can be implemented as a computer program causing a computer to execute the steps included in the methods. In addition, the present invention can be implemented as a computer-readable recording medium such as a Compact Disc-Read Only Memory (CD-ROM) having the computer program recorded thereon.

Moreover, the structural elements included in the image encoding apparatus and the image decoding apparatus may be implemented as a Large Scale Integration (LSI) that is an integrated circuit. The structural elements may be integrated into individual chips or may be integrated into one chip including some or all of them. Although referred to as the LSI here, it may be referred to as an Integrated Circuit (IC), a system LSI, a super LSI, or an ultra LSI depending on the degree of integration.

Furthermore, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. In that case, it should be obvious that the structural elements included in the image encoding apparatus and the image decoding apparatus may be integrated using such a technology.

(Embodiment 2)

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 36:
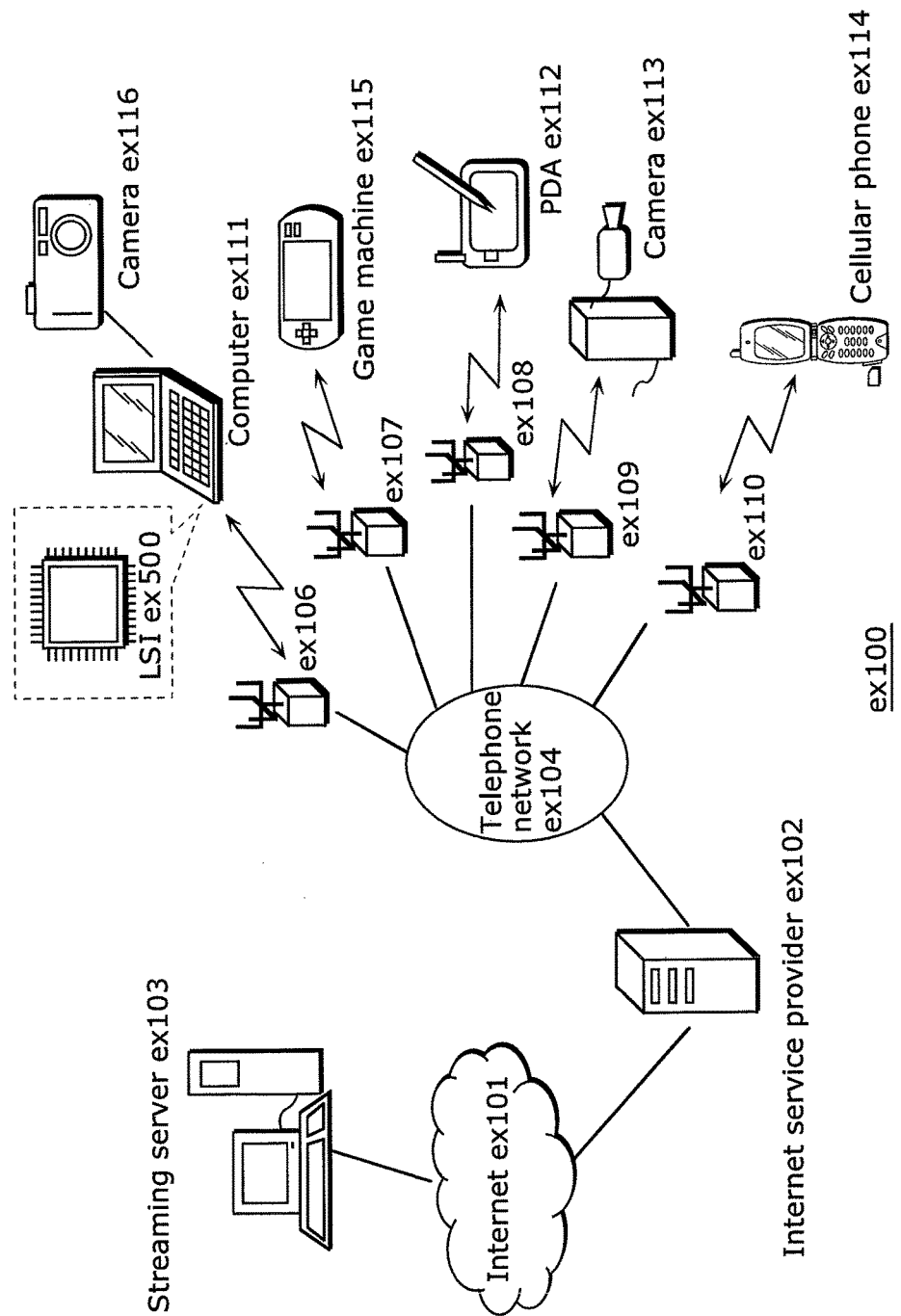
FIG. 36 shows an overall configuration of a content providing system for implementing content distribution services.

FIG. 36 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 36, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present invention), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present invention).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 37:
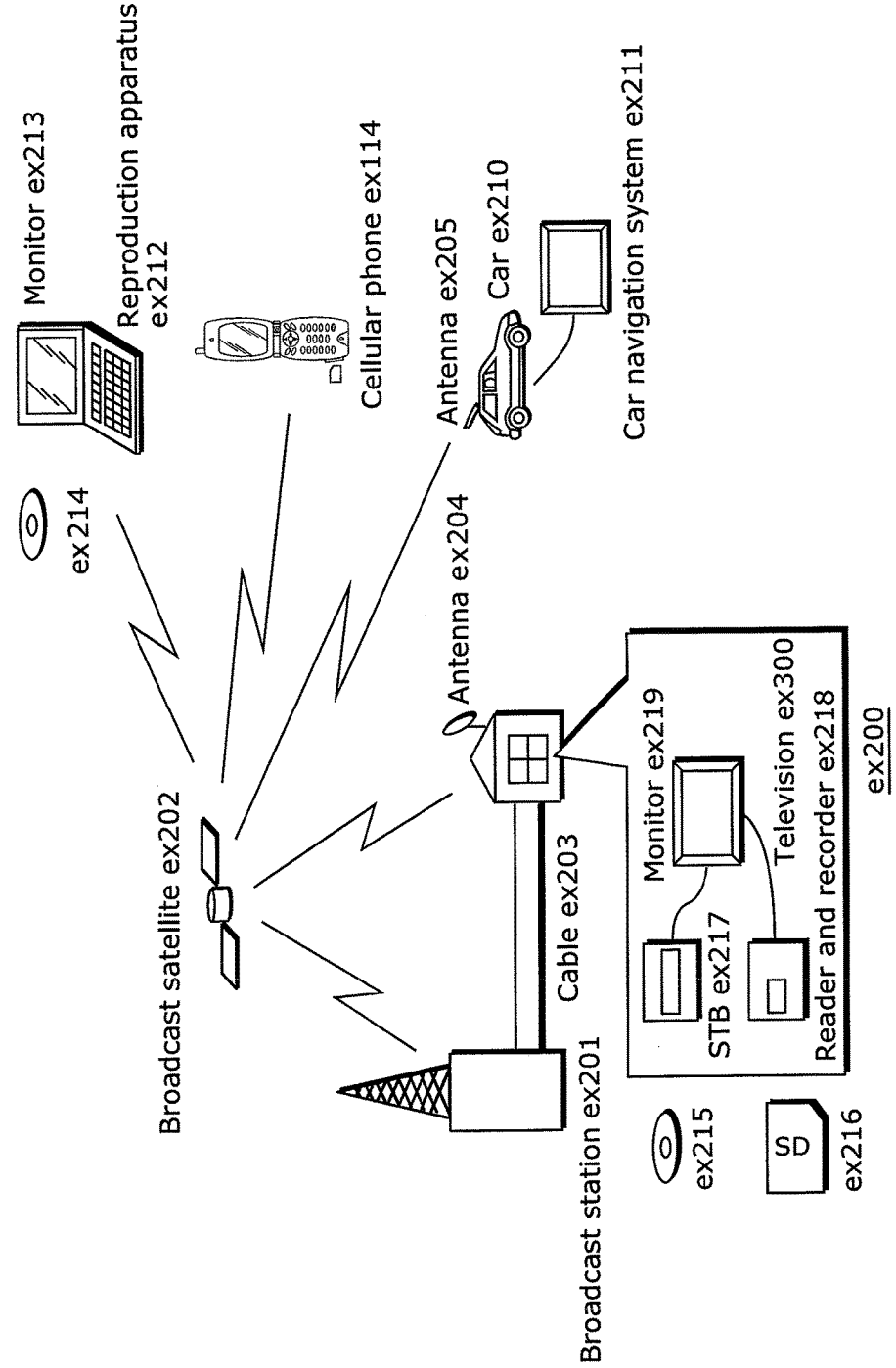
FIG. 37 shows an overall configuration of a digital broadcasting system.

Aside from the example of the content providing system ex100, at least one of the moving picture coding apparatus (image coding apparatus) described in each of embodiments may be implemented in a digital broadcasting system ex200 illustrated in FIG. 37. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 38:
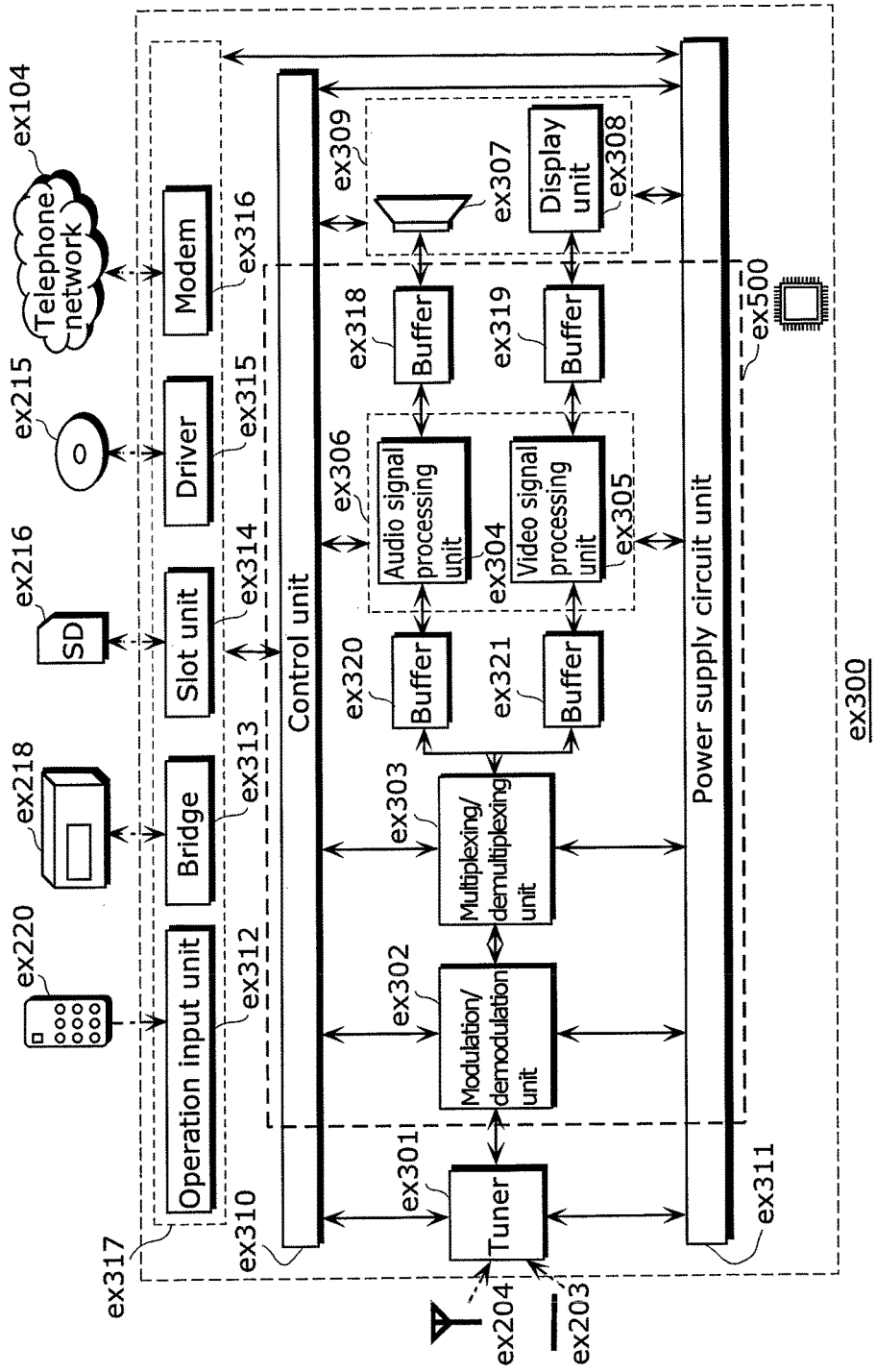
FIG. 38 shows a block diagram illustrating an example of a configuration of a television.

FIG. 38 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image coding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 39:
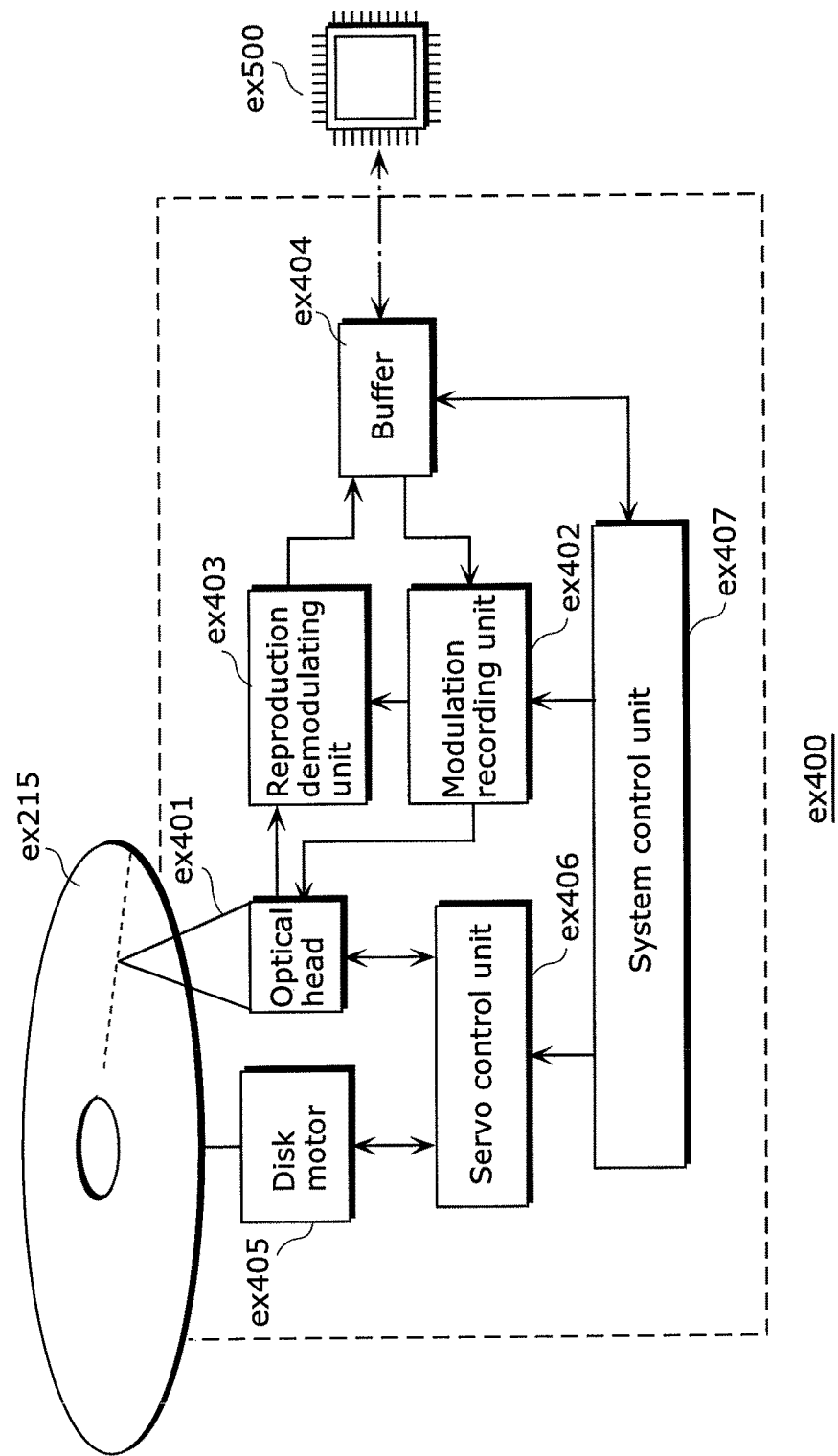
FIG. 39 shows a block diagram illustrating an example of a configuration of an information reproducing/recording unit that reads and writes information from and on a recording medium that is an optical disk.

As an example, FIG. 39 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 40:
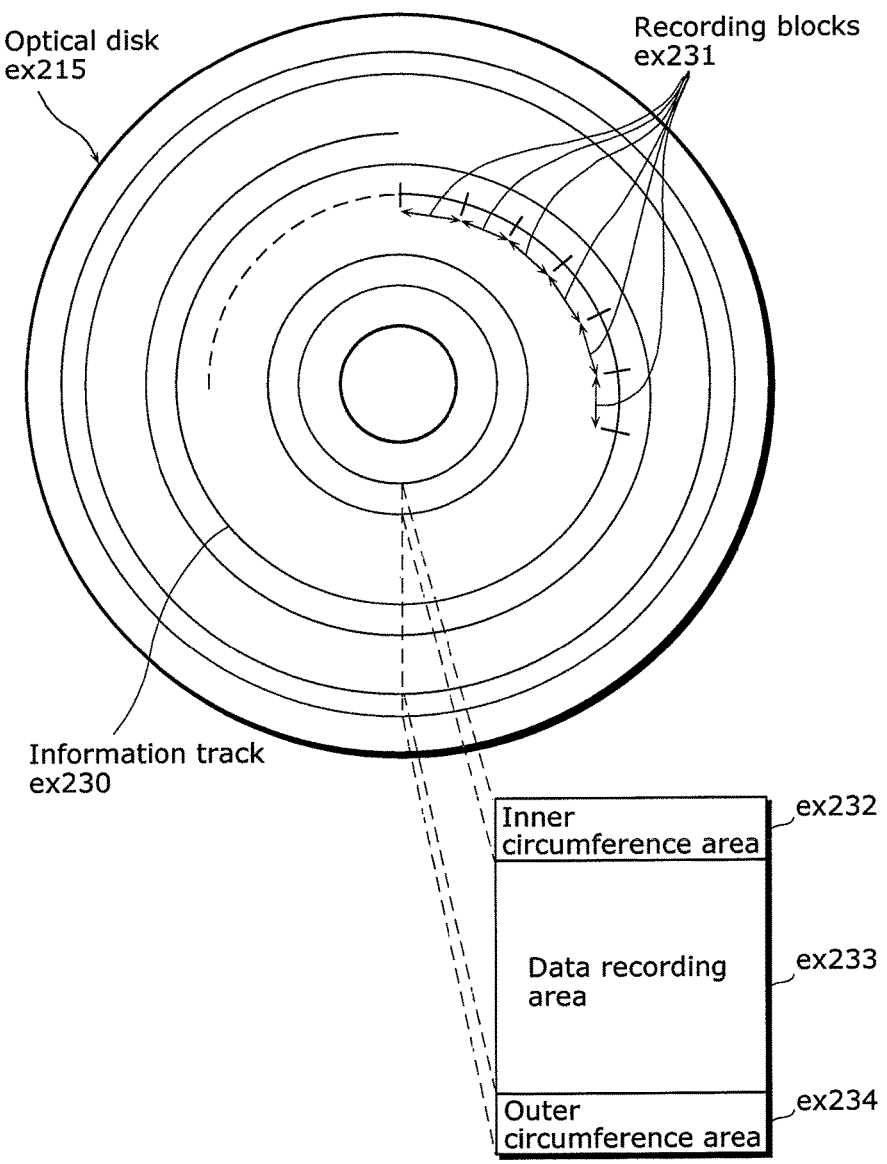
FIG. 40 shows an example of a configuration of a recording medium that is an optical disk.

FIG. 40 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 38. The same will be true for the configuration of the computer ex111, the cellular phone ex114, and others.

Figure 41A:
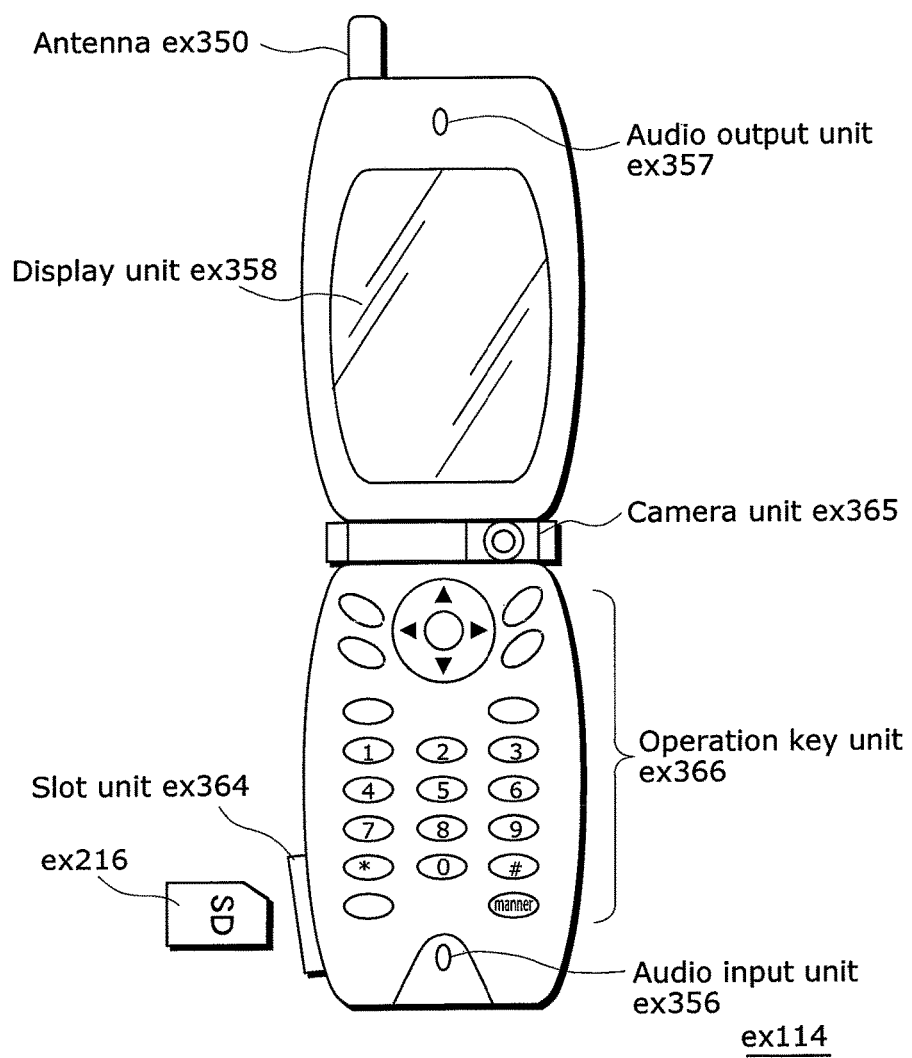
FIG. 41A shows an example of a cellular phone.

FIG. 41A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 41B:
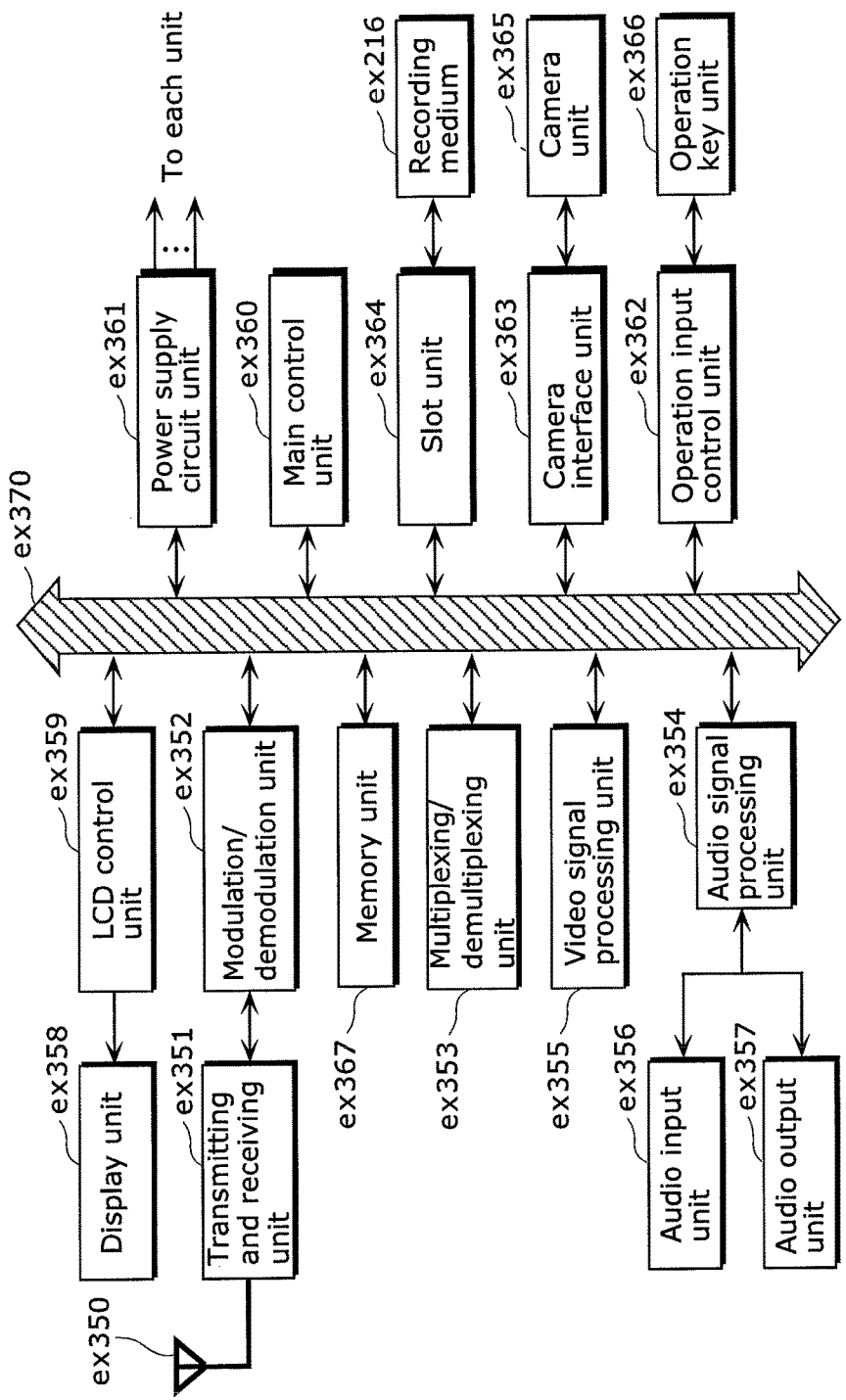
FIG. 41B is a block diagram showing an example of a configuration of a cellular phone.

Next, an example of a configuration of the cellular phone ex114 will be described with reference to FIG. 41B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present invention), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

(Embodiment 3)

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 42 illustrates a structure of the multiplexed data. As illustrated in FIG. 42, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 43:
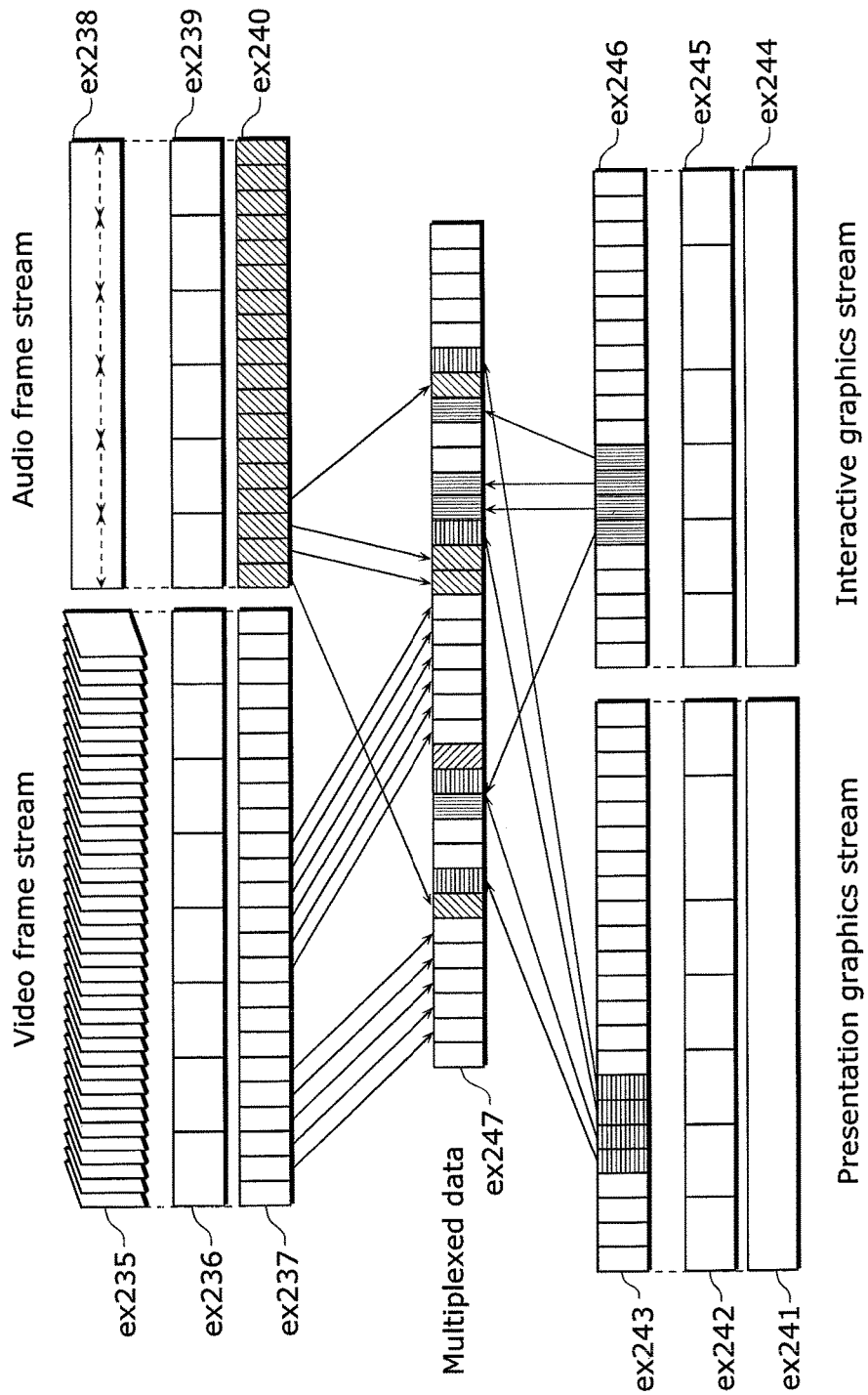
FIG. 43 schematically shows how each stream is multiplexed in multiplexed data.

FIG. 43 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 44:
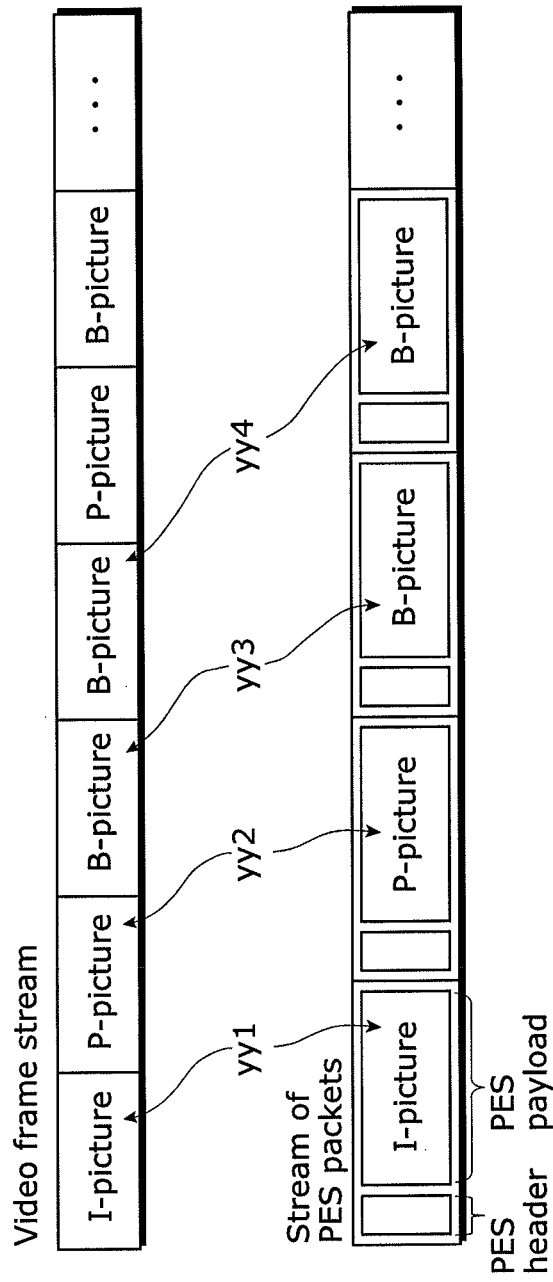
FIG. 44 shows how a video stream is stored in a stream of PES packets in more detail.

FIG. 44 illustrates how a video stream is stored in a stream of PES packets in more detail. The first bar in FIG. 44 shows a video frame stream in a video stream. The second bar shows the stream of PES packets. As indicated by arrows denoted as yy1, yy2, yy3, and yy4 in FIG. 44, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 45 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 45. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 46:
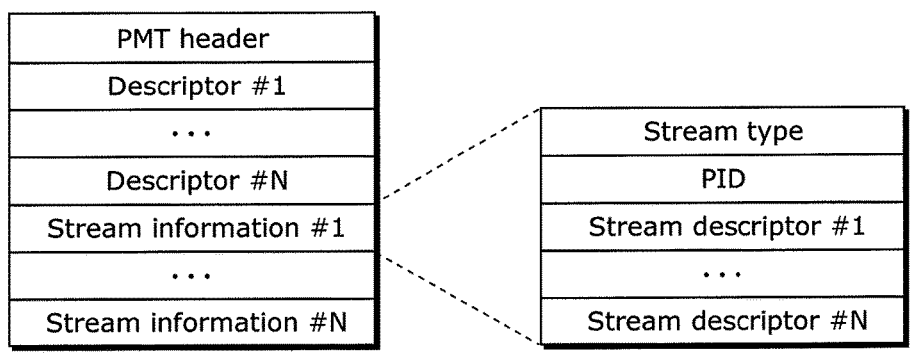
FIG. 46 shows a data structure of a PMT.

FIG. 46 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 47:
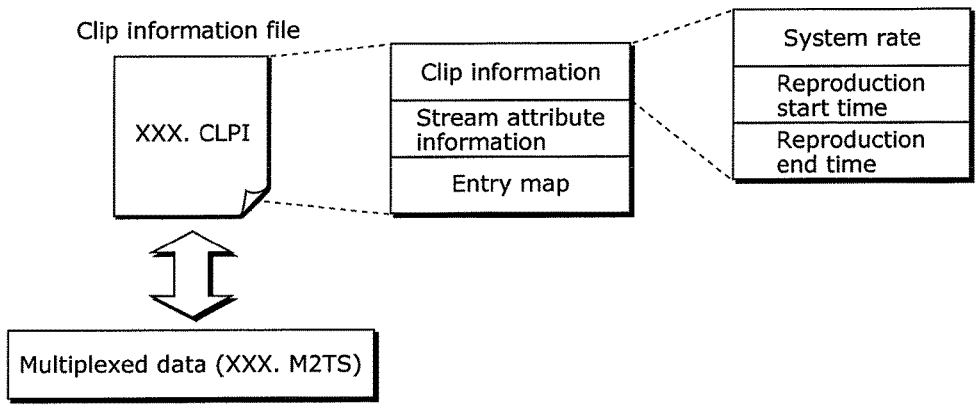
FIG. 47 shows an internal structure of multiplexed data information.

Each of the multiplexed data information files is management information of the multiplexed data as shown in FIG. 47. The multiplexed data information files are in one to one correspondence with the multiplexed data, and each of the files includes multiplexed data information, stream attribute information, and an entry map.

As illustrated in FIG. 47, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 48:
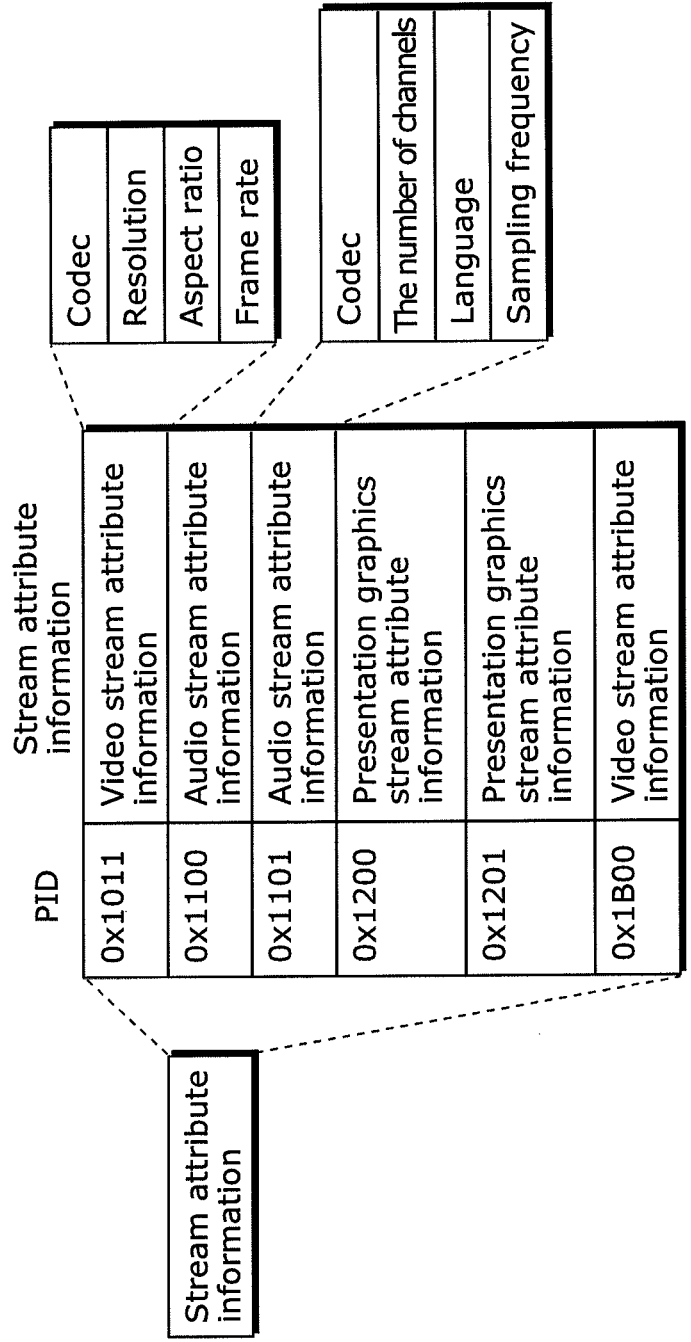
FIG. 48 shows an internal structure of stream attribute information.

As shown in FIG. 48, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 49:
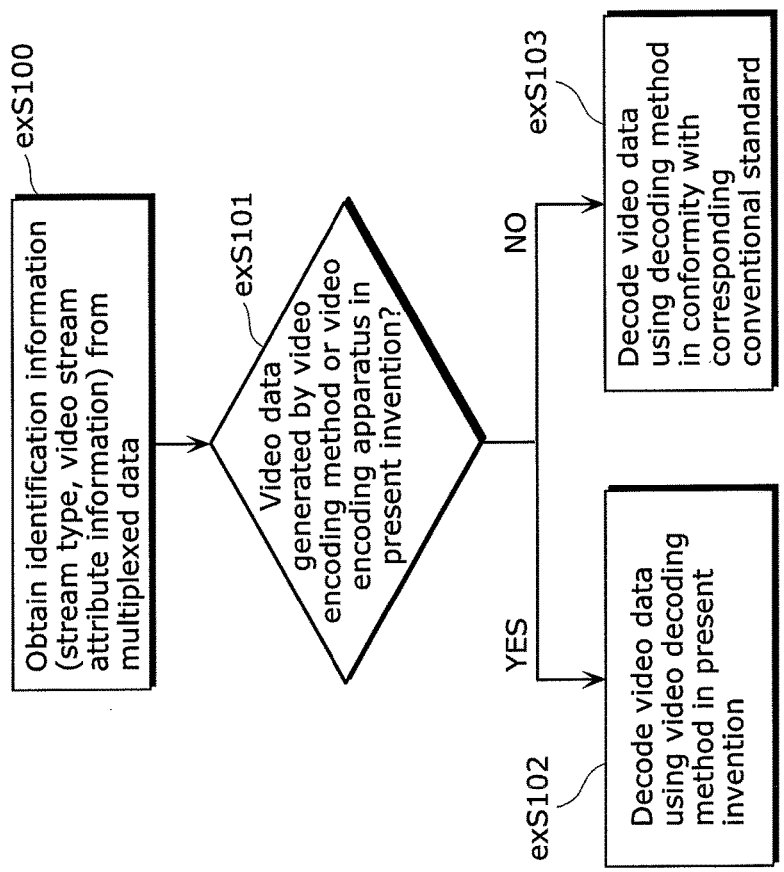
FIG. 49 shows steps for identifying video data.

Furthermore, FIG. 49 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

(Embodiment 4)

Figure 50:
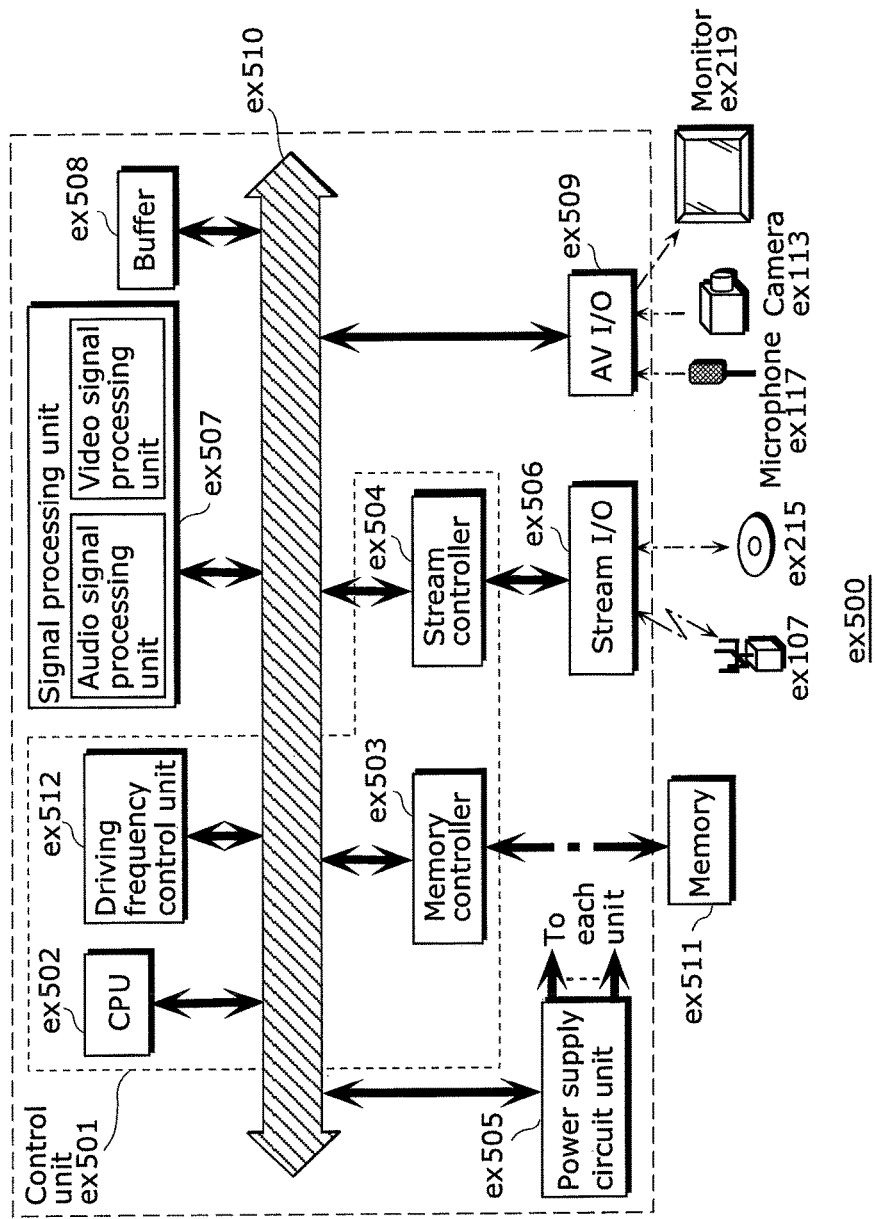
FIG. 50 shows an example of a configuration of an integrated circuit for implementing the moving picture coding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 50 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream 10 ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present invention is applied to biotechnology.

(Embodiment 5)

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. There is a problem that the power consumption increases.

Figure 51:
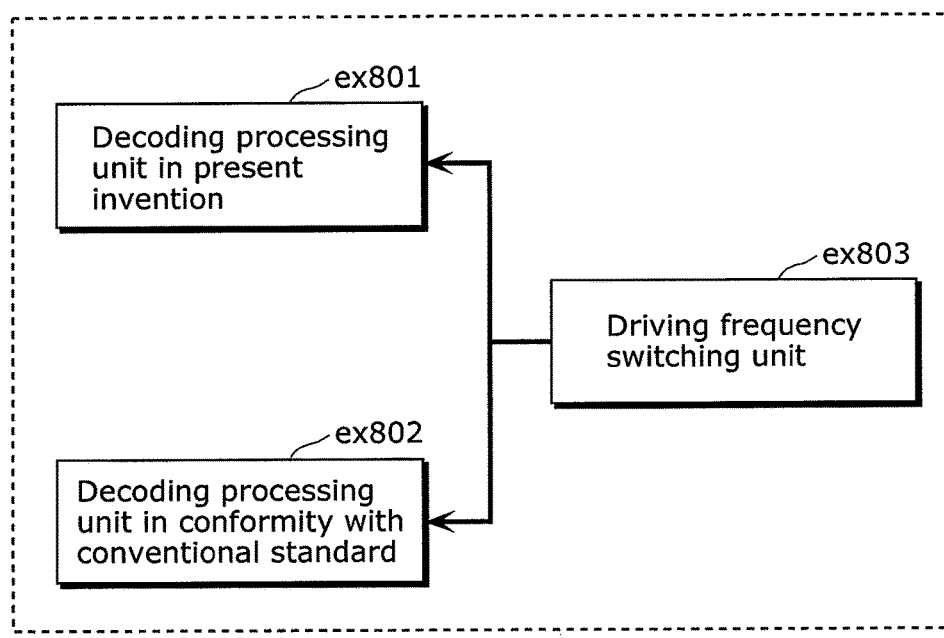
FIG. 51 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 51 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 50. Here, each of the decoding processing unit ex801 that executes the moving picture decoding method described in each of embodiments and the decoding processing unit ex802 that conforms to the conventional standard corresponds to the signal processing unit ex507 in FIG. 50. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment B is probably used for identifying the video data. The identification information is not limited to the one described in Embodiment B but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 53. The driving frequency can be selected by storing the look-up table in the buffer ex508 and in an internal memory of an LSI, and with reference to the look-up table by the CPU ex502.

Figure 52:
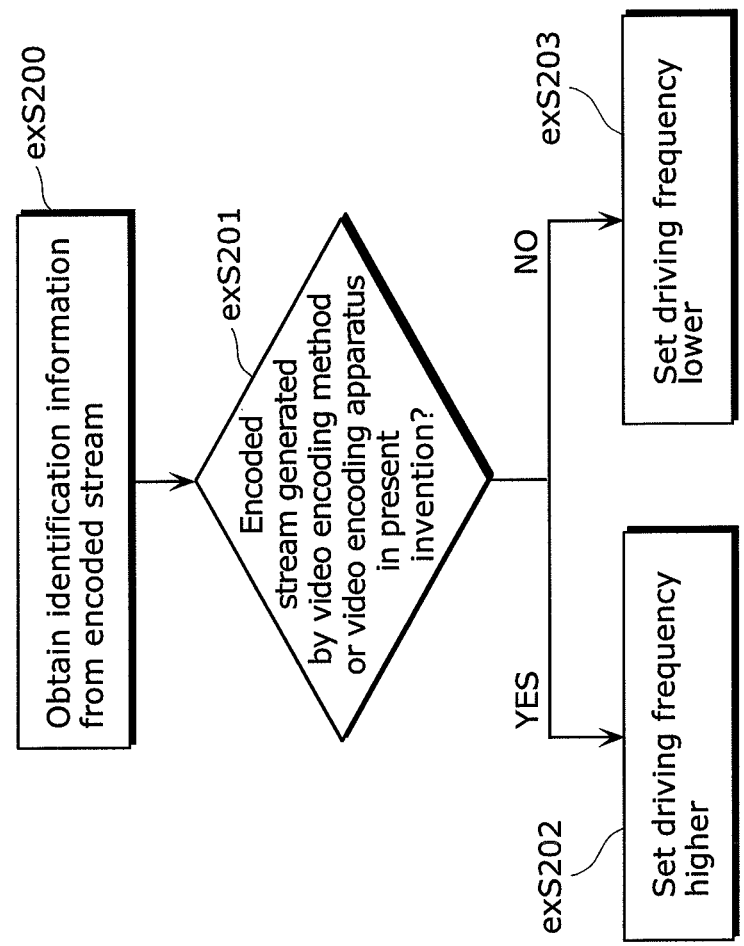
FIG. 52 shows steps for identifying video data and switching between driving frequencies.

FIG. 52 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

(Embodiment 6)

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 54A:
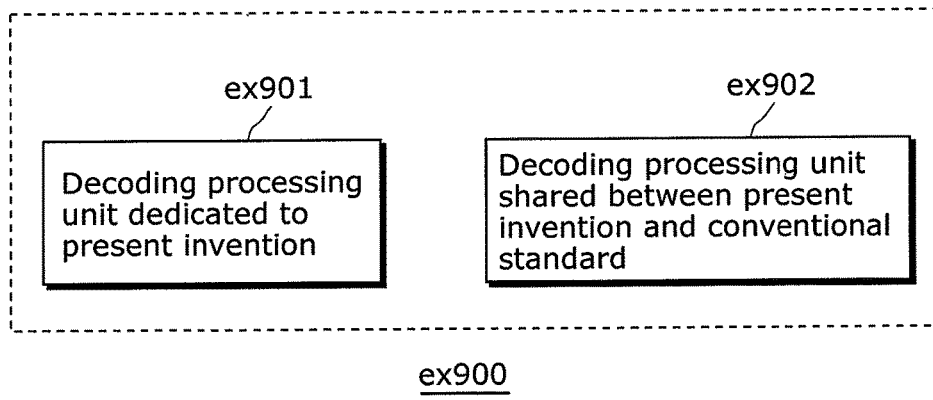
FIG. 54A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 54A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present invention and does not conform to MPEG-4 AVC. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 54B:
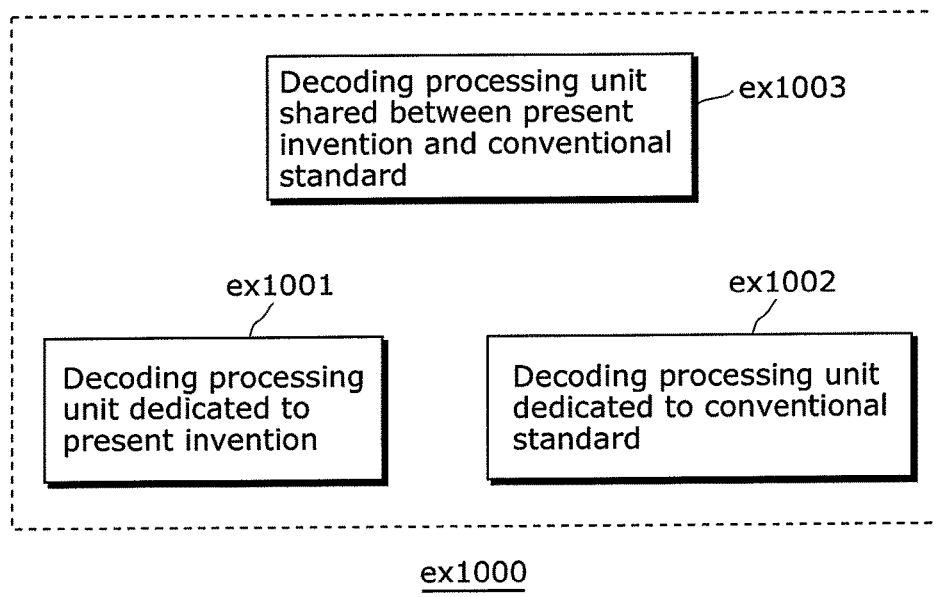
FIG. 54B is a diagram showing another example of a configuration for sharing a module of the signal processing unit.

Furthermore, ex1000 in FIG. 54B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The image encoding apparatus and the image decoding apparatus according to the present invention can be used for, for example, a television set, a digital video recorder, a car navigation system, a mobile phone, a digital camera, or a digital video camera.

REFERENCE SIGNS LIST

101 Encoding unit
102 Subtracting unit
103 Orthogonal transforming unit
104 Quantizing unit
105 Variable-length encoding unit
106,206 Inverse quantizing unit
107, 207 Inverse orthogonal transforming unit
108, 208 Adder
109, 209 Block memory
110, 210 Intra predicting unit
111, 211 Frame memory
112, 212 Inter predicting unit
113, 213 Switch
121, 221 Inter-prediction control unit
124 Picture type determining unit
131, 231 Adding unit
132, 232 Selecting unit
205 Variable-length decoding unit

The invention claimed is:

1. An image encoding method of encoding a plurality of pictures on a block-by-block basis, the image encoding method comprising:
determining, among the pictures, reference pictures to be used for encoding a current block which is included in a current picture;
determining, among the reference pictures, a first picture to be used for deriving a motion vector predictor used for encoding a motion vector of the current block, wherein the first picture belongs to a first view, and the first picture refers only to reference pictures belonging to a view different from the first view;
adding, to a list, a motion vector of at least one first block that is included in the first picture and located spatially close to the current block;
selecting, as the motion vector predictor, one of the motion vectors added to the list; and
encoding (i) the current block using the motion vector of the current block and (ii) a difference between the motion vector of the current block and the motion vector predictor selected,
wherein, in the encoding, when the current picture is an inter-view picture, the motion vector is generated for each of all blocks included in the current picture with reference to only reference pictures belonging to a view different from a current view to which the current picture belongs,
wherein, in the determining of a first picture, when the current picture is an inter-view picture, a reference picture that is an inter-view picture is determined as the first picture, and
wherein the motion vector is generated for each of all blocks included in the current picture with reference to only reference pictures belonging to a view different from a current view to which the current picture belongs, based on control that prevents pictures belonging to the current view to which the current picture belongs from being included in a reference picture list.

2. The image encoding method according to claim 1,
wherein, in the determining of reference pictures, (i) when the current picture is an inter-view picture, the reference picture list is generated using only the reference pictures belonging to the view different from the first view, to which the current picture belongs, and (ii) when the current picture is not an inter-view picture, the reference picture list is generated using only the reference pictures belonging to the first view.

3. The image encoding method according to claim 1,
wherein, in the determining of a first picture, when the current picture is not an inter-view picture, a reference picture that is included in the reference pictures and has a picture type different from an inter-view picture is determined as the first picture.

4. The image encoding method according to claim 1,
wherein inter-view picture is a picture type where each of the blocks included in the current picture is to be encoded using the reference pictures belonging to the view different from the first view, to which the current picture belongs.

5. An image decoding method of decoding a plurality of pictures on a block-by-block basis, the image decoding method comprising:
determining, among the pictures, reference pictures to be used for decoding a current block which is included in a current picture;
determining, among the reference pictures, a first picture to be used for deriving a motion vector predictor used for decoding a motion vector of the current block, wherein the first picture belongs to a first view, and the first picture refers only to reference pictures belonging to a view different from the first view;
adding, to a list, a motion vector of at least one first block that is included in the first picture and located spatially close to the current block;
selecting, as the motion vector predictor, one of the motion vectors added to the list; and
decoding a difference between the motion vector of the current block and the motion vector predictor selected, adding the decoded difference to the motion vector predictor to obtain the motion vector of the current block, and decoding the current block using the obtained motion vector,
wherein, in the decoding, when the current picture is an inter-view picture, the motion vector is generated for each of all blocks included in the current picture with reference only to the reference pictures belonging to a view different from a current view to which the current picture belongs,
wherein, in the determining of a first picture, when the current picture is an inter-view picture, a reference picture that is an inter-view picture is determined as the first picture, and
wherein the motion vector is generated for each of all blocks included in the current picture with reference to only reference pictures belonging to a view different from a current view to which the current picture belongs, based on control that prevents pictures belonging to the current view to which the current picture belongs from being included in a reference picture list.

6. The image decoding method according to claim 5,
wherein, in the determining of reference pictures, (i) when the current picture is an inter-view picture, the reference picture list is generated using only the reference pictures belonging to the view different from the first view, to which the current picture belongs, and (ii) when the current picture is not an inter-view picture, the reference picture list is generated using only the reference pictures belonging to the first view.

7. The image decoding method according to claim 5,
wherein, in the determining of a first picture, when the current picture is not an inter-view picture, a reference picture that is included in the reference pictures and has a picture type different from the specific picture type is determined as the first picture.

8. The image decoding method according to claim 5, wherein inter-view picture is a picture type where each of the blocks included in the current picture is to be decoded using the reference pictures belonging to the view different from the first view, to which the current picture belongs.

* * * * *